B. P. HAYES AND F. D. LAUGHLIN.
ACCOUNTING MACHINE.
APPLICATION FILED AUG. 7, 1916.
1,340,827.
Patented May 18, 1920.
25 SHEETS—SHEET 1.
Fig. I.
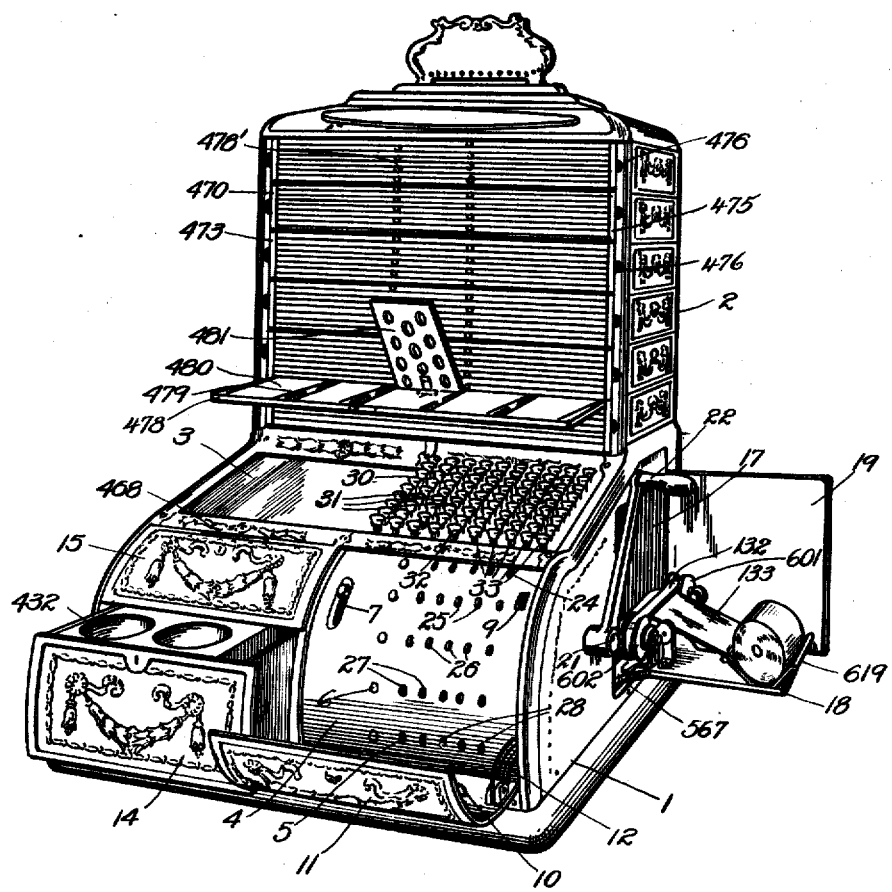
INVENTORS.
B. P. Hayes.
F. D. Laughlin.
BY
ATTORNEY

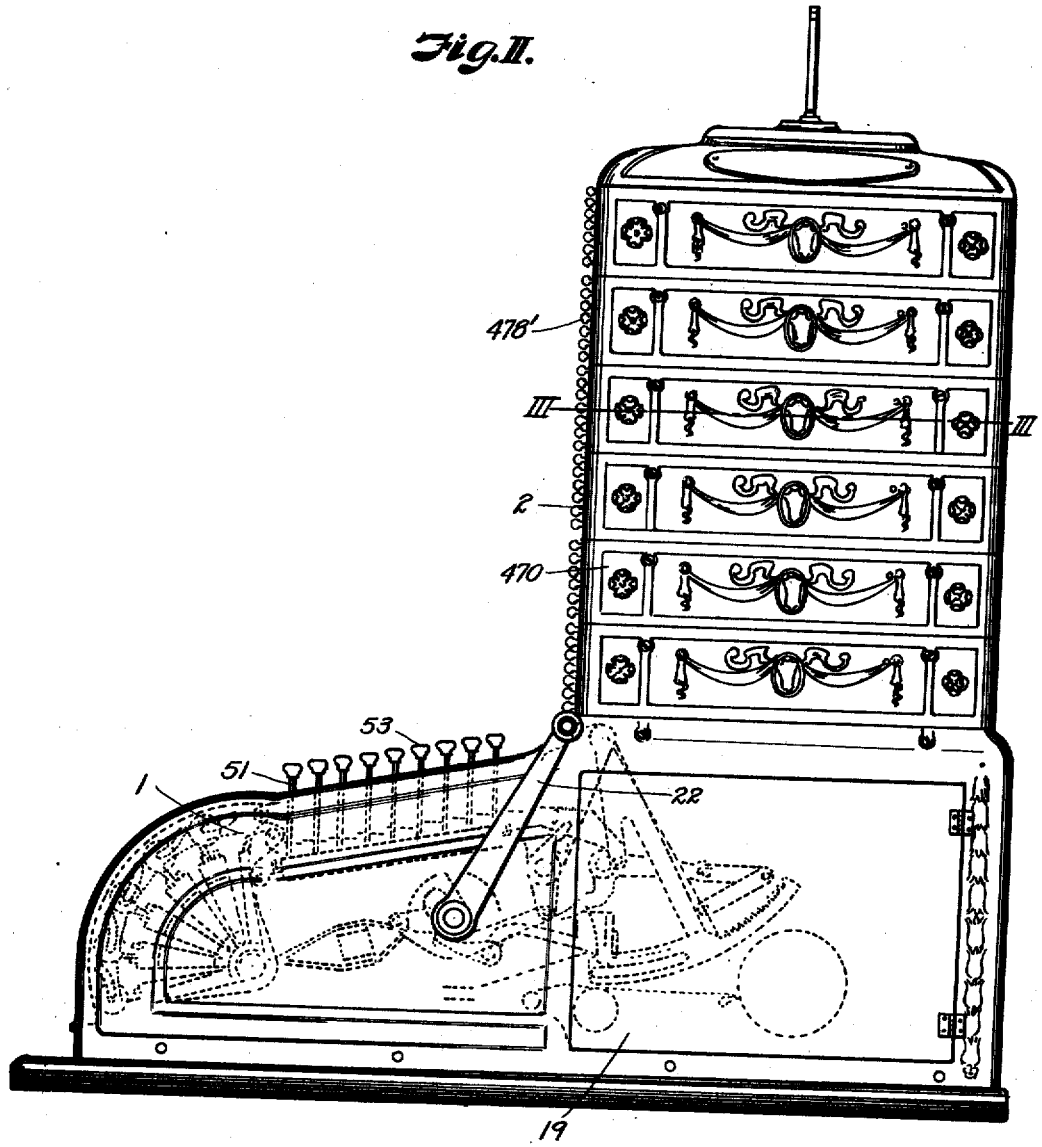

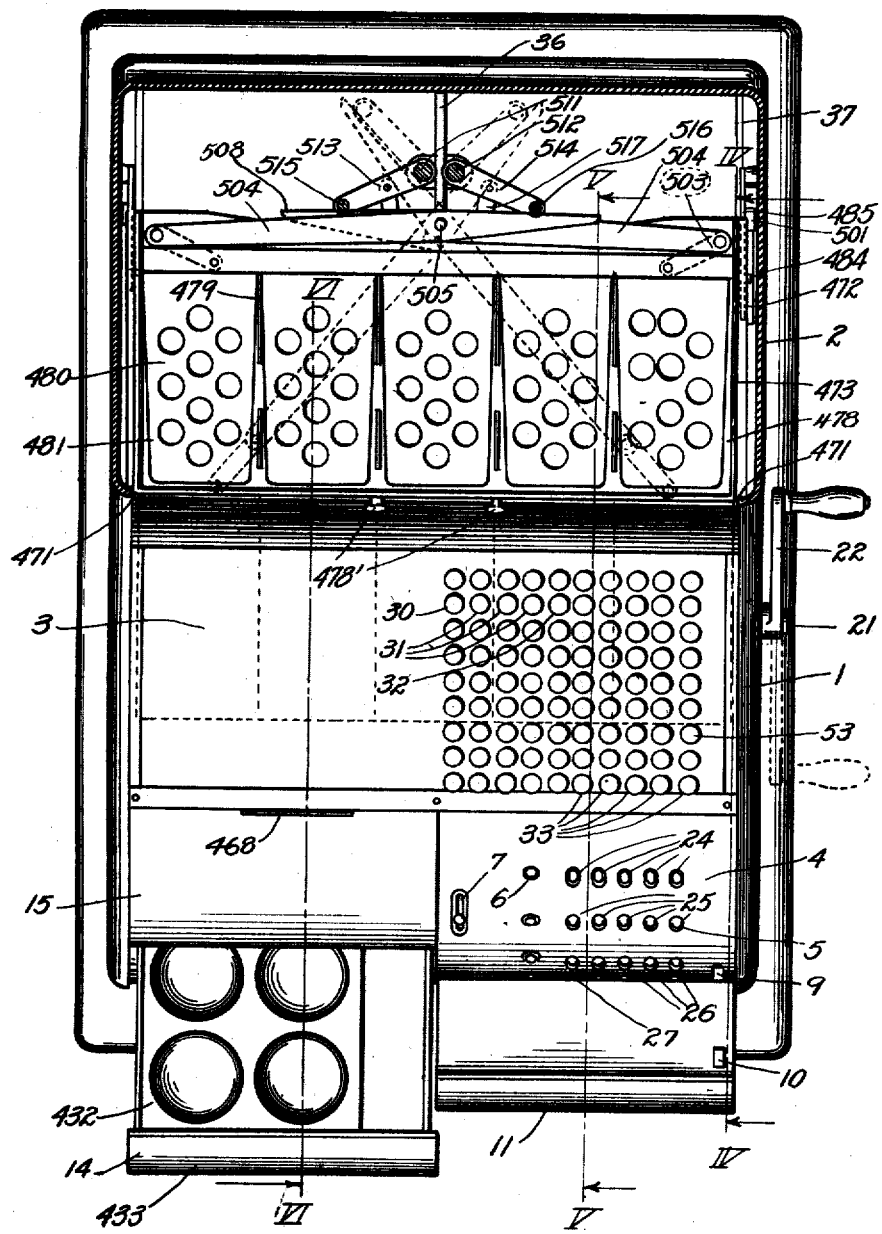

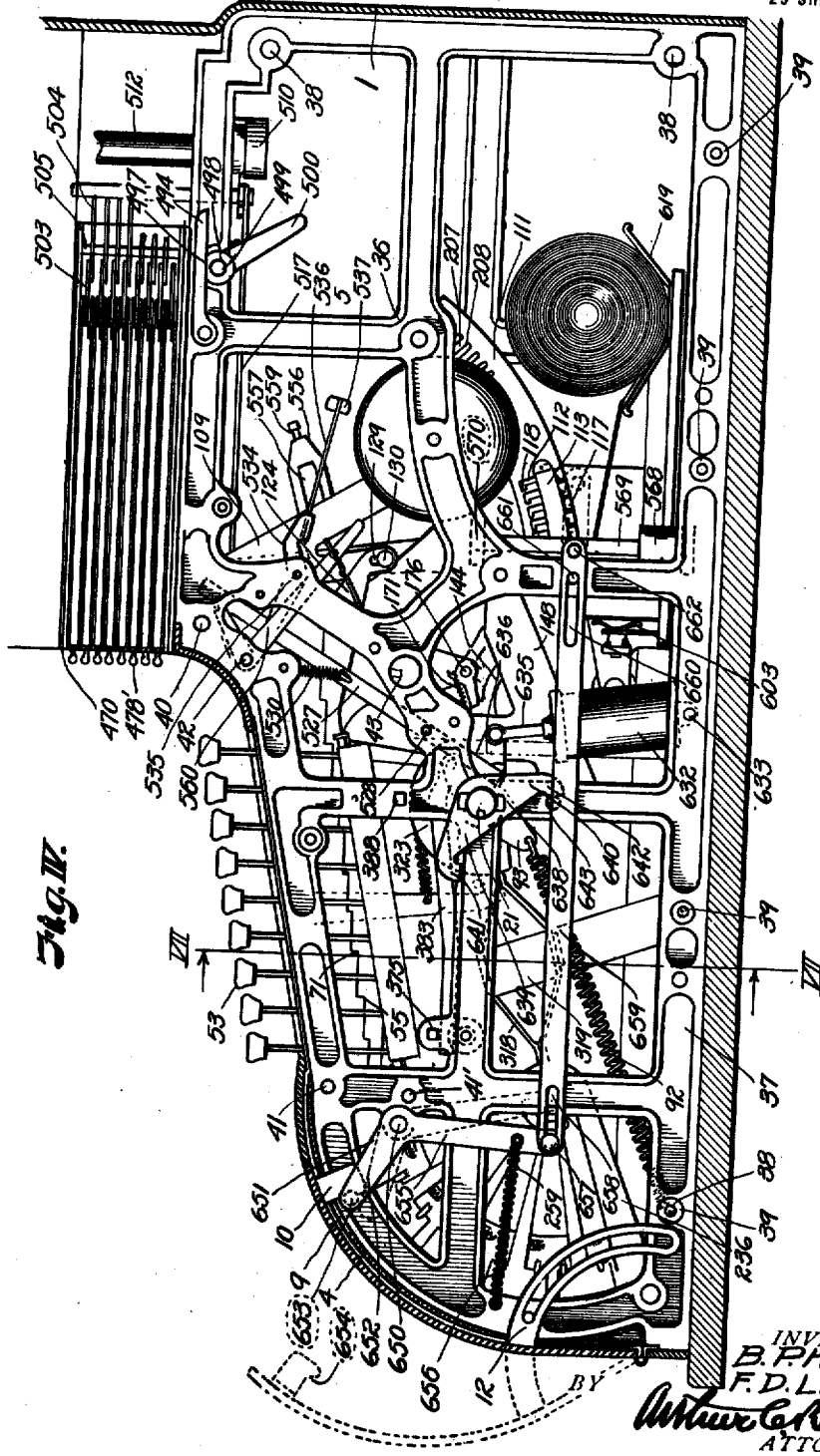

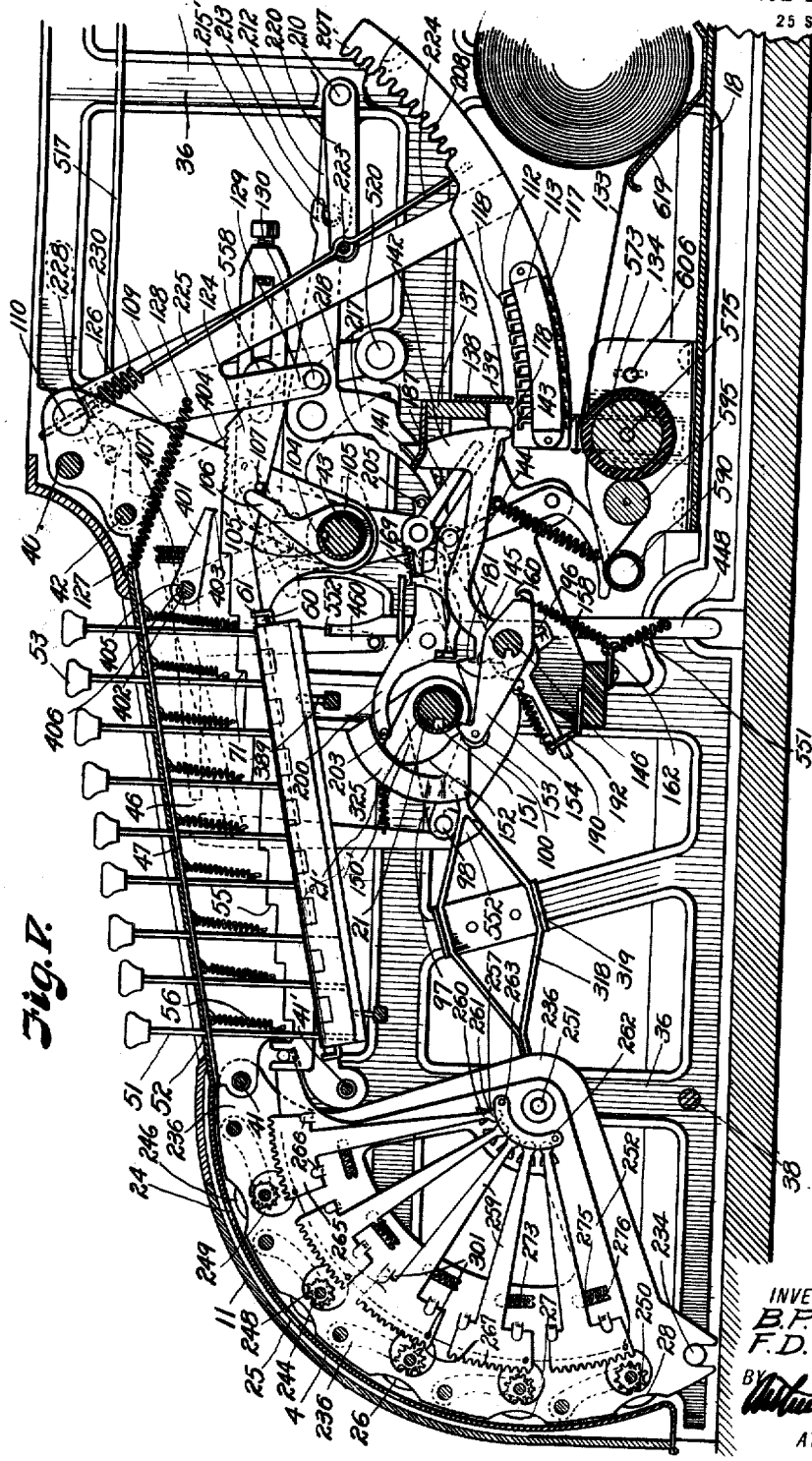

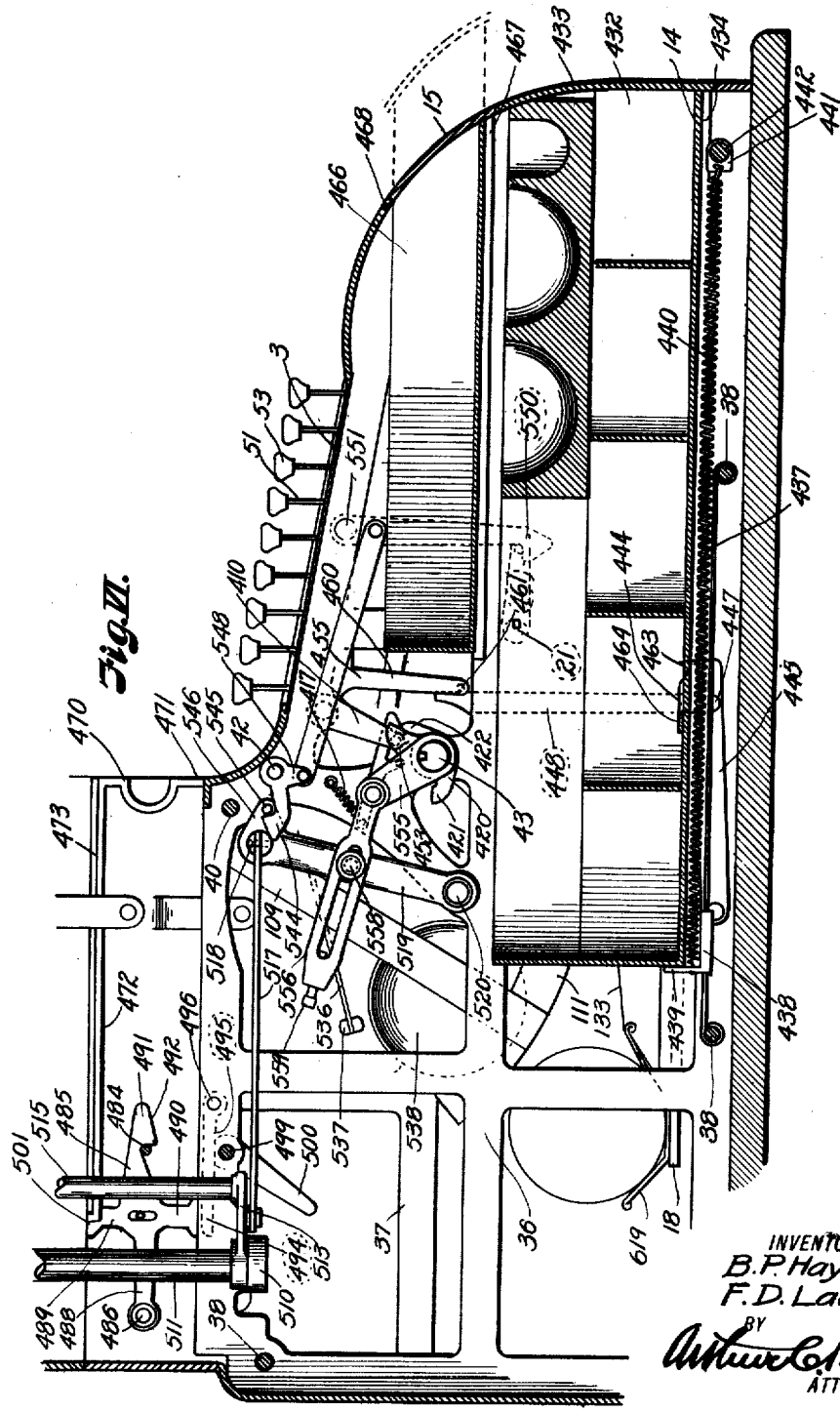

B. P. HAYES AND F. D. LAUGHLIN.
ACCOUNTING MACHINE.
APPLICATION FILED AUG. 7, 1916.
1,340,827.
Patented May 18, 1920.
25 SHEETS—SHEET 7.
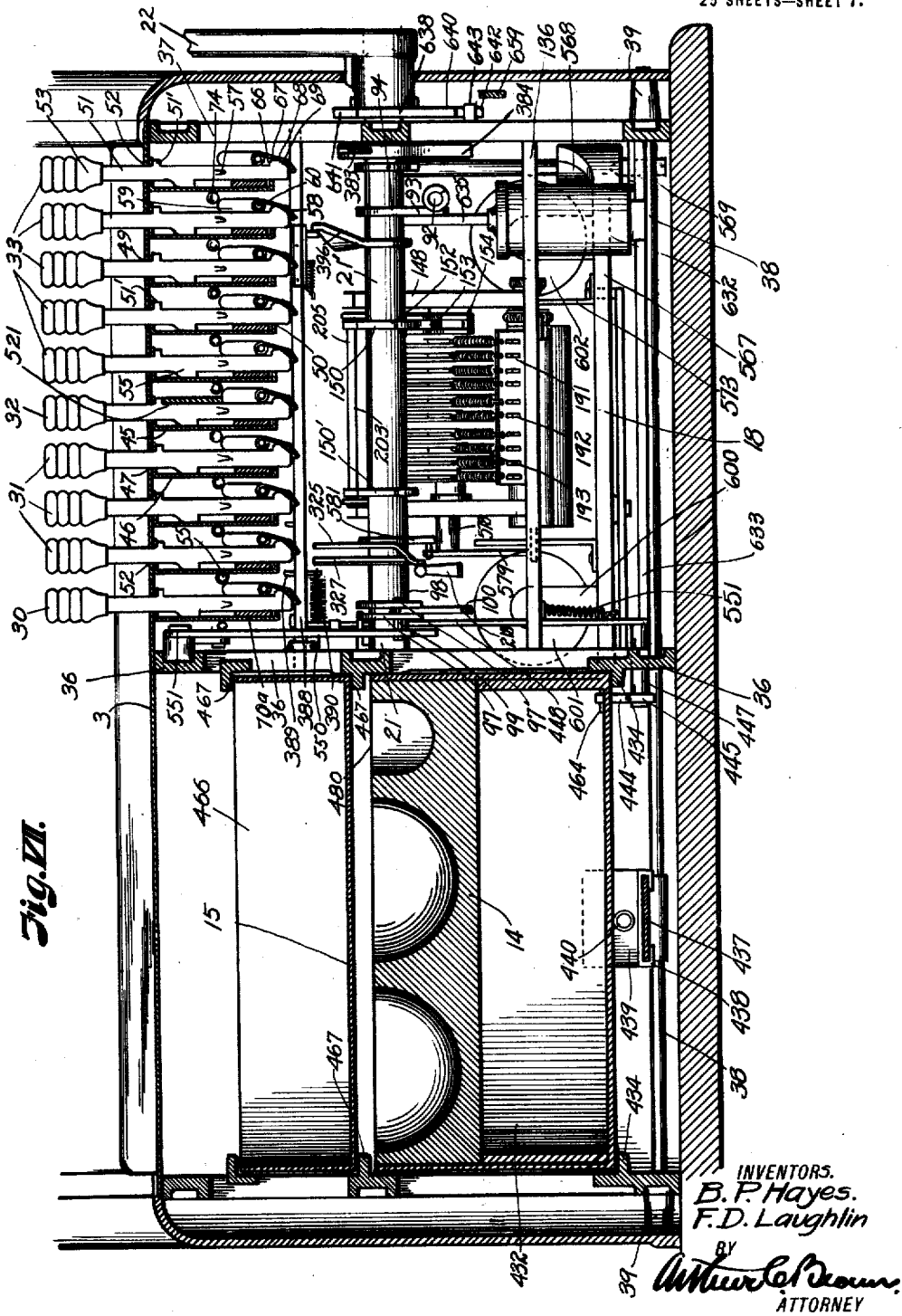
INVENTORS.
B. P. Hayes.
F. D. Laughlin
BY
Arthur C. Brown,
ATTORNEY

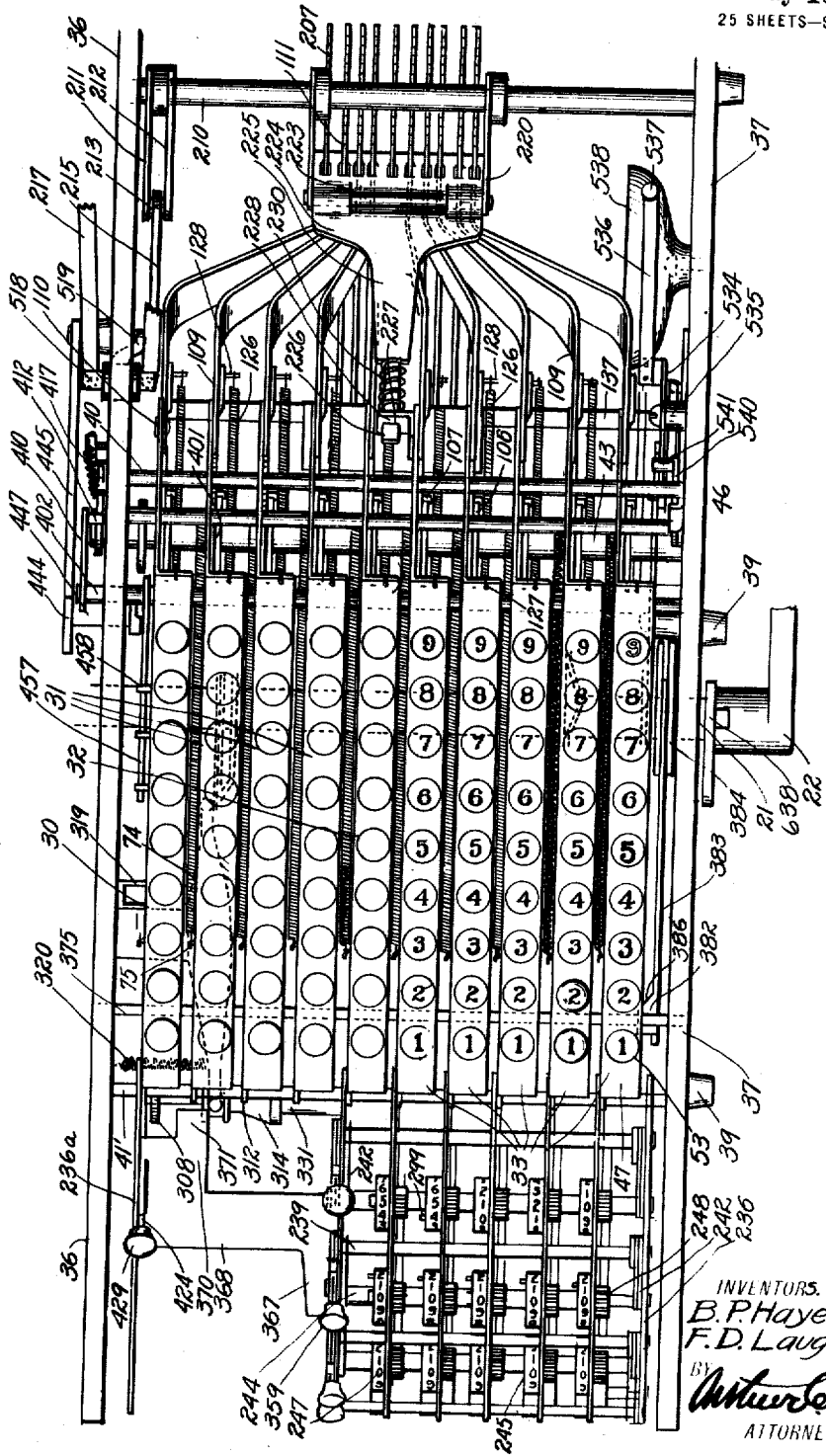

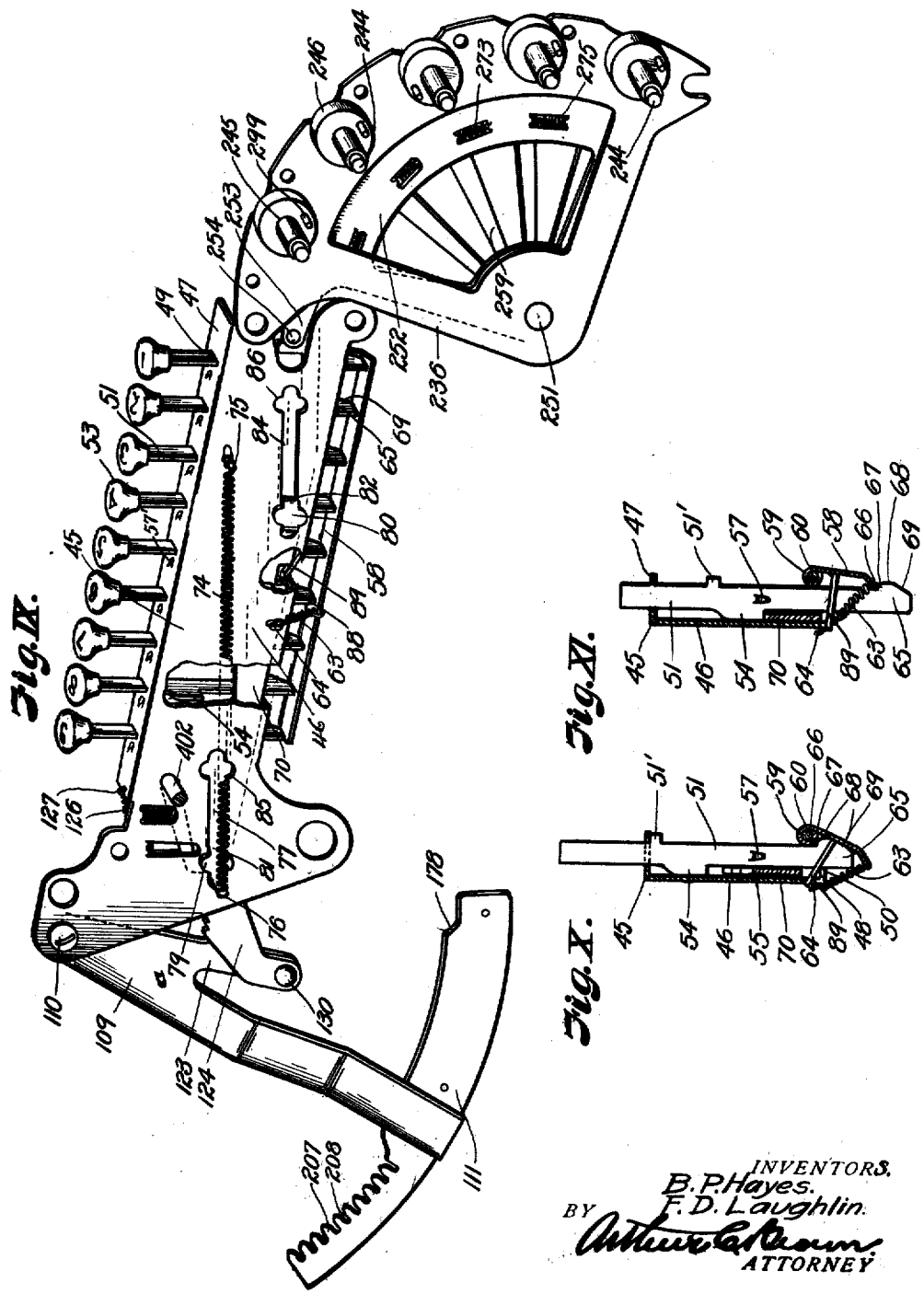

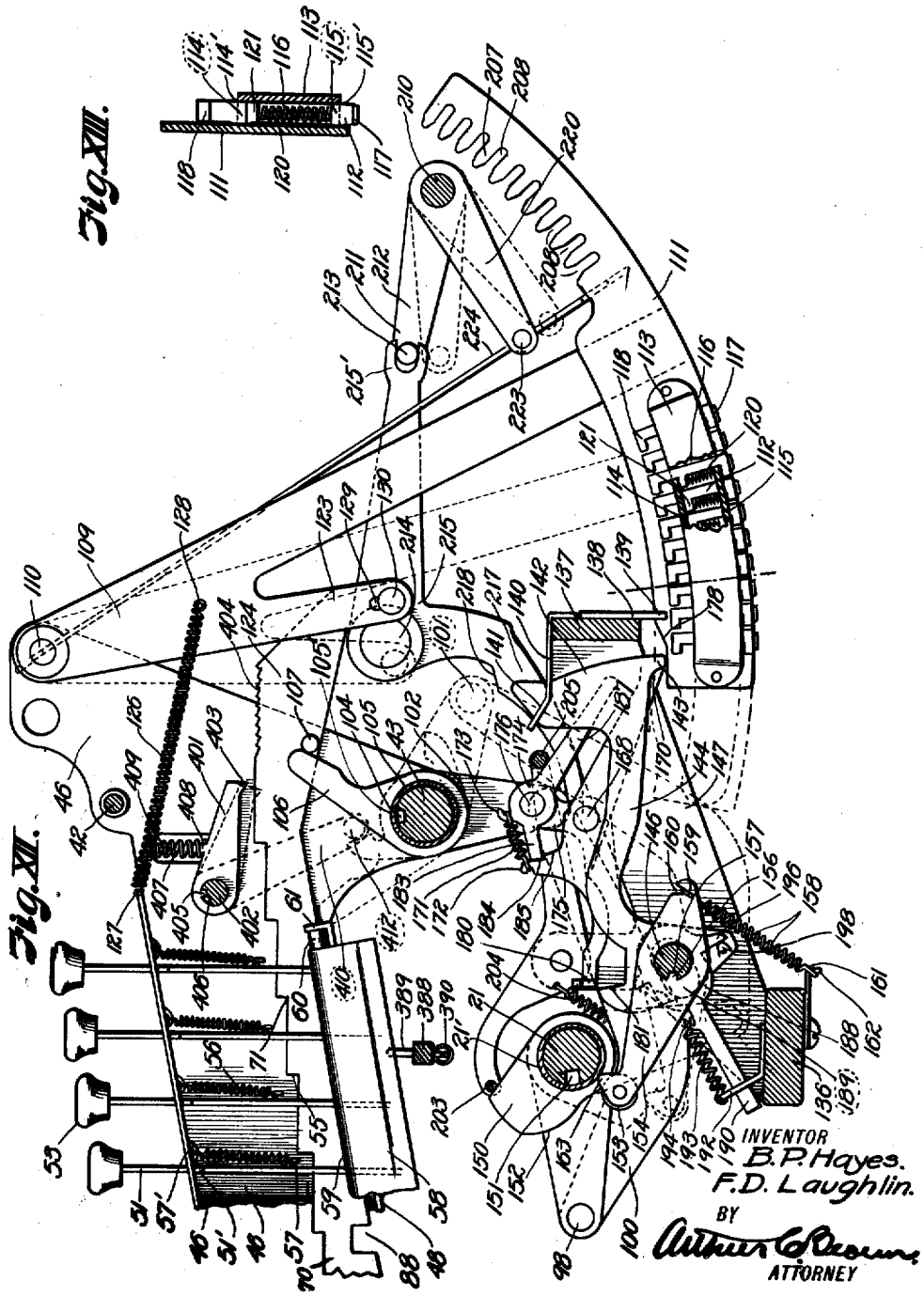

B. P. HAYES AND F. D. LAUGHLIN.
ACCOUNTING MACHINE.
APPLICATION FILED AUG. 7, 1916.
1,340,827.
Patented May 18, 1920.
25 SHEETS—SHEET 11.
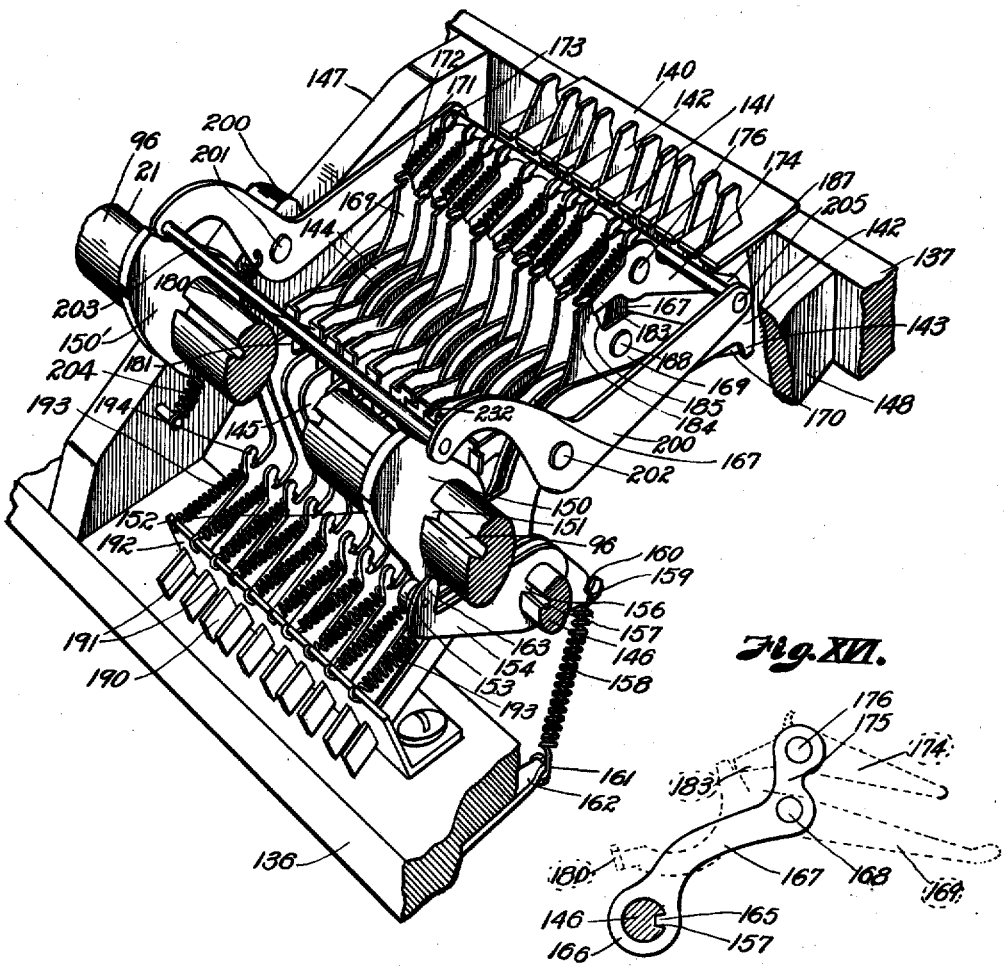
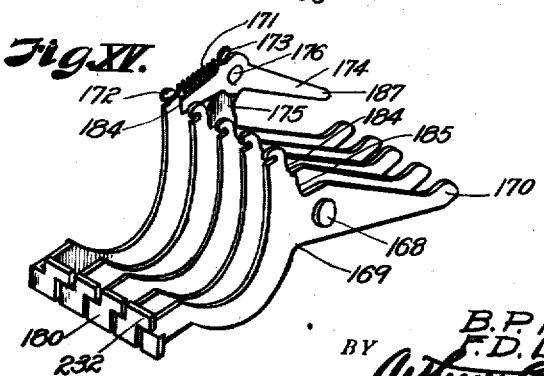
INVENTORS.
B. P. Hayes.
F. D. Laughlin.
BY
ATTORNEY B. P. HAYES AND F. D. LAUGHLIN.
ACCOUNTING MACHINE.
APPLICATION FILED AUG. 7, 1916.
1,340,827.
Patented May 18, 1920.
25 SHEETS—SHEET 12.
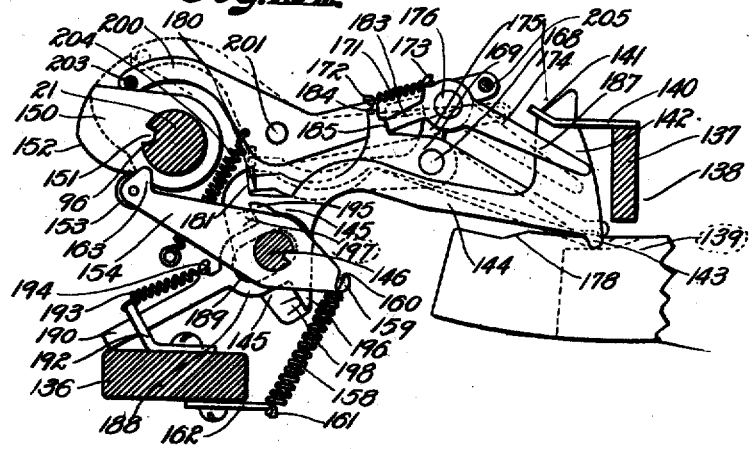
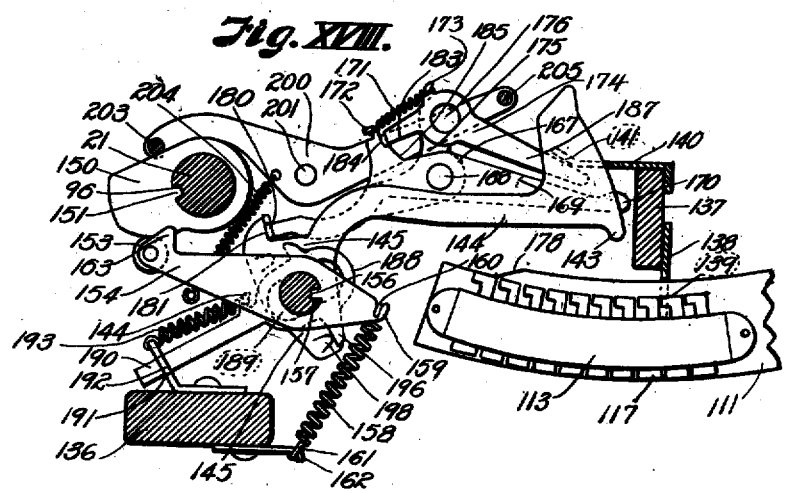
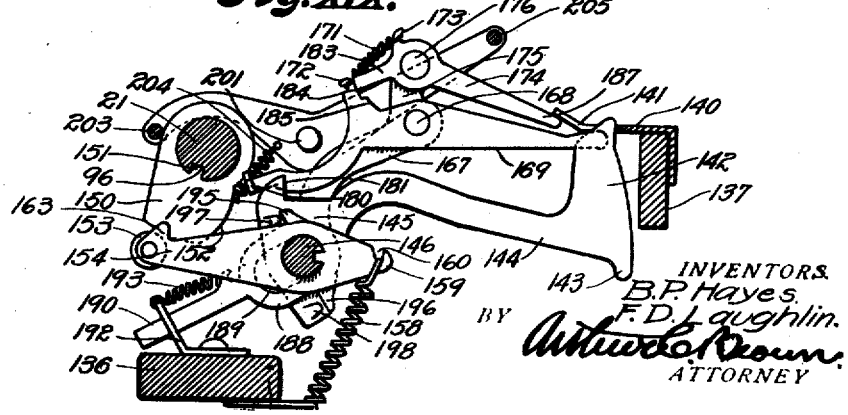
INVENTORS.
B. P. Hayes.
F. D. Laughlin.
BY Arthur E. Brown
ATTORNEY

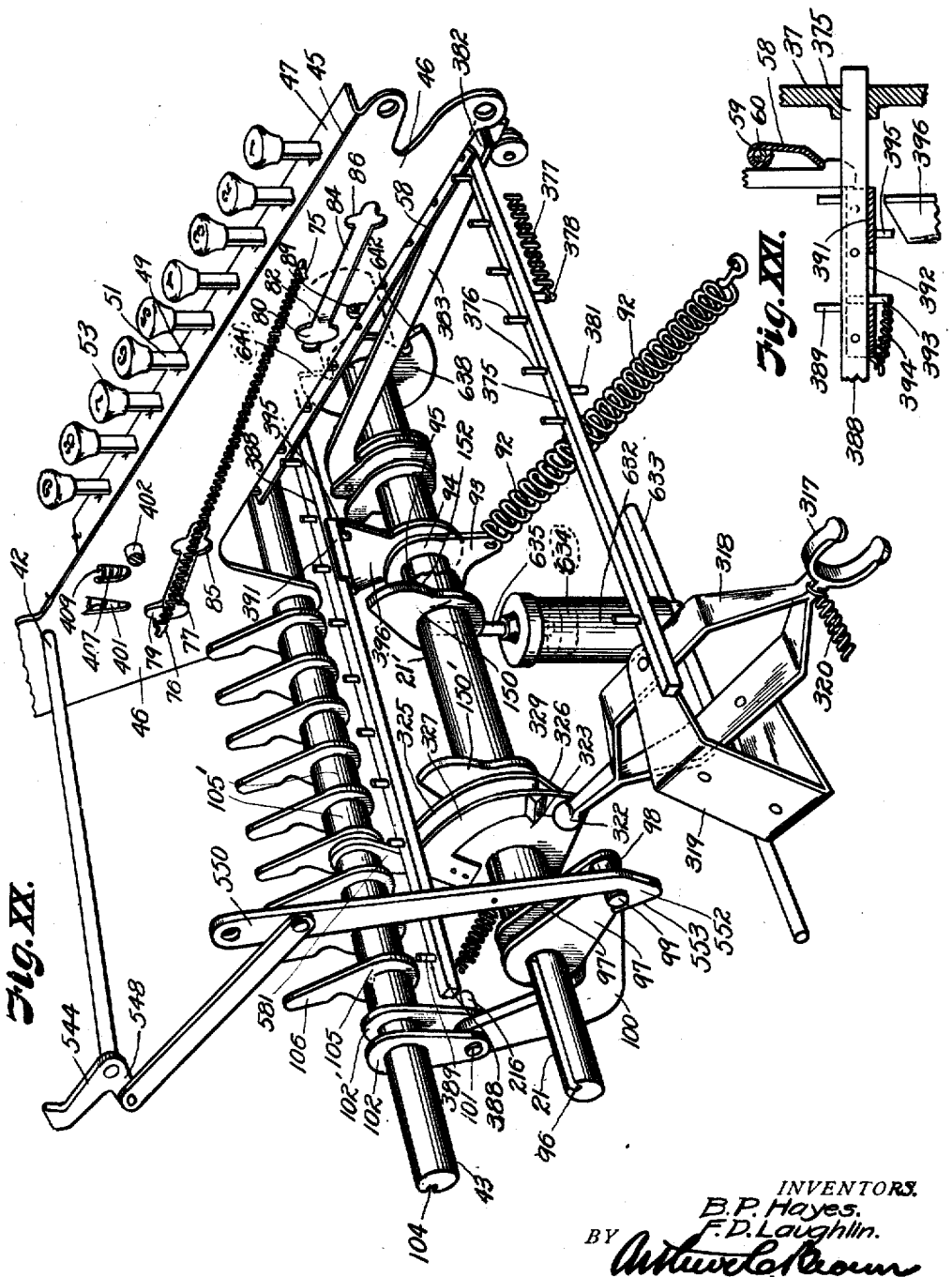

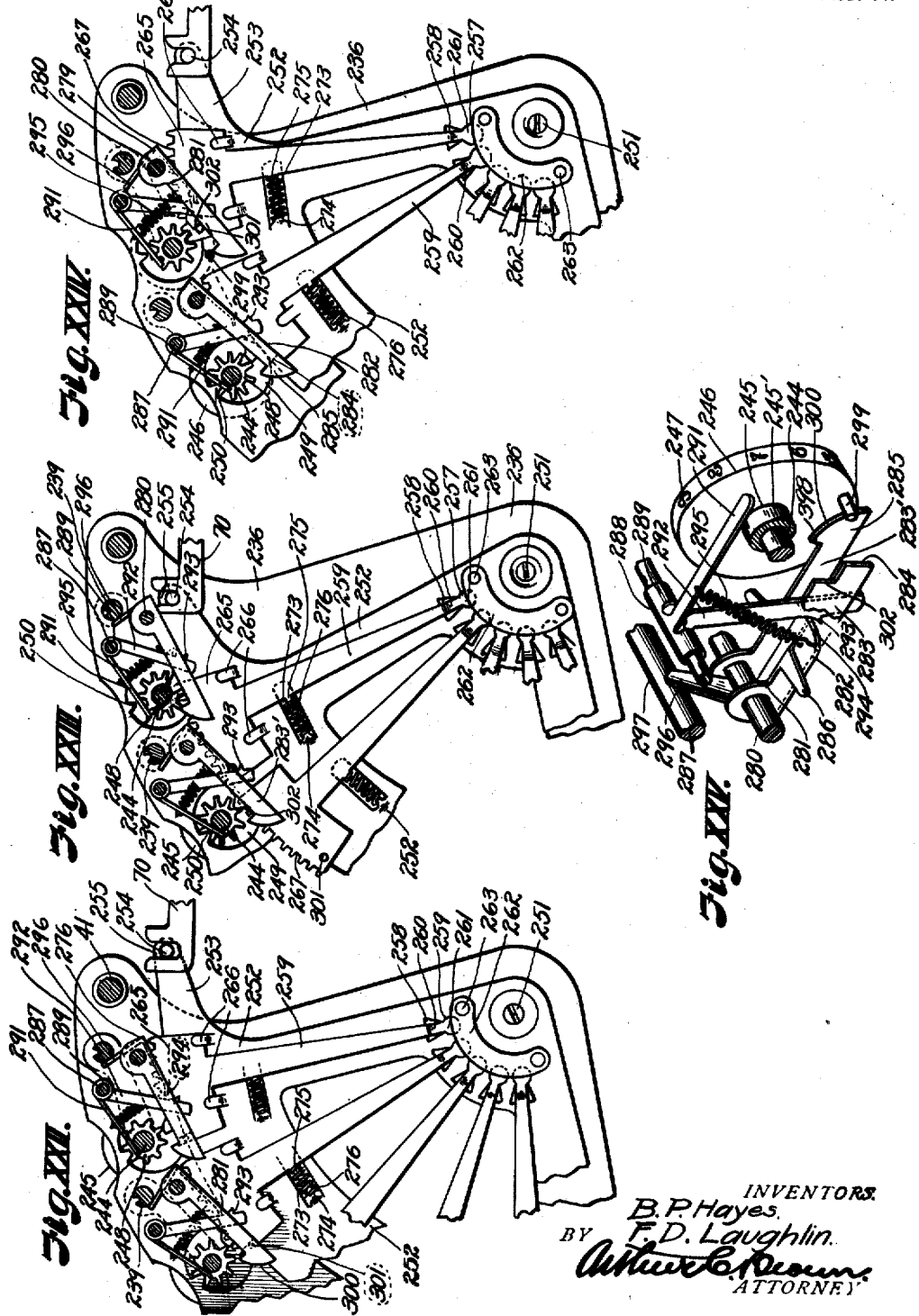

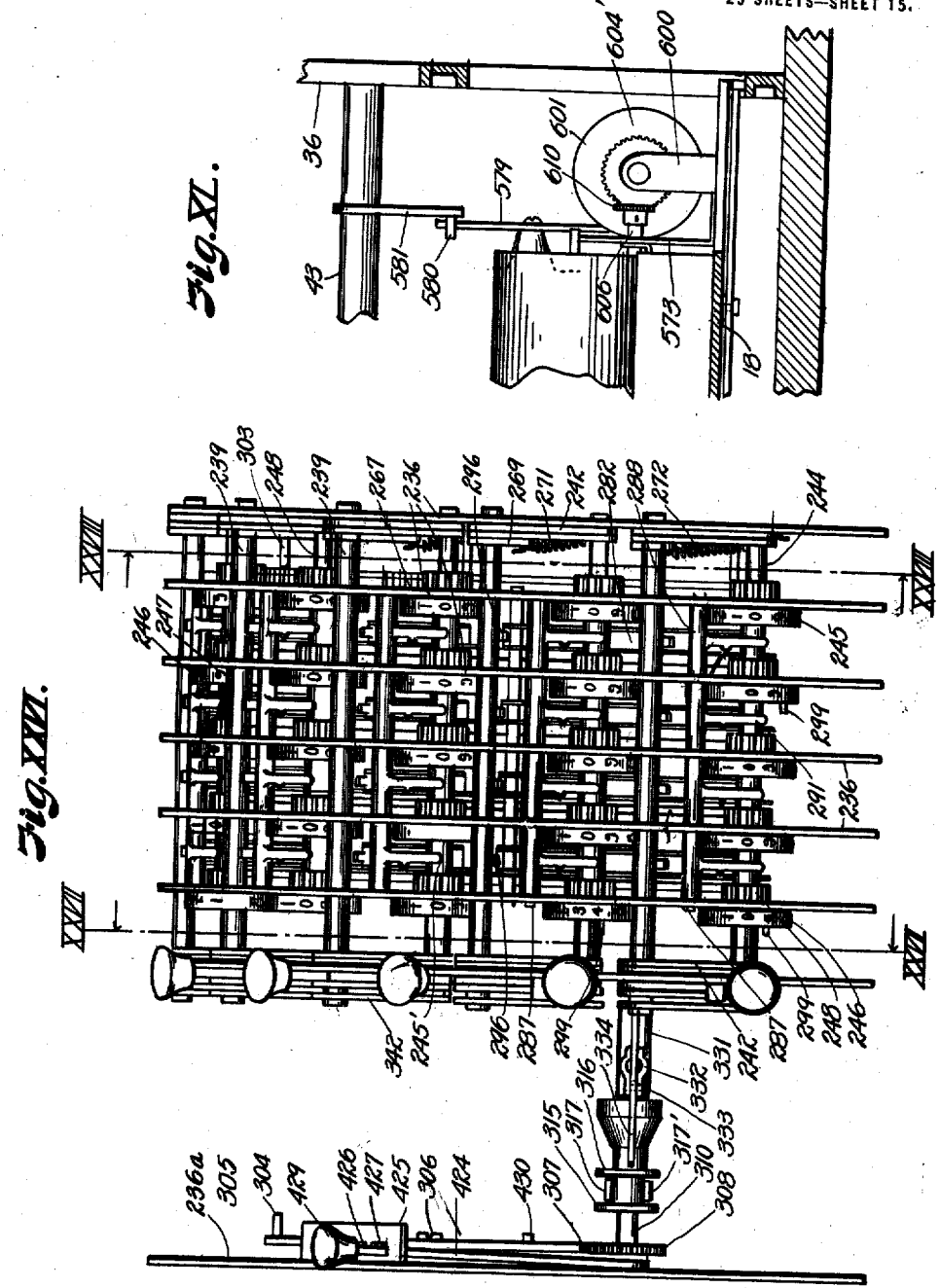

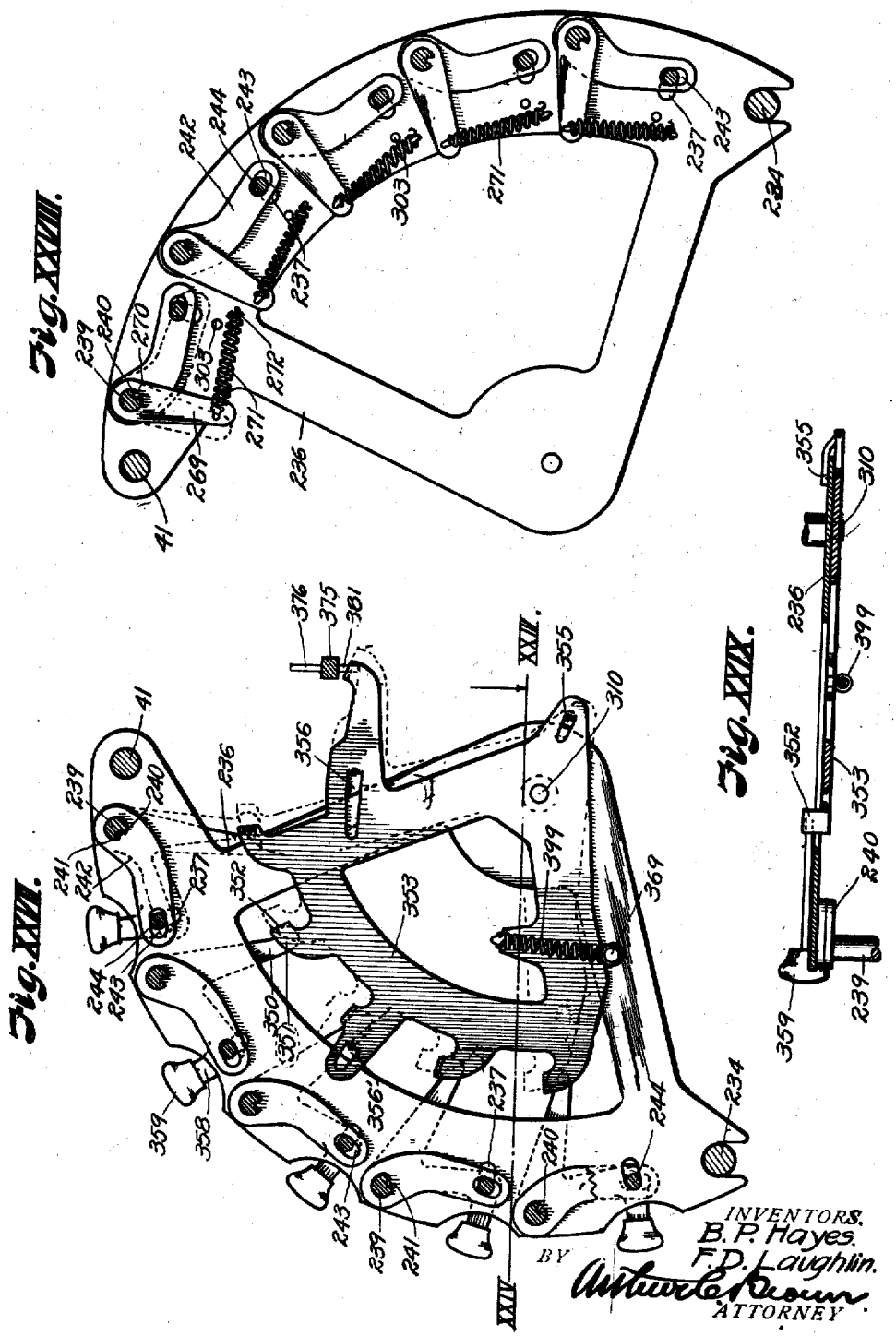

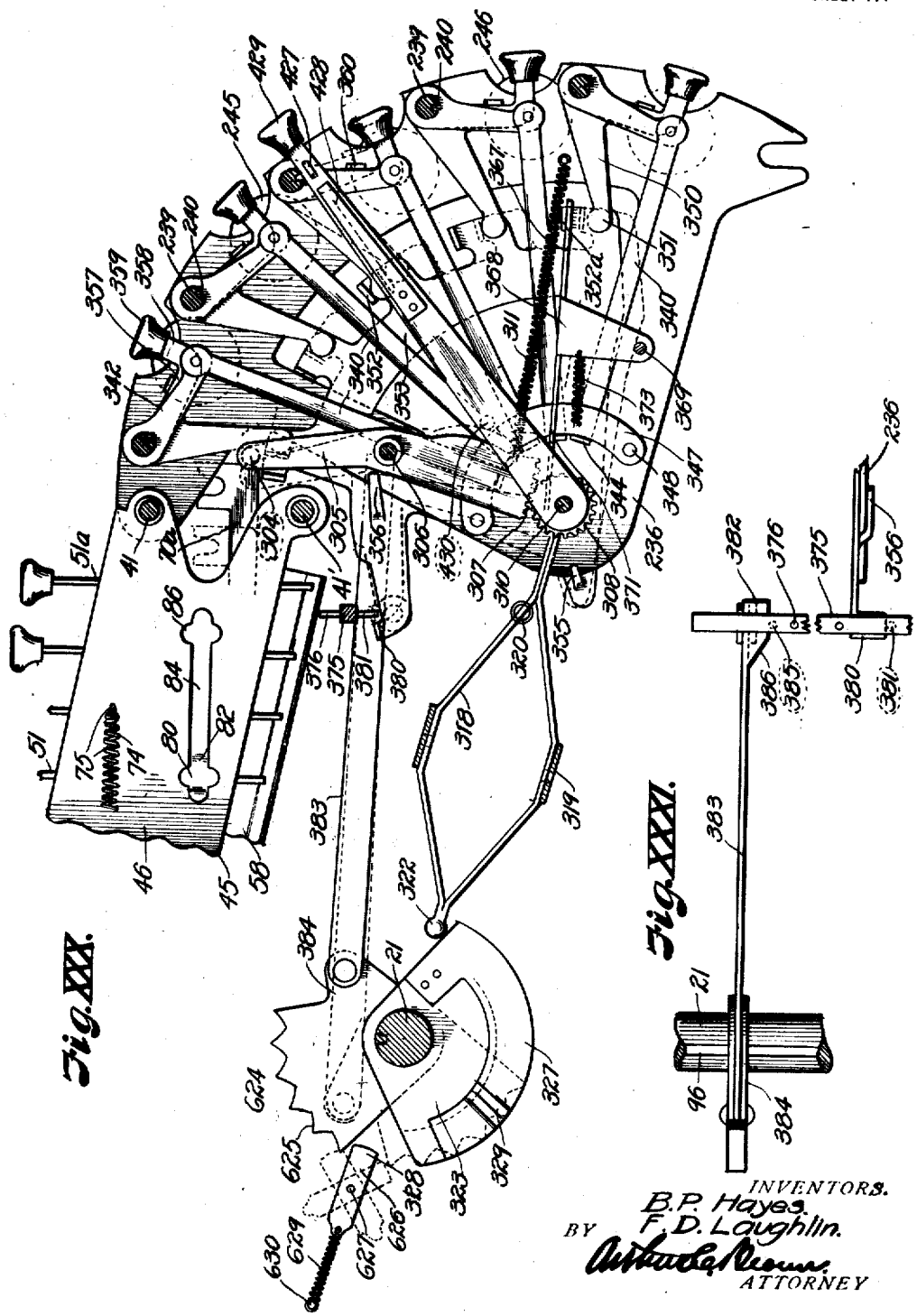

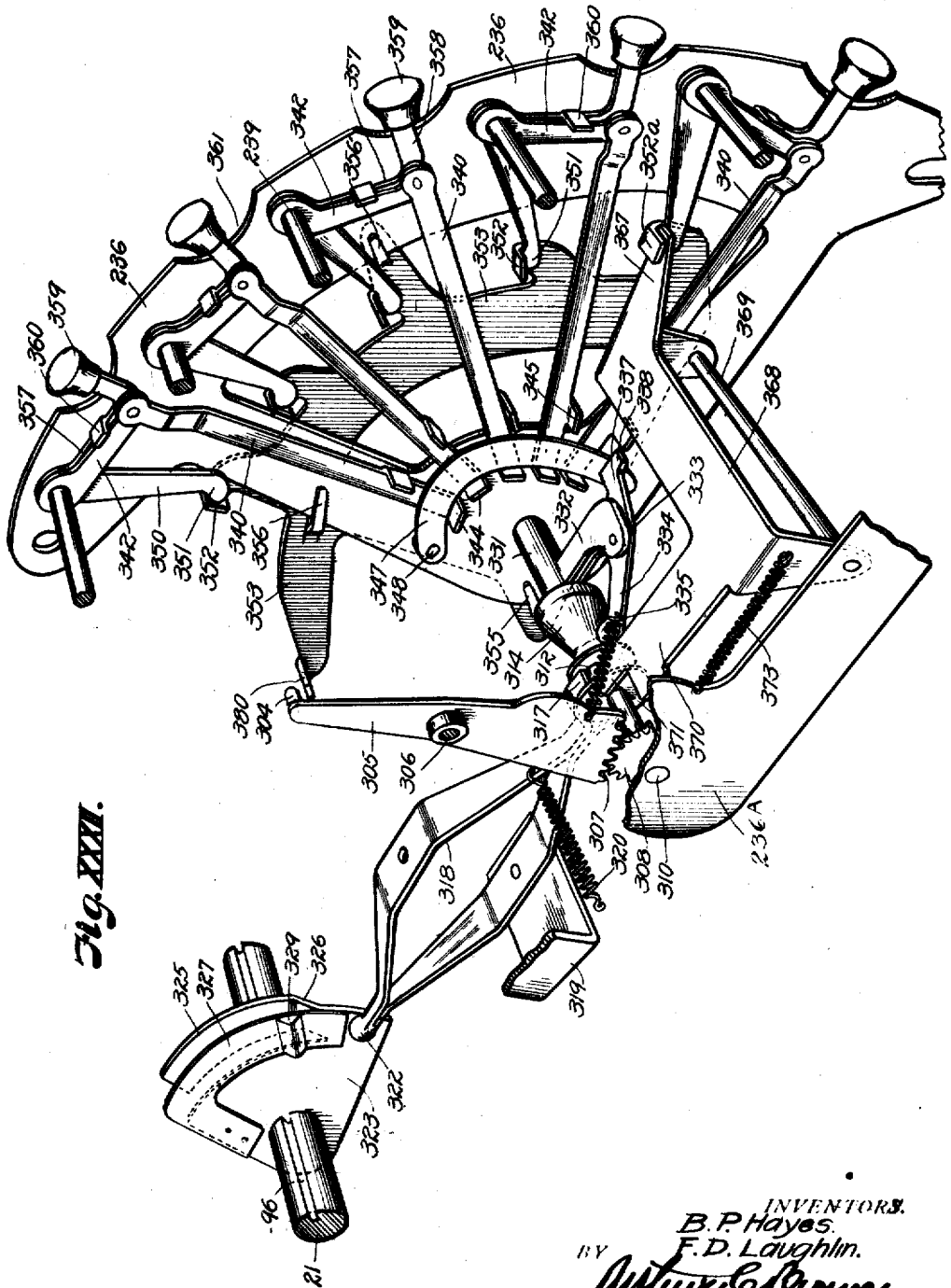

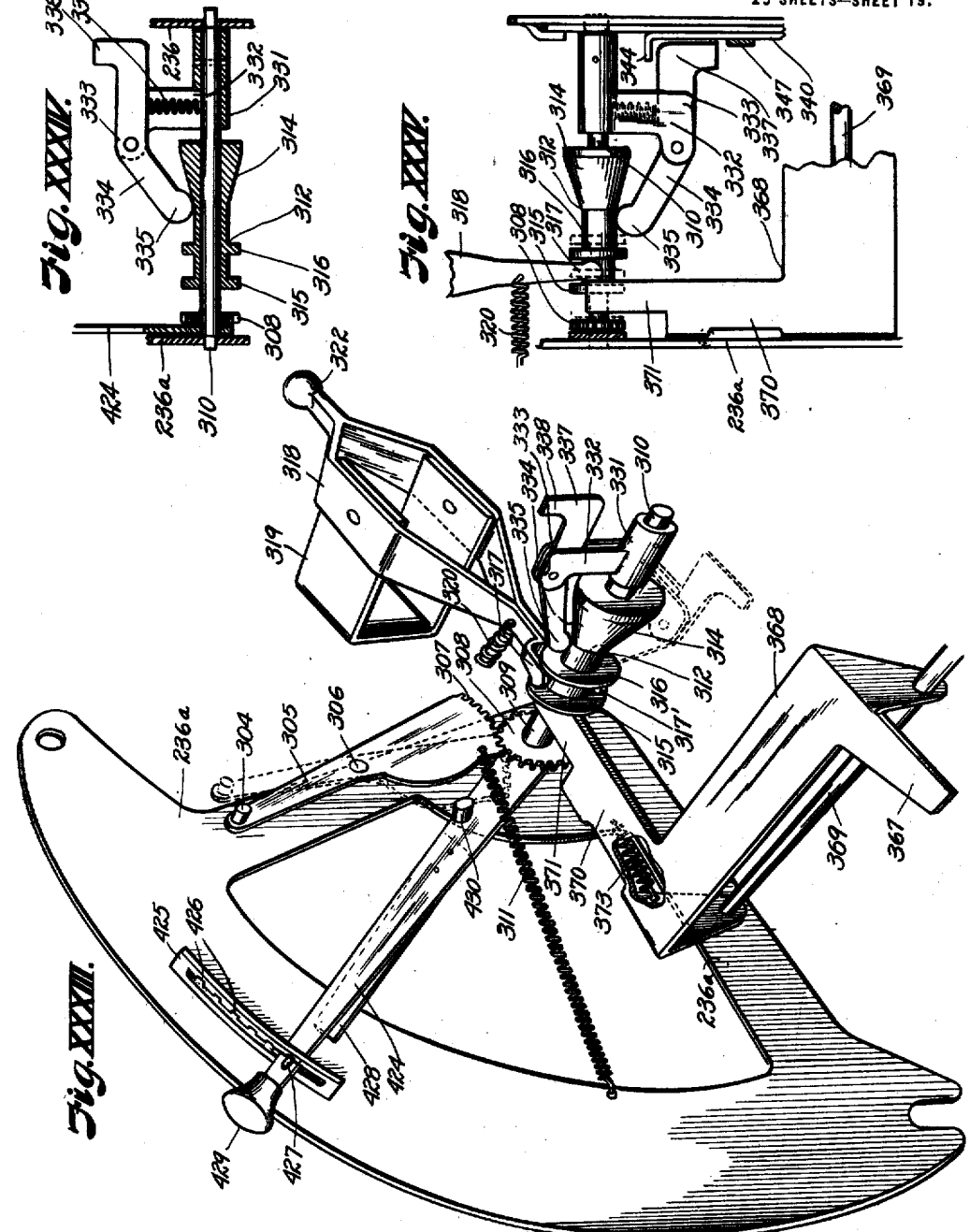

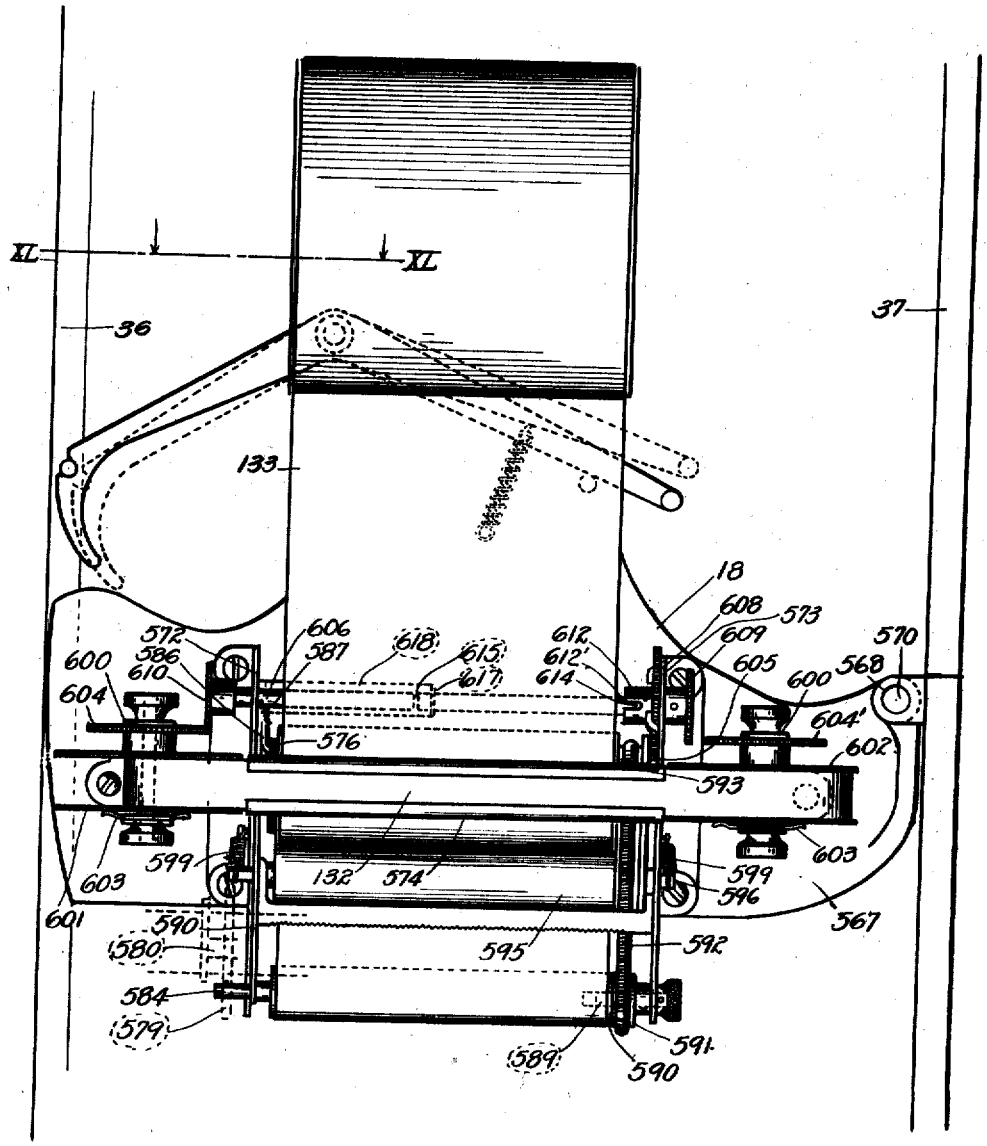

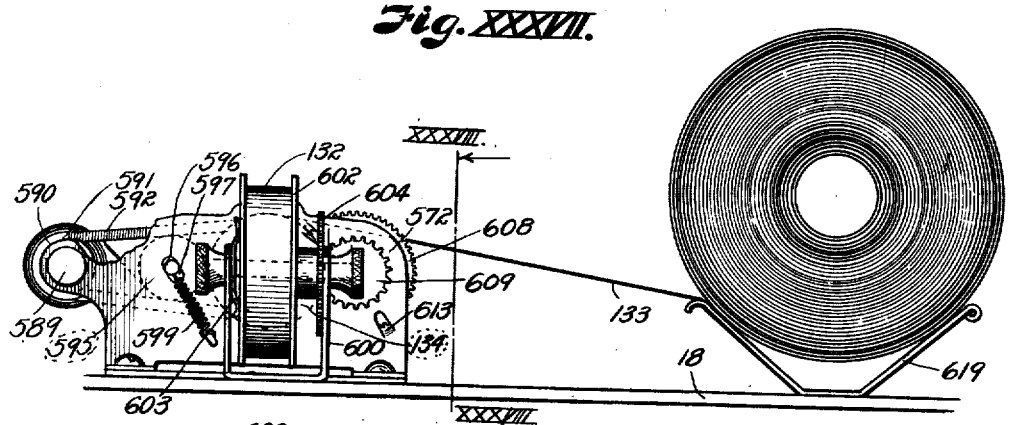

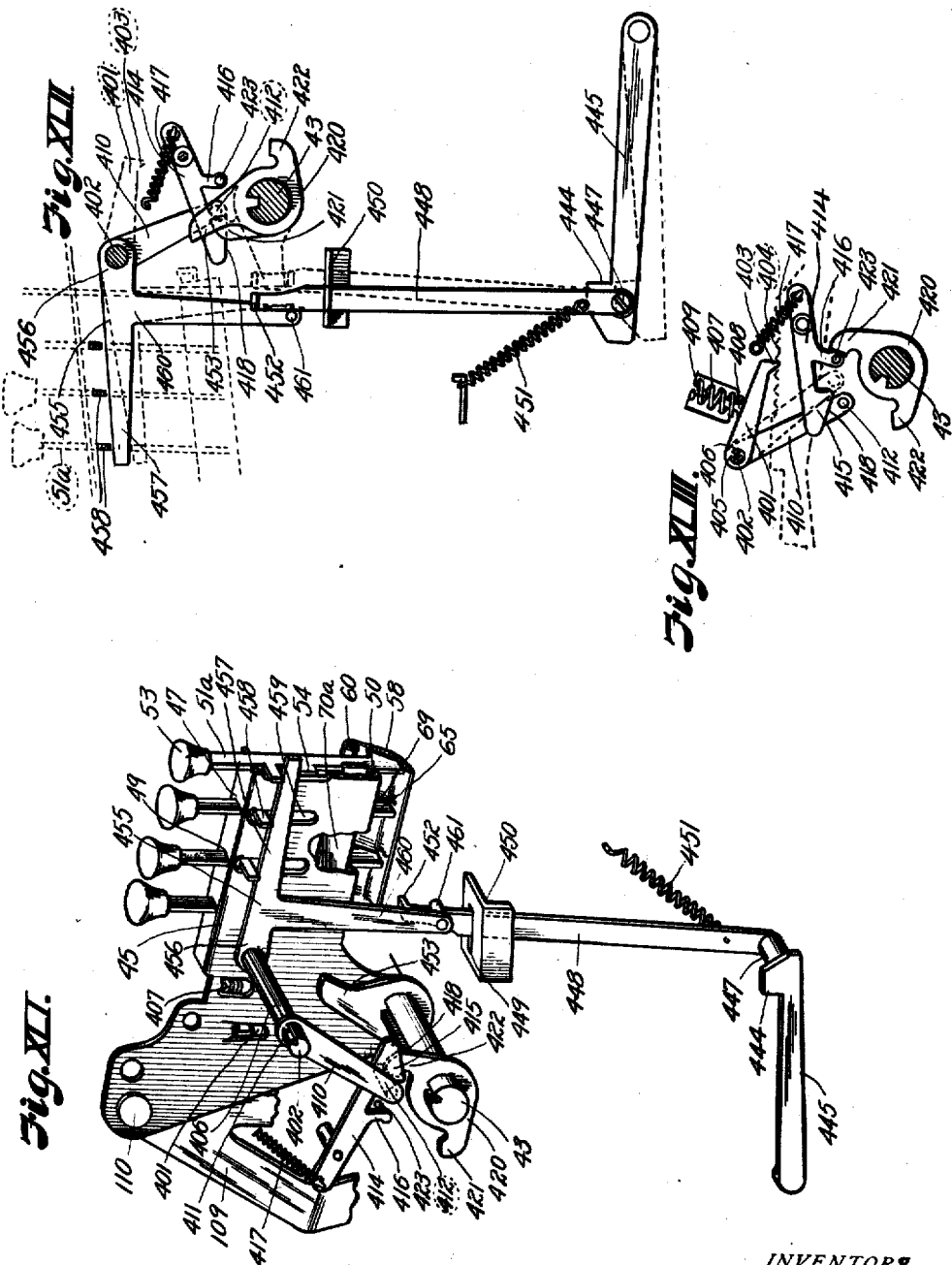

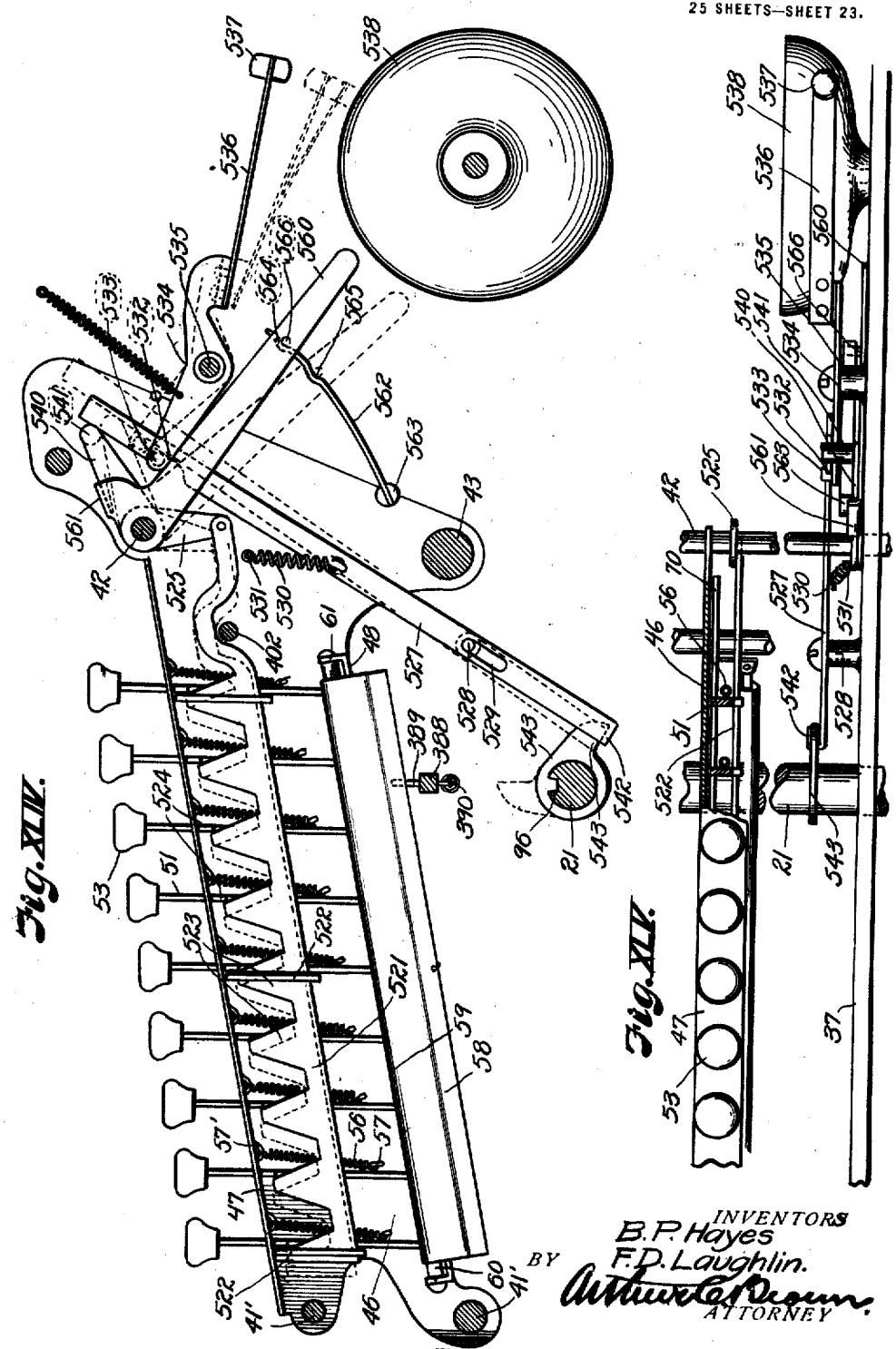

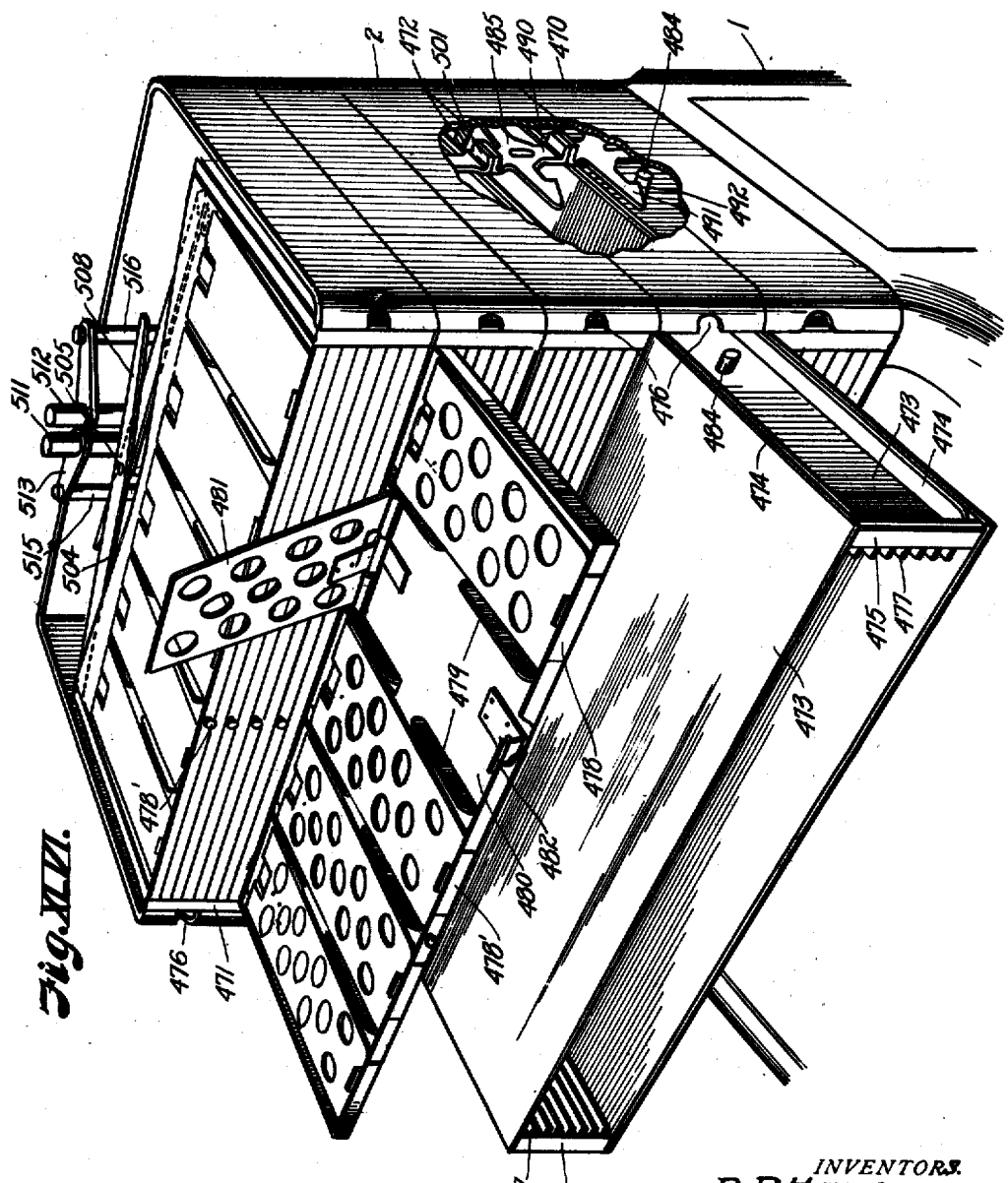

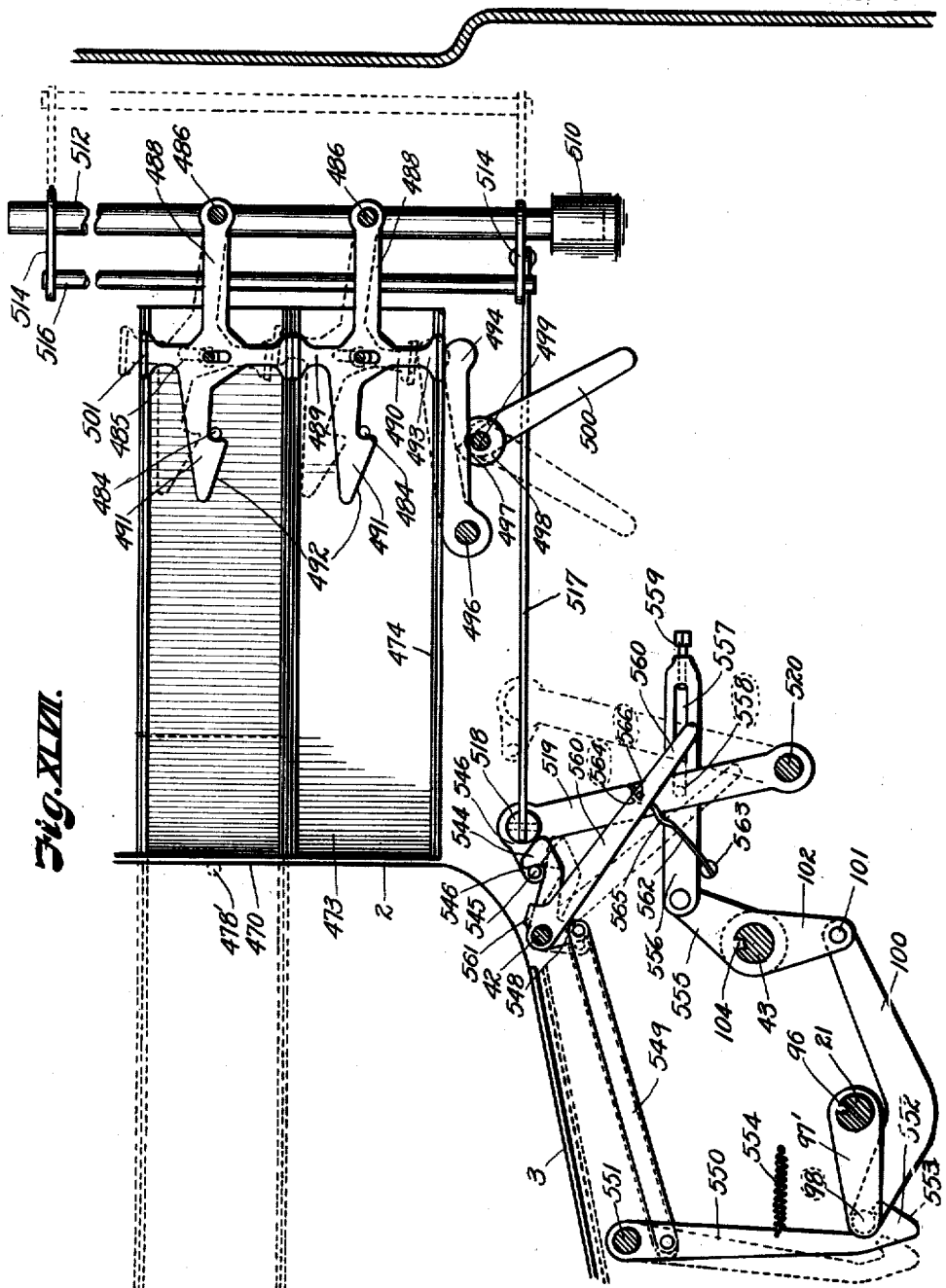

UNITED STATES PATENT OFFICE.

BENJAMIN P. HAYES AND FRANK D. LAUGHLIN, OF KANSAS CITY, MISSOURI, ASSIGNORS TO AUTOMATIC BOOKKEEPING REGISTER COMPANY, OF KANSAS CITY, MISSOURI, A CORPORATION OF DELAWARE.

ACCOUNTING-MACHINE.

1,340,827.   Specification of Letters Patent.   Patented May 18, 1920.

Application filed August 7, 1916. Serial No. 113,656.

*To all whom it may concern:*

Be it known that we, BENJAMIN P. HAYES and FRANK D. LAUGHLIN, citizens of the United States, residing at Kansas City, in the county of Jackson and State of Missouri, have invented certain new and useful Improvements in Accounting-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to an accounting machine and has for its principal object to provide a machine in the nature of a cash register, whereby transactions of different nature may be entered on a proper register, the clerk, the customer and the nature of the transaction identified, and the amount of the transaction recorded through the intermediacy of a keyboard, the register and printing mechanism.

It is also our object to provide in connection with the parts above mentioned a filing device that is usually locked to prevent access being had thereto, except for entering suitable transactions, but which is controllable from the main portion of the machine so that it is automatically unlocked following manipulation of the machine for transactions that are to be entered on the tickets in the filing device.

The machine is particularly adapted for use in stores or shops having credit accounts, where cash and C. O. D. sales are made, where clerks pay out money and receive payments on account from customers, and where other transactions are had of which it is desired to keep separate record. In order that a total record of the different kinds of transactions may be kept, we have included in the machine an accumulating register for each kind of transaction which it is desired to total, and provided keyboard mechanism whereby the proper register may be selected for operation when the transaction is to be entered.

As the machine is adapted for entering transactions for credit customers it is also desirable, in order to properly check the accounts, that the transaction record include the designation of the customer with the amount of the transaction, and in order to accomplish this object we designate the customers by numbers which correspond to trays in which the customers' account slips are kept, and which are indexed with the numbers of the respective customers.

As a number of clerks may enter transactions on the machine it is also desirable that the clerk entering a transaction may be properly identified in connection with the entry, and for this purpose we provide the keyboard with clerk identifying members, which must be operated in order to release the machine and filing device and which affects the printing mechanism, so that the designation of the clerk, as well as the designation of the customer, is printed with the amount of the transaction.

As the customers slip trays are only required when certain transactions, such as the entry of a charge or a payment credit are to be made, and are not required when cash sales or money paid out, etc., transactions are had, the operating mechanism is so arranged that the trays are only released when they are required, and at other times remain locked and are not accessible to either the clerks or anyone who might attempt to gain information from the slips through curiosity, or for any purpose.

The general objects and purposes of the machine above stated, and other objects and purposes hereinafter described, are attained with improvements in mechanism, the preferred forms of which are illustrated in the accompanying drawings, wherein:—

Figure I is a perspective view of a bookkeeping register embodying our improvements, the cash and record mechanism drawers, the register cover and one of the customers slip trays being open.

Fig. II is a side elevation of the machine, part of the interior mechanism being shown in dotted lines.

Fig. III is a horizontal section on the line III—III, Fig. II.

Fig. IV is a side elevation of the printing and register mechanism on the line IV—IV, Fig. III.

Fig. V is a similar view on the line V—V, Fig. III.

Fig. VI is a longitudinal vertical section on the line VI—VI, Fig. III.

Fig. VII is a cross-section on the line VII—VII, Fig. IV.

Fig. VIII is a plan view of the operating elements of the machine; the case being removed.

Fig. IX is a detail perspective view of one of the keyboard register and printing record units.

Fig. X is a front elevation of one of the key posts, showing the post housing in vertical section and illustrating the parts in non-functional position.

Fig. XI is a similar view showing the parts in functional position.

Fig. XII is a side elevation of the printing record mechanism of one of the keyboard units.

Fig. XIII is a cross section of one of the type sectors on the line XIII—XIII, Fig. XII.

Fig. XIV is a detail perspective view of the printing actuating mechanism, showing its operative relation to the main shaft.

Fig. XV is a detail perspective view of the hammer latches, particularly illustrating the overlaps for inducing the carry-over to the right of an active printing key.

Fig. XVI is a detail elevation of one of the hammer latch carrying arms.

Fig. XVII is a detail side elevation of the printing hammer mechanism in normal position.

Fig. XVIII is a similar view of the parts at a point in their movement to set position.

Fig. XIX is a similar view of the parts as they appear when the hammer strikes a type member.

Fig. XX is a detail perspective view of the main shaft showing its relation to a bank of key levers, and its operating relation with the register setting lever.

Fig. XXI is an enlarged front elevation of a part of the shift bar, whereby the latch wings of all the key post banks are simultaneously released.

Fig. XXII is a detail side elevation of one of the register actuating units, showing the parts in normal position.

Fig. XXIII is a similar view showing the parts in set relation.

Fig. XXIV is a similar view showing the parts as they appear when the register has been advanced but prior to the return of the register to normal position.

Fig. XXV is a detail perspective view of one of the register wheels and its controlling mechanism.

Fig. XXVI is a front view of the register and register selecting mechanism.

Fig. XXVII is a side elevation of the register supporting and manual selecting mechanisms looking from the line XXVII—XXVII, Fig. XXVI.

Fig. XXVIII is a view of the register supporting mechanism, looking from the line XXVIII—XXVIII, Fig. XXVI.

Fig. XXIX is a cross-section on the line XXIX—XXIX, Fig. XXVII.

Fig. XXX is a side elevation of the register selecting mechanism.

Fig. XXXI is a plan view of the wing latch shaft mechanism.

Fig. XXXII is a detail perspective view of the manual register selecting mechanism.

Fig. XXXIII is a perspective view of the shipper mechanism for the register selecting parts.

Fig. XXXIV is a longitudinal section of the shipper cam and lever.

Fig. XXXV is a plan view of the same, including the shipper locking bracket.

Fig. XXXVI is a plan view of the printing and web carrying mechanism.

Fig. XXXVII is a side elevation of the same.

Fig. XXXVIII is a sectional view through the positioning table on the line XXXVIII—XXXVIII, Fig. XXXVII, particularly illustrating the ribbon shift.

Fig. XXXIX is a detail view of the ribbon shifting and web forwarding mechanism.

Fig. XL is a section on the line XL—XL, Fig. XXXVI, particularly illustrating the printing table latch and a part of the type sector locking mechanism.

Fig. XLI is a detail perspective view of the cash drawer releasing mechanism, showing its relation to certain of the keys in the transaction designating bank, and showing the parts in normal relation.

Fig. XLII is a reverse view of the same parts.

Fig. XLIII is a side elevation, showing the operating dog and key bar latch in functional position.

Fig. XLIV is a side elevation of the gong ringing mechanism and its connection with the clerk designating key posts.

Fig. XLV is a plan view of the same.

Fig. XLVI is a detail perspective view of the filing device, parts being removed and broken away for better illustration.

Fig. XLVII is a side view illustrating the filing device and main shift locking mechanism.

Referring more in detail to the drawings:—

1 designates a case within which the operating parts of the machine are inclosed, and 2 a filing device comprising customers' slip trays, the case 1 including a keyboard panel 3 and a register panel 4, the latter panel having apertures 5 through which numbers on the register wheels may be observed, slots for the push button posts 6 that effect position of the registers for taking totals, a slot 7 for a key whereby a register may be selected when the device is to be used as an adding machine, and an aperture 9 through which a locking lug 10 on the cover 11 may be projected. The panel 4 is normally inclosed by the cover 11 which is hingedly mounted and provided with a stop bracket 12 whereby its opening travel may be limited. The panel 4 extends over about one-half of the front end of the mechanism case 1 and the mechanism is, as hereinafter mentioned, arranged back of the panel and occupies but a portion of the interior of the case; the remainder of the interior being taken up with a cash drawer 14 that may be opened and closed under suitable control from the operating mechanism and with a ticket drawer 15 for receiving memoranda, receipts, and the like, having to do with transactions entered in the machine. The panel cover cash drawer and ticket drawer may be locked so that access to the register panel and to the drawers may be had only by the proprietor or other proper person.

In the side of the case 1 is an opening 17 through which the printed record mechanism may be extended to the exterior of the machine where it may be readily observed; the parts of the printing record being mounted on a platform 18 that may swing from and into the case, and the opening being provided with a door 19 which may be closed and locked to prevent unauthorized access to the machine.

The machine also comprises a main shaft 21 whereby the manually operated parts are actuated by a crank 22 that is fixed to the shaft at the exterior of the case.

As the machine is adapted for registering and recording amounts of transactions, such as credit sales, cash sales, money paid by a customer on account, money paid out, and invoices received, and as a separate registration should be made for each class of transactions, we have provided the separate registers, 24, 25, 26, 27 and 28, upon which the entries of such items may be accumulated, and have provided for recording the individual items on the record web under designations indicating the character of each entry, so that the total of each class of transaction may be shown on the register and the individual transactions shown on the printed record. The transaction bank 30 of keys on the keyboard also includes other key levers for other transactions; the present embodiment including, in addition to the five named, keys marked "General," "Mdse." "C. O. D." and "Consignment," although we do not wish to be understood as limiting ourselves to these particular designations, as it is readily apparent that the same may be varied, added to or subtracted from. As the four additional classes of transactions do not primarily have to do with daily entries, or frequent daily transactions, we have provided no separate registers for them, but they are adapted for effecting actuation of the printing mechanism, so that they may designate on the printed record the particular transaction to which they have reference.

When using the keys for the additional transactions, the clerk or person entering the transaction from the keyboard is supposed to write a memorandum of the transaction and place it in the drawer 15, so that the proprietor may know the nature of the transaction when he checks up at the end of the day.

As the machine is an accounting machine it is also necessary in order that the daily transaction may be checked to identify on the printed record each individual transaction or operation of the machine wherein a charge is made to a particular customer. This is effected by giving each customer a separate number and providing for printing this number on the record web.

The present embodiment of the machine provides for numbers of three figures so that transactions with customers numbered from one to nine hundred and ninety-nine may be entered and designated on the printed record. The entry of the customer's number is controlled by the three banks 31 of keys shown to the right of the transaction bank 30.

As a number of clerks may use the machine for entering sales or other transactions it is very desirable, in order that possible errors or mistakes may be rectified, to know which clerk made a particular sale, paid out money, or received money on account, and we, therefore, provide for designating on the printed record the clerk who entered each particular item, and in order to insure the entry of the clerk designation at the time each transaction is had we place the control of the customers' slip trays and the cash drawer under the clerk designating keys, so that the printing and register mechanism can not be operated, the trays used or the cash drawer opened until the clerk has depressed his designating key. With this arrangement, each clerk has a particular key which he must operate when making a sale or for any other transactions that require operation of the machine. The clerk designating keys are shown in the bank 32 at the center of the keyboard.

The machine also necessarily embodies figure keys, here shown to be of five columns and arranged in banks 33, which operate in the manner of an adding machine, the particular mechanism of the present machine being hereinafter specifically described.

In order that the reader may better understand and follow the description of the mechanisms we will first state generally the use of the machine.

In the initial condition of the machine the registers are all at cipher, the register panel cover, the cash and memorandum drawers, and the filing device locked, so that access may be had to neither or such parts. Should a credit customer purchase goods, the clerk, after making the sale enters the same in the machine by first depressing the designation key in the bank 30 to designate that the transaction was a credit sale, he then enters the customer's number by depressing proper keys in the banks 31, and registers and records the amount of the sale by proper keys in the banks 33. The actuation of the several keys sets up the mechanism in the machine for registering and recording the sale, but it is impossible for the clerk to file his duplicate sales slip in the customer's slip tray until his key in the clerk designating bank 32 has been depressed. Before making the registration record, therefore, he must depress his proper key and depression of this clerk designating key unlocks the machine and filing device so that the main shaft may be operated to complete the registration and record printing, and the proper tray in the filing device opened in order that the slip may be placed therein.

In actual practice, all of a customer's slips are kept in the proper trays so that the customer's balance may be carried forward for each transaction and the amount of the balance may be readily ascertained from the last slip in the tray. The depression of the credit sale key does not unlock the cash drawer, but this drawer is automatically unlocked upon manipulation of the cash sale key and actuation of the main shaft when a cash sale is made, or when an entry of money paid out or money received on account is to be entered, and the proper keys for these transactions are depressed.

*Selecting bars.*

Referring first to the register mechanism, 36—37 (Fig. VII) designate supporting frame plates that extend from front to back of the machine within the casing 1 and are held in position and in spaced relation by cross-rods 38 that extend through suitable apertures in the frame plates and the sides of the casing; the plate 37 being spaced from the case by bosses 39.

Supported within the frame, by cross-rods 40, 41 and 41' (Fig. IV) and by the rotatable shafts 42—43 are key post frames 45 (Fig. IX) for guiding the posts of the keys in the keyboard heretofore mentioned; there being an individual key post frame for each bank of keys in the keyboard, in other words, a machine having ten banks of keys would comprise ten individual key post frames, but as each of the frames and its set of parts is identical with each of the others we will specifically describe but one with the understanding that such description relates equally to all, the present machine, in so far as it relates to the actuating bar and single registering mechanism being similar to like parts forming the subject matter of Patent Number 1,271,466, issued to Benjamin P. Hayes on July 2, 1918.

46 (Figs. IX to XI inclusive) designates the body of the frame which is fixed rigidly in position, as before described, and has no movement itself although it carries and supports movable elements; the said body consisting of a sheet metal plate having laterally turned flanges 47 and 48 at its upper and lower edges, the flanges 47—48 having registering slots 49—50 therein which are spaced equally throughout the length of the flanges and each frame having nine pairs of slots to accommodate nine key posts 51 that are slidably mounted in said slots and extend through slots 52 in the inclined top of the keyboard casing; the said posts carrying buttons 53 at their upper ends exteriorly of the housing where they may be accessible to an operator. The buttons 53 for the numeral keys bear numerals from one to nine with the lowest numeral at the bottom or forward end of the machine and the highest numeral at the top, so that the numerals run consecutively from one to nine, starting from the bottom or front of the machine. The keys in the transaction designating and clerk identifying banks preferably bear other designations, such as abbreviations of words or letters whereby the keys may be properly selected.
The posts 51 for each bank of keys constitute setting devices for determining the movement of a selecting bar whereby the register wheel for that particular key bank is actuated and whereby stop mechanism for determining the position of the type mechanism for said bank is fixed, and each post comprises a stop 54 consisting of a projection from one edge of the post, and which is adapted for engaging a relative stop 55 (Fig. V) on the selecting bar when the post is lowered to functional position. Each post is held elevated by an individual spring 56 which is connected with a hook 57 on the post and with a hook 57' that is stamped from the upper frame flange 47 and normally, yieldingly retains the post in elevated or normal position and automatically returns the post after it has been lowered; the upper position of the post being determined by a stop 51' on the post which engages the under face of the flange 47 on the frame body.

As movement of the selecting bar does not occur until after a post has been lowered to initial position, latch mechanism is provided for holding the post down to control the selecting bar until the register and printing operations have been completed. This holding or post latch mechanism comprises a wing 58 consisting of a curved metal plate having a collar 59 formed on its upper edge and fixed to a rod 60; the ends of which are pivotally mounted in ears 61 (Fig. V) that stand upwardly from the ends of the lower housing plate flange 48; the width and curvature of the wing being such that its lower free edge is normally projected beneath the lower free ends of all of the posts 51 in that bank when the posts are in normal or inactive position, the wing being held in such normal position by a spring 63 which is connected with the free edge of the wing and with a hook 64 that is stamped from the body of a frame plate 46. The lower free end of each post 51 comprises a head 65 having a shelf portion 66 projecting from the edge of the post opposite the stop 54 and which is beveled downwardly from the shelf to form an inclined bearing 67 that is adapted for riding over the edge of the wing upon initial upward movement of the post, an interval space section 68 that is adapted for movement over the edge of the wing in a vertical plane to afford vertical movement of the post over the edge of the wing for an interval in which the wing remains stationary, and a curved nose 69 whereby the wing may be displaced upon downward movement of the post.

The head 65 is shaped to effect displacement of the wing upon initial downward movement of a post, so that the lower edge of the wing is moved off of the shelf portion 66 of a previously held post and onto the inclined part 67 thereof, so that the previously held post may be returned to normal position by its spring 56 before the interval space 68 of the succeeding post has reached the edge of the wing, thereby allowing the previously set post time for return to normal position before the succeeding post has reached its holding position on the wing, and thereby obviating the possibility of two or more key posts in the same bank being locked at the same time.

It is apparent that with such a structure, if the succeeding post is lowered to its limit it will release the preceding one and will itself lock, but if lowered only to a point wherein the interval space portion has not left its contact with the wing, it will itself return upon removal of pressure on its button and without catching on the wing, so that the release of any such key may be effected by a partial depression of another key in the same bank to clear the bank.

The selecting bar 70, which has heretofore been mentioned, comprises a single piece of sheet metal of rectangular shape, which is adapted for travel along the frame plate or body 46 between the upper and lower flanges 49 and 50, and is provided at its upper edge with notches 71 forming the forwardly facing and vertically arranged stops 55 which are adapted for contact with the stops 54 on the key posts when the selecting bar is forwarded by the mechanism presently described, in order to limit the forward movement of the selecting bar and thereby limit the effect the bar has on the register mechanism.

The key posts 51 have nothing to do with actuating the selecting bar but act as stops to limit the movement of the bar at determined points in order to limit the degree of movement of the register mechanism; the movement of the bar being effected by a spring 74 (Fig. IX), one end of which is attached to a hook 75 that is stamped from a frame plate 46 and the other end of which is connected with a pin 76 that is fixed to the selecting bar 70 and projects through a slot 77 in the plate 46, so that when the selecting bar is released by the handle crank, as presently described, the spring will advance the bar until it engages a depressed key post, or until a cipher stop portion of the bar engages a stop portion on the wing. The crank member just mentioned normally holds all of the selecting bars in the machine at initial position, but when actuated frees all of the bars to the action of their springs, so that all of the bars in the banks wherein no key posts have been depressed may move to a cipher position, and the bars for which key posts have been depressed may be moved until stopped by said key posts. Each of the bars 70 is held to its housing plate by key heads 79—80 which are stamped from the bar and have shank portions 81—82 slidably mounted in slots 83—84 in the housing plate, the slots having enlarged portions 85—86 through which the heads may be projected to seat the shanks in the slots, but which are so located as to obviate accidental displacement of the heads, and the slots being located in parallel, horizontal planes so that although the notched portion of the selecting bar is inclined the travel of the bar is horizontal.

To effect the stop of each selecting bar at the cipher position we provide the bar with a slot 88 in its under edge and provide the wing 58 with a tooth 89 which seats in the bar slot when the wing is in normal position but moves out of the bar slot when the wing is lowered by depression of any of the key posts; it being apparent that with this arrangement should the bar be released by the main crank without any key posts having been depressed, the selecting bar will move under tension of its spring until stopped by the wing tooth 89; the width of the slot 88 being such as to permit sufficient movement of the bar to shift the register mechanism one space. Should any key post in the bank have been depressed, however, it will upon moving the wing remove the wing tooth, so that the bar is free to move until stopped by the depressed key post.

It is apparent that in order that the bar may move to its selecting position for locating a particular character on the type mechanism and registering wheel in functional position, there must be an increment movement of the bar relative to the type member post. This increment is provided for by spacing the posts equal distances apart and constructing the stops on the selecting bar of equal length, and of a length slightly in excess of the spacing between the individual posts.

With this arrangement, supposing the post to be spaced seven-eighths of an inch apart and the stops to be spaced one inch in length, the first stop on the selecting bar is fully a quarter of an inch back of the first position, the second stop three-eighths of an inch back of the second position, and other stops of increasingly greater distances back of their respective posts throughout the length of the bar.

When the type bar and register wheels that are controlled thereby are so arranged that one-eighth of an inch of movement will throw the bar and wheels from one position to the next, it is apparent that the increment in the selecting bar is sufficient to properly space the bar and wheels for characters represented by a like character on a relative key member; the inclined stepped arrangement of the bar and key post stops providing that should it be necessary for one of the rear bar stops to pass beneath an inactive key post stop to reach its active post stop, the inactive key stop beneath which the active bar must travel will not interfere with such travel.

It is also apparent that as each selecting bar has the initial cipher movement independently of the key post setting, and as the proportionate movement of each bar must have an increment proportionate to the space between the type members, the first key post must be spaced from its selecting bar stop a distance equal to twice the distance of movement to the cipher stop, so that when the first key post is lowered the bar carries the printing mechanism past the cipher position and until the figure 1 is in printing position. As the figures on the type members and register wheels are spaced equally, the selecting bars must move a relatively greater distance for each higher number or for a constant increment, having the cipher movement as a base.

Referring now to the crank mechanism whereby the movement of all the selecting bars is controlled, 21 (Figs. IV, V, VI, and XX) designates the main crank shaft which is rotatably mounted in the right-hand side of the case 1 and in the frame members 36 and 37; the crank arm 22 being fixed to the end of the shaft which projects from the side of the case and the said shaft being yieldingly held in initial position wherein the crank is at the rearward limit of its movement, by a spring 92 which is connected with a cross rod 38 that extends between the frame members 36 and 37 and with the tooth 93 of a collar 94 that is fixed on the crank shaft. The collar 94 is preferably fixed against rotation on the shaft by a tooth 95 that seats in a longitudinal groove 96 in the shaft so that the collar may be moved to place along the shaft but is held against rotation by engagement of the tooth with the walls of the groove; the collar 94 being spaced from other similar collars on the shaft by sleeves 21′ on said shaft.

Also keyed on the shaft 21 are spaced arms 97—97′ which are connected at their ends by a pin 98; one end 99 of which projects laterally from one of the arms.

Pivotally mounted on the pin 98 is one end of an elbow lever 100, the other end of which is pivotally mounted on a pin 101 that connects the free ends of arms 102— 102′ that are keyed on the control shaft 43 that supports the lower rear corners of the selecting bar housing 45; the control shaft also having a longitudinal groove 104 whereby the arms 102—102′ are keyed to the shaft in the same manner as the arms 97—97′ on the shaft 21.

Also keyed on the control shaft 43 are levers 105, which are spaced by sleeves 105′ there being an individual lever for each of the selecting bars 70, and each of said levers projecting along the side of its respective selecting bar in position for engagement by a stud 107 that is mounted on and projects laterally from the selecting bar. With this arrangement the spring 92 normally retains the shaft 21 so that the crank and the selecting bar control arms 106 are at the rear limits of their travel; the spring 92 being stronger than the combined force of the selecting bar advancing springs 74, so that the selecting bars are held rearwardly against the tension of their springs; it being apparent that when the main crank is moved forwardly the main shaft 21 is rotated in a direction to rock the control shaft 43, and move the arms 106 forwardly to allow the selecting bars to advance under tension of their springs until said bars are stopped by the cipher stops or key posts heretofore described.

While we have designated the bars 70 as selecting bars it is not through these bars that the actuation of the printing mechanism takes place, as the only direct actuation accomplished through the bars 70, is that of the register, and the actuation of the register takes place on the return movement as distinguished from the initial forward movement of the bars. The bars 70 do, however, determine the extent of movement of the type carriers, and as the positioning of the type carriers is the first phase of movement after the selecting bars have shifted, we will describe the printing mechanism as the next step.

*Printing mechanism.*

The printing mechanism is best illustrated in Figs. V and VIII to XIX inclusive; the printing table with the web roll, the inked ribbon and ribbon mechanism being illustrated in Figs. XXXVI to XL inclusive.

As the bars 70 must be spaced sufficiently to accommodate the latch wing mechanism and other parts of each bank of key posts, considerable distance must be left between the bars, but as it is desirable to concentrate the type members in order to limit the width of the column of printed figures, we centralize the type members at the rear of the machine. This centralization is accomplished by bending the sector arms from their point of attachment with the selecting bars; it being apparent that arms on the bars near the center of the machine need be bent but slightly while the extent of the bend is increased as the selecting bars approach the sides of the machine (Fig. VIII).

As the type members and their mechanisms are identical in construction and operation, but one will be described in detail with the understanding that such description relates equally to all. The type set for each selecting bar or key bank comprises an arm 109 that is pivotally mounted at its upper end on a stud 110 on the relative selecting bar frame or housing 46, and fixed to the lower end of said arm is a sector 111 which carries the type for that particular bar or register. The type members 112 are mounted on the sector by means of a frame 113 which is permanently fixed to the side face of the sector and has the same curvature thereof. The frame 113 comprises the outer face and the top 114 and bottom 115 having slots 114' and 115' respectively and forming the chamber 116 between the walls of the frame and the outer face of the sector.

Slidably mounted in each pair of slots 114'—115' is an individual type member 112 having a type character 117 at its outer end and an offset head 118 at its inner end; the latter adapted for engagement by a hammer presently described to effect the operative movement of the type member, and the head also serving to limit the striking movement of the type member by engagement thereof with the inner wall of the frame. Each type member is held elevated or in idle position by a spring 120 which seats against the lower wall of the frame and against a lug 121 formed integral with the type member and forming a rest for the inner end of the spring and a stop for engagement with the upper wall of the frame to limit movement of the type member under influence of the spring. The arm 109 has a finger 123 spaced from its body portion and radial therewith, and the selecting bar 70 has a head 124 at its rear end provided with a depending arm 125 (Fig. IX) which is pivotally connected with the type sector finger 123, so that when the selecting bar moves forwardly it carries the type sector arm and type sector with it. The sector is thus moved through the arc of a circle and stopped with the selecting bar, so that a type member corresponding to that of the selected key is located in printing position.

While the spring 74 that advances the selecting bar would also serve to carry the type sector forwardly, we supplement the spring 74 with a spring 126, one end of which is connected with a hook 127 on the selecting bar housing and the other with a pin 128 on the type sector arm. As the selecting bar moves in a straight line and the type sector in a curved path, we provide the finger 123 with a slot 129, through which the stud 130, whereby the finger is pivotally connected with the selecting bar head, may slide during the forward and back movement.

The printing is effected by striking the type members against an inked ribbon 132 that overlies a paper web 133 and a platen 134 (Figs. XXXVI to XXXIX inclusive), the detail construction of which will be hereinafter described and the movement of the hammers is effected by hammer mechanism comprising an individual hammer for each set of type members.

The hammer mechanism is contained within a sub-frame comprising the transverse horizontal beam 136 Figs. XII to XIX and the horizontal beam 137, which are carried by the main frame members 36 and 37. The beam 137 has a comb 138 fixed thereto and depending from its rear edge, the teeth 139 of which form guides for the several type carrying sectors 111, and has a comb 140 extending horizontally from its upper edge; the teeth 141 of which form guides for the hammer heads 142. Each head 142 comprises a striking portion 143 which is adapted for engaging the inner end of the type members when the head is dropped, and the head is formed integrally with the neck 144 that is curved downwardly at its forward end and comprises a rear mounting head 145. The mounting head 145 is pivotally mounted on a shaft 146 that is carried by the sides 147—148 of the printer sub-frame.

While the selecting bar effects the setting movement of the type sector, as described, the actuation of the hammer is effected through a different mechanism, operable from the main crank shaft. This mechanism comprises a cam 150 which is fixed on the main shaft 21 by a tooth 151 that seats in the longitudinal groove 96 in the shaft, and has a cam face 152 adapted for engagement with the roller 153 on the end of a lever 154 which is fixed on the shaft 146, and has a tooth 156 that seats in the longitudinal groove 157 in said shaft; the lever 154 being yieldingly urged in the direction of the cam by a spring 158, having a hook 159 seated in a notch 160 in the short arm of the lever 154 and a hook 161 at its opposite end connected with a hook 162 that is attached to the transverse bar 136. The long arm of the lever, which carries the roller 153, is provided with ears 163 that overlie the sides of the cam and serve to hold the roller in contact with the cam surface.

The shaft 146 is rotated by the lever 154 under the actuation of the cam 150, but rotation of the shaft does not primarily actuate the type striking hammer as the mounting head of the hammer is rotatable on the shaft and is only actuated through intermediate mechanism which we will now describe:

Fixed on the shaft by the tongue 165 (Figs. XII to XV) which takes in the shaft groove 157 is the head 166 of an irregular shaped bar 167, and pivotally mounted on said bar by a stud 168 is a latch 169; the rear end of which overlies the upper edge of the type sector 111 and has a foot 170 in normal engagement with said inner edge of the sector; the latch being yieldingly urged to hold the foot in engagement with the sector edge by a spring 171, one end of which is connected with a hook 172 on the latch, and the other end of which is connected with a hook 173 on a trip 174 that is pivotally mounted on an extension 175 of the frame bar 167 by a stud 176. The cam member 150 on the crank shaft and the lever 154 on the sub-frame shaft are so arranged that there is an initial idle movement of the cam before starting to rock the lever (Fig. XIII), but there is no idle movement of the sector as it is positively connected with its selecting bar 70 so that as the selecting bar starts its forward movement immediately upon movement of the crank shaft, the sector has initial movement prior to any movement of the cam actuated lever 154 and the shaft 146. This initial movement of the sector carries the forward end of the sector along the foot 170 of the latch 169, and the forward end of the sector at its upper edge has an incline 178 whereby the latch is rocked upon initial movement of the sector. This rocking movement of the latch carries a laterally directed tooth 180 on the forward end of the latch back of a shoulder 181 on the mounting head of the type-striking hammer, so that when the shaft 146 is rotated and carries the bar 167 with it, it rotates the bar and the latch which is carried by the bar, and the latch, being in engagement with the hammer, rotates the hammer on the shaft.

The trip 174 to which the latch is connected by spring 171 comprises the tooth 183, which normally rests in a seat 184 on the latch, and is yieldingly urged to the seat by said spring. When the latch is rocked by the incline on the sector in order to rock the hammer the spring urges the trip about its pivotal point as soon as the crank shaft has moved and permitted the rod 205 to free the trips 187, as will presently be described and carries the tooth onto a seat 185 on the rear edge of the latch hook, which is sufficiently offset from the seat 184 to hold the tooth 180 in its locking engagement with the shoulder on the hammer mounting head.

The parts are so arranged that when the crank shaft has reached the forward limit of its travel and the hammer has been lifted to its upper limit through the action of bar 167, the latch will be rocked to release the hammer, so that it may be freed from its holding parts and lowered to strike the type; the release of the hammer being effected by the arm 187 on trip 174 that is extended beneath the comb 140 which guides the hammer head and is adapted for engaging said comb as the hammer reaches its upper limit. When the trip 187 engages the comb, its movement is stopped, but the bar continues and carries the latch along with it so that the latch pivots and the trip tooth 183 is moved off of the seat 185 and back of the seat 184. When the tooth is moved as described, the spring 171 draws the latch rearwardly and unseats the tooth 180 from the hammer mounting head shoulder and frees the hammer so that it may pivot on its carrying shaft. The hammer is thus freed to effect its striking function. Movement of the hammer might be induced by gravity, but is, in fact, induced by the following spring thrust. This mechanism comprises the head 188 (Figs. XVII—XIX) having an oval slot 189 therein through which the shaft 146 extends and having a shank 190 that is slidably mounted in a slot 191 in a rail 192 that is fixed on the frame bar 136; a coil spring 193 being connected with the rail and with a hook 194 on the said shank to yieldingly urge the head 188 forwardly. The head 188 has ears 195—196 above and below the shaft respectively that are adapted for engaging ears 197 and 198 on the mounting head of the hammer. When the parts are in normal position both of the ears on the actuating head 188 are in engagement with the respective ears on the hammer mounting head and the hammer is balanced in its normal position. When the actuating bar 167 is rotated and the hammer lifted as before described, the lower mounting head ear 198 engages the lower slotted head ear 196, and moves the slotted head forwardly and tensions the spring 193, this tension increasing until the hammer reaches its upper limit. When the hammer is released by being unlatched as described, the tension of the spring 193 draws the slotted head forwardly and the slotted head tooth pushes the lower hammer tooth and rotates the hammer suddenly to impart an impact blow of the hammer head against the selected type member in the sector. The striking member of the hammer head is normally elevated slightly from the inner ends of the type members, but the throw of the hammer under tension of the spring 193 carries the hammer head beyond the balanced position to effect the striking blow. As the hammer is carried past center relative to its mounting, the upper ear 197 engages the upper ear 195 of the slotted actuating head and urges the head forwardly against the tension of the spring 193, the parts reciprocating by reason of the alternate contacting of the slotted head and hammer head ears until they reassume an equilibrium, with the striking member of the hammer head in its normal position slightly above the upper ends of the type members.

It is possible that the trip member 174 that releases the hammer holding latch might stick and prevent the release of the hammer, and in order to obviate such possibility I provide a positive mechanism for rocking the trip. This mechanism comprises bell crank levers 200, which are pivotally mounted on studs 201 on standards 202 on the subframe side members 147—148. The forward ends of the levers carry a rod 203 which is held in engagement with the rear edge of the cam 150 which operates the elbow lever 154 and a paired cam 150' on the main shaft by a spring 204 that is connected with one of the forward lever arms and with the side frame 147. The rear arms of said levers carry a rod 205 that extends from the subframe over all of the trip arms 187, so that as the crank shaft revolves forwardly the lever is rocked to carry the rod 205 out of the way of the trip arms, but as the crank shaft returns to normal position the lever is rocked in the opposite direction and the rod 205 moved downwardly on the trip arms 187 to engage the same and positively move any trip arm that has stuck and thereby release the hammer controlled by that particular trip.

It is understood that the printing mechanism, including the hammer and its actuating bars, which we have just described, is duplicated for each bank of keys, so that the type sector for any bank or column may be moved independently of all of the others. In order, however, to effect an alinement of the printed characters on the record web, all of the sectors must be held in position when set and the type members centered in transverse alinement. In order to effect the alinement each of the sectors 111 is provided at its rear end with upwardly facing teeth 207 (Fig. XII) which are equally spaced to provide ten pockets 208 corresponding to the nine numeral keys in the banks represented by each sector and the cipher which must be present in each printing unit.

Rotatably mounted in the side frame members 36—37, and extending transversely above the ends of the sectors is a shaft 210 (Figs. VIII, and XII), and fixed on said shaft at the left-hand end thereof are spaced arms 211—212 which project forwardly in the machine and are connected at their forward ends by a stud 213.

Pivotally mounted on a stud 214 that projects inwardly from the side frame member 36 is a lever 215, the rear end of which has a fork 215' that straddles the stud 213, and the forward end 217 of which extends beneath an extension 216 (Fig. XX) on the pin 101 that connects the arms 102—102' with the bell crank lever 100, whereby the selecting bar shaft 43 is rotated from the main crank shaft. The upper edge of the arm 217 of the lever 215 has a curvature coaxial with the shaft 43, but is provided with an offset 218 which is adapted for movement beneath the extension 216 when the shafts 21 and 43 reach the forward limit of their travel, so that the lever 215 is free to rock on its pivotal mounting urged to such movement by a spring on the alining mechanism presently described.

Fixed on the shaft 210, over the rear ends of the sectors, is a pair of arms 220—221, which are pivotally mounted on a transverse shaft 223 that carries a plate 224, the lower edge of which is adapted for projection into any of the pockets 208 in the type sectors when pockets of the several sectors are in transverse alinement. The upper end of the plate 224 is reduced to form a neck 225, and on the upper end of said neck is a shank 226 which is slidably mounted in a slot 227 in a bracket 228 which is fixed to adjacent selecting bar frames or housings 46. A spring 230 surrounds the shank and bears against the end of the neck 225 and the bottom of the bracket 227 to yieldingly urge the alinement plate 224 downwardly when the plate is released by the lever 215.

It is apparent that when the machine is in operation and the shaft 43 revolved, the extension 216 will ride along the edge of the lever 215 and the lever will remain idle until the extension reaches the rear limit of its travel and passes over the incline 218, when the spring on the alining plate will rock the parts to lower the edge of the plate into the alining sector pockets and hold the sectors in proper position, and that the alining mechanism will operate prior to the striking blow of the type hammers.

Upon reverse movement of the main shaft, the extension 216 rides up the incline 218 and rocks the lever 215 back to initial position against the tension of the aliner spring and releases the sectors so that they may return to initial position when the selecting bars are moved back by the arms 106 on the shaft 43.

As before stated, there is a type sector and an individual hammer mechanism for each bank of keys so that a character in any column may be set up and when set up will be first printed on the record web and then entered on the register as to those banks affecting the register.

The machine which we show includes five figure columns, so that an entry of $999.99 may be made. Should an entry, however, amount to say—$90.00, it would only be necessary to depress the "9" post in the tens column, i, e., the "9" post in the fourth bank from the right of the machine. In order to record the complete numeral, however, the four ciphers to the right of the tens columns should be printed. If the number had been one including a figure other than cipher, the hammer and latch mechanism would have been set up so that the release of the printing hammer would be effective through the mechanism described, but if only the ciphers would occur none of the posts for the cipher columns would be depressed.

In order to effect the printing of the ciphers, therefore, we provide for automatically releasing the hammer for any column to the right of the column wherein a post has been depressed; this mechanism comprising a laterally turned ear 232 (Fig. XV) on the forward end of each of the hammer latch teeth 180, which ear overlies the tooth 180 of the latch 166 next to the right. With this overlapping ear arrangement, when the latch 169 is rocked by its sector, it not only is lowered itself to position back of the hammer mounting head shoulder 181 but it moves the next latch to the right, so that its tooth is moved back of the adjacent hammer head shoulder, and so on across the machine until all of the hammer latches are in locking position. It is apparent that should the post of any column to the right have been lowered to set the sector for that column, such lowering of the post will set the hammer latch, but that such setting will not interfere with the hammer mechanism as each hammer is free for independent movement as well as for movement by the overlapping ear 232 of the adjacent hammer latch.

It will be noted on comparison of Figs. XIV and XV that we show ten hammer mechanisms which correspond in number to the ten banks of key levers, but that only the five mechanisms to the right of the machine have the overlapping cipher entering features. This is because only the five mechanisms to the right are for entering money sums; the sixth mechanism from the right being for the clerk designating bank, the seventh, eighth and ninth sets being for the customer number banks, and the one at the extreme left for the transaction designating bank. The hammer and printing mechanisms for all of the key banks are identical but it is necessary to actuate each mechanism, except those for the figures, independently in order to effect the printing. It is intended, however, that each entry on the record web shall contain a character for each of the key banks, so that when an amount is entered it will show the character of the transaction, a customer's number, a clerk's designation, and the amount of the transaction.

*Register mechanism.*

The register mechanism comprises a set of register wheels for each key bank or figure column, adapted for independent actuation following the setting of the selecting bar for that bank; each set comprising a register wheel which is adapted for coöperation with relative register wheels in other column sets in order that a number may be set up across the complete register. In other words, the wheel set for each column comprises a credit sale wheel, a cash sales wheel, a paid on account wheel, a paid-out wheel, and an invoice wheel. Mechanism is provided for selecting the register comprising the transverse set of wheels which may be actuated by the selecting bars for the five figure banks, but in order to better understand the register and selecting mechanisms we will first describe one of the register sets and its operation from a single selecting bar.

Fixed in the frame between the plates 36 and 37, by a rod 234 (Fig. V) at the bottom of the frame and the rod 41 that carries the forward ends of the selecting bar housings, are sector frames 236 which extend from the forward ends of the housings to the bottom of the machine directly back of the register panel 4. The said frames are provided, directly back of the several register windows 24 to 28 inclusive in the panel 4, with radial slots 237, (Figs. XXVII and XXVIII), and rotatably mounted in said frames to the rear of and slightly above said slots, are shafts 239 which extend entirely across the register mechanism (Fig. XXVI), and have the longitudinal grooves 240, the said slots 237 being substantially radial with the sector frames and curved with the shafts as their centers.

Fixed on said shafts by tongues 241 which project into the shaft grooves 240 are arms 242 which extend forwardly across the radial slots 237 in the sector frames and have longitudinal slots 243 extending transversely of the radial slots.

Extending transversely across the register, and through the relative sector slots 237 and arm slots 243 are axles 244 which carry the register wheels 245, all of the independent wheels of each register being rotatably mounted on the same axle so that they will register with the transversely alining windows in the panel 4.

In the present machine we utilize five separate registers, as heretofore stated, so that there are five different axles and five different sets of register wheels. We also, in the present machine, employ mechanism for registering a five column number so that each register comprises five separate register wheels that are mounted on a single axle. The machine is adapted for either automatically or manually selecting the register upon which any number set up in the machine by the key post mechanism may be entered, but we will first describe the automatic selecting mechanism, and as all of the registers and selecting mechanism are identical in construction we will refer to but one of the registers with the understanding that such description relates equally to all.

Each of the register wheels 245 (Figs. XXII-XXV) comprises a numeral disk 246 having characters 247 on its periphery, which are equally spaced and run from cipher to nine. The disk lies along side of the sector frame upon which it is mounted, and fixed to one side of the disk is a pinion 248 which extends into an aperture 249 in the frame which is of substantially greater diameter than the pinion, so that the pinion may have movement therein, and which is provided at its outer edge with an inwardly extending tooth 250 adapted for meshing with the teeth of the pinion to lock the pinion and hold the register wheel in set position.

Pivotally mounted on each sector frame at the side opposite the register wheel, by the button 251, is a sector 252 which is adapted for movement along the frame and is of such diameter that its periphery will lie close to the inner edges of the pinion containing apertures 249 in the sector frame; the said sector 252 having a neck 253 extending rearwardly and provided with a laterally directed stud 254 which lies within an upwardly opening fork 255 on the forward end of the selecting bar 70 for the unit represented by the register wheel under control of that particular sector.

At its inner end the sector is provided with circular openings 257, each having an enlargement 258 at its outer edge, and lying along side the sector are a rack arm 259, the inner end of each of which is turned laterally to form the neck 260 and then outwardly, terminating in a head 261 which lies parallel with the rack arm; the head being revolubly mounted in the circular opening 257 in the sector. All of the rack arms for each unit are alike and all of the mounting heads 261 are held in place by a keeper 262 which is fixed to the sector preferably by rivets 263. At its outer end each arm 259 has an arcuate head 265 which is held to the sector so that it has free movement therealong by keepers 266 that are preferably formed by stamping the same from the sector and bent to proper shape to form guide ways for the rack head. On its periphery the head 265 has a rack 267 of proper pitch to mesh with the teeth of the pinion 248 on the register wheel, which is adapted for actuation by that particular rack when the pinion is moved to mesh with the rack as will presently be described.

While all of the wheels in each register are moved simultaneously to position for meshing their pinions with their respective racks, each rack works independently of all of the others, so that all of the wheels in the register may be moved different distances, dependent upon the movement of the selecting bar under control of the key posts in the separate unit columns or banks. The register wheels are normally held yieldingly to their outward limit so that their pinions will not mesh with the racks, by arms 269 (Fig. XXVII) which are fixed on the axles 244 by tongues 270, and are connected with springs 271 that are anchored on hooks 272 on the sector frame, so that the axles 244 are yieldingly retained at the forward ends of the radial slots 237 and the pinions held out of engagement with the racks.

Mechanism operable by the transaction designating keys is adapted for selecting the particular register upon which an entry is to be made, and mechanism operable by the main shaft when the crank is operated is adapted for throwing the register down into position for engagement with the relative actuating racks; the setting being accomplished at any time the transaction designating key is depressed, but the meshing of the parts to effect advance of the register does not take place until after the crank and main shaft have reached the forward limit of their travel, thereby effecting advance of the register upon return movement of the main shaft and the selecting bars. The detail construction of the register selecting mechanism will be described following the description of the register actuating mechanism.

As the register mechanism does not operate until the crank handle has completed a forward movement of the handle, the individual register wheels are not affected by primary forward movement of the selecting bars when the latter are released by the crank arms 106, but are thrown into mesh with the racks 267 after the selecting bars have reached their forward limit and as the handle assumes its farthest forward position, so that when the selecting bars are returned to initial position they rotate the register wheels to turn the proper numerals to alinement beneath the windows in the front panel 4. As before stated, the key posts limit the forward movement of the selecting bars so that if a certain number post is depressed it will permit the selecting bar to move forward a distance for registering that particular number. When the register wheel pinion for that unit meshes with its selecting bar and the selecting bar is returned to initial position, the wheel will be rotated to show an advance equal to the number of the key post that is depressed; it being apparent that if a selecting bar has a long forward movement because of its setting for a large number, the return movement will be equally long, and that the register wheel will be rotated a relatively greater portion of its circumferential length to carry the register wheel about until such relatively high number is beneath the window.

Upon the complete return of the selecting bar to initial position the key post is released and returns automatically to its initial position, and the register axle is released so that it returns to initial position with the character disks close beneath the windows in the front panel and the pinions in mesh with the teeth that project into the sector apertures, to lock the wheels so that they will show the proper numbers. In the same manner when a succeeding number is to be added to the register, selecting bars on their return movement operate the wheels in the selected register so that the wheels are carried further around and add the last figure to the previous total, so that the figures are totaled progressively on the register directly following their entry on the record web.

Means must be provided for carrying over to successively higher units in the register mechanism as the totaling progresses, and in order to accomplish this result we provide for pivotal movement of the rack arms 259, and provide mechanism for automatically releasing the rack arms when the carry-over occurs, in order that the rack arm in the column of higher order may automatically advance one space.

To adapt the rack arms for this purpose we provide each sector 252 with a recess 273 adjacent each selector arm, and provide the sector and arm with fingers 274—275 over which an expansion spring 276 is located to yieldingly urge the rack arm rearwardly, so that when the arm is released to effect the carry-over the spring will force the rack arm rearwardly and thereby advance the register wheel with which the rack on that arm is in mesh.

In order to limit this automatic movement of the rack arm to but a single wheel space we mount the rack arms between the ears 266 on the sector, so that the rear ear 266 will stop the rack arm after the single space movement.

Extending transversely through the sector frames 236 above each rack head and back of the relative register axle is an axle 280, and located between adjacent sector frames are brackets 281 (Fig. XXV), each having a body portion 282 extended forwardly between the adjacent rack heads and provided with side arms 283—283' which extend forwardly beyond the end of the body portion of the bracket and have stop and hook members 284—285 at their respective upper free ends; the said arms being also provided with guide arms 286 that are adapted for wiping the sides of the sector frames to stabilize the bracket during its travel.

Pivotally mounted on a rod 287 that is also carried by the sector frames 236 and extends transversely across the machine above and slightly forward of the axle 280 are latch members 288, each comprising a collar 289 that is rotatably mounted on the rod and bears against the adjacent sector frames to stabilize movement of the latch.

Formed integrally on each collar is a stop arm 291 that overlies the relative register wheel axle 244 and is adapted for engaging the hubs 245' of the register wheels to limit hanging movement of the latch. The latch also comprises a hook arm 292 that extends downwardly and forwardly at an angle from the collar and has a hook 293 that is adapted for engaging the upturned lip 294 on the forward end of the bracket body 282, the upper edge of said hook being inclined so that when the bracket is moved downwardly the body lip will move over the inclined edge of the latch hook to move the latch hook out of its path, so that the latch body hooks may resume locking engagement. The stop arm 291 of said latch member is connected with the bracket by a spring 295, so that the latch is urged downwardly and the bracket upwardly; downward movement of the latch being limited by engagement of the stop arm 291 with the register wheel shaft, and upward movement of the bracket being limited by engagement of a tail 296 on the rear of the bracket with a shaft 239 that extends transversely through the sector frames and carries the arms whereby the register wheel axle is supported. Each bracket is adapted for actuation by a register wheel of a fixed order for releasing the rack head of a wheel of next higher order in order that said rack head may have the single space movement to advance the register wheel of said higher order one space. This movement of the bracket is effected by a pin 299 that projects from the left-hand side of the register wheel and at such position relative to the cipher character on the wheel that as the cipher moves to position to show through the window the pin will engage the inclined surface 200 of the bracket hook 285 and force the bracket downwardly against the tension of the spring 295. Each of the rack heads 265 has a pin 301 (Figs. XXII–XXIV) projecting laterally from its right-hand face and which normally engages the end of the stop arm 284 and holds the rack head in normal position, but with the rear edge of the rack arm forwardly of the rear ear 266, so that there is a possibility of the single space movement. When the bracket is rocked by the pin on the register wheel, however, the stop 284 is moved downwardly out of the way of the rack head pin and the rack head is released so that it is forced rearwardly by the spring 276 that engages the rack arm; the rearward movement of the rack head being limited by a secondary stop 302 that is set back from the stop 284, so that when the pin on the rack head engages the stop 302 the rack head will have moved through its single space distance and will have advanced its register wheel one space. The supplemental stop 302 and the ear 266 both serve to effect the stopping of the rack head so that any inaccuracy due to wear of the parts is obviated by the double stopping contact. With this arrangement when a selected rack has been freed and operated as described to advance a register wheel for the carry-over movement, the hook 293 on the latch 288 will assume its holding engagement with the hook 294 on the bracket 281; the latch dropping on its pivotal mounting to permit such engagement, but when the register has returned to initial position the register wheel hub will engage the latch arm 291 and rock the latch to free the bracket, so that the bracket returns to its initial position and is ready for another carry-over movement when required.

As there is no carry-over to the second decimal column of the register there need be no cipher movement for these as for the other columns, so the rack heads for that column may be positively held in a fixed position. In order, however, that all of the sectors may be of the same construction, we mount the rack arms in the second decimal column in the same manner as those in the other column, but provide the adjacent sector frame with pins 303 which are adapted for engagement by the pins 301 on the rack arms in that column to hold the said arms against the final cipher movement that the arms would otherwise have.

*Register selecting and setting mechanism.*

As previously stated, the registers may be selected by the transaction designating keys at the left-hand side of the keyboard, so that the proper register for any particular transaction may be actuated to accumulate the amounts of the transactions of the several kinds, i. e., the credit sales are added in the credit sale register, the cash sales in the cash sale register, etc., the proper register being positioned for actuation by the amount selecting bars at the right-hand side of the machine. In effecting this selecting the transaction designating posts 51$^a$ (Fig. XLI) in the bank 30 act on the selecting bar 70$^a$ in exactly the same manner as the other key posts act on their selecting bars as heretofore described; the posts 51$^a$ being under the control of a latch wing as are the other posts, and the selecting bar 70$^a$ being yieldingly urged forward by a spring so that when it is released upon further actuation of the main crank shaft it will automatically move forward until stopped by a depressed key post. In other words, when the credit sales designating post is at the top of the machine and in transverse alinement with the amount designating post numbered "9", the selecting bar 70$^a$ may move forwardly a distance equal to nine spaces of a register wheel, while the cash designating key, which is next to the top, will stop the selecting bar when it is moved forward a distance equal to an eighth space movement of the other selecting bars and so on throughout the set of transaction designating posts. The selecting bar 70$^a$ terminates at its forward end directly back of the laterally directed button 304 (Figs. XXX to XXXV inclusive) on the upper end of a lever 305 which is pivotally mounted on a stud 306 on the sector frame 236$^a$; and has an arcuate rack 307 at its lower end meshing with a pinion 308 fixed on a shaft 310, which is rotatably mounted in the sector frame 236$^a$ and in the frame 236 at the right thereof; the frame 236$^a$, and the one to the right, being spaced apart for the reason that the key banks between the transaction designating bank and the figure bank of the highest order are separated by the customers number and clerk designating banks which have no register mechanism but are limited in function to the printing of the customers numbers and clerk designations on the record web. The lever is held yieldingly with its stud 304 at the rearward limit of movement by a spring 311 which connects the lower portion of the lever with the sector frame, so that when the transaction selecting bar is moved forwardly it rocks against the tension of said spring; and so that when the bar is returned to normal position the lever and shaft 310 are also returned to normal or initial position.

Slidably mounted on the shaft 310 is a shifting device 312 comprising an outwardly facing cone-head 314 and spaced flanges 315—316, between which latter are located the yoke arms 317—317' of a frame 318 comprising split arms which lie along opposite sides of a bracket 319 that is fixed to the side frame plate 36; the frame arms being pivotally mounted on the bracket so that the frame may have free pivotal movement. The forward end of the frame is connected with a spring 320 which is also connected with the side frame plate 36 to yieldingly urge the forward end of the frame, and the shifting device, toward the left-hand side of the machine, and the rear end of the frame comprises a head 322 which is preferably spherical and is held against the face of a shifter plate 323 that is fixed on the main shaft 21. The plate 323 is split and and pressed laterally to form a peripheral lip 325 having a neck 326 whereby it is connected with the body of the plate and held in a plane parallel to but spaced from the plate body.

Fixed to the plate and extending parallel with the lip 325 is a track 327 over which the shifter head 322 travels when the main shaft and plate are moved forwardly, and over the rear end of which the head may pass under influence of the spring 311 so that when the shifter plate is moved back upon return movement of the main shaft the head will lie between the lip 325 and the track 327; the neck 326 being inclined and the forward end of the track free so that when the shipper head rides up the neck it will spring the track to allow the head to return to the outside of the plate where it will again ride over the outer face of the track upon a succeeding operation of the main shaft.

The track 327 carries a ridged boss 329 near its forward end over which the shipper head travels upon forward movement of the main shaft to rock the shipper frame for a purpose presently described.

Fixed on the shaft 310 to the right of the shipper head 314 is a collar 331, and fixed on said collar and extending along the end of the shipper head are spaced arms 332 between which is pivotally mounted a trip 333 having an arm 334 lying along the cone-head 314, and provided with a tip 335 for engaging the surface of said head, the opposite arm having a head 337 overlying feet on register setting links hereinafter described, and a stop portion 338 for engagement with stop ears on said links, a spring 339 (Fig. XXXIV) being located between the arms 332 and yieldingly urging the lever to hold the head 335 against the cone shaped shipper head. Each register setting link 340 (Figs. XXX–XXXII) is connected with its respective shaft 239 that carries the register axle supporting arms 242 by an arm 342 which is fixed on the shaft 239 and the said links extend radially from the shaft 310; the lower ends of the links terminating in an arc and having laterally directed feet 344 which are adapted for engagement by the head of the lever 333 when the lever is rocked, and having ears 345 that are adapted for engagement by the stop portion 338 of said lever to determine the particular link which is to be actuated by the lever. The lower ends of the links are located back of a keeper plate 347 that is fixed on the sector frame 236 and spaced from the frame by the posts 348 whereby it is carried. The upper ends of the links are pivotally connected with the arms 342 that are fixed to the shafts 239 so that when the links are lowered the shafts are revolved, and also fixed to said shafts are arms 350 having heads 351 lying back of ears 352 on a wing shifting plate 353 that is pivotally mounted on the end of shaft 310, and has stop and guide teeth 355, 356 and 356' over the edges of the sector frame.

Pivotally mounted on each of the shafts 239 is an arm 357 having an upturned post member 358 provided with a button 359 bearing a designation corresponding to the designation on the post in a relative position in the bank 30 of the transaction designating key post bank of the keyboard. Each arm 357 has a lip 360 overlying the arm 342 that connects the relative link 340 with its shaft 239 so that the link may be depressed either by movement of the shipper head under control of the transaction designating keys in the keyboard or by depression of any of the key posts 358 at the front of the machine. The sector frame 236 is cut way adjacent each of the buttons 359 to form recesses 361 that permit depression of the enlarged buttons on the keys 358.

With this arrangement, we will first describe that operation of the machine wherein the register is actuated from the transaction designating keys. When a transaction is had, the clerk first depresses the proper transaction designating key and then the amount keys, so that the key posts will set in position to stop their respective actuating bars at the proper points. He then pulls the handle forwardly and upon forward movement of the crank shaft, the stop finger on the shaft moves out of the path of the stud on the transaction designating selecting bar so that said bar moves forwardly and upon its forward movement engages the stud 304 on the rack lever 305 and rocks said lever a distance proportionate to the movement of the selecting bar. This movement of the rack lever rotates the shaft 310 and the trip 333 a like proportionate distance so that when the selecting bar is stopped the trip is over the foot of a link 340 of the register corresponding to the depressed key post in the transaction designating bank of the keyboard.

Simultaneously with the setting of the trip 333 as described, the plate 323 on the main shaft is rotated with the shaft and moved along the shipper head 322 until, when the shaft has moved forwardly to its limit, the plate has left its contact with the shipper head and the head, under influence of the spring 311, moved back of the plate so that the forward end of the frame is moved to the left and draws the shipper member 312 with it. Upon lateral movement of the shipper member the cone-head engages the head of the trip 333 and rocks said trip so that the right hand end of the trip is lowered against the foot 344 of the selected register link and lowers said link. Lowering of the link rotates the shaft 239 and throws the register down so that the wheel pinions mesh with the rack heads on the selecting bars whereby the pinions and register wheels are rotated by the selecting bars in the amount columns, upon return movement of the selecting bars. In order to complete the actuation of the register wheels the setting parts are held in functional position during return movement of the main shaft because of the location of the shipper head 322 back of the plate keeper 327. As the shaft reaches the initial limit of its travel, however, the shipper is rocked back to its initial position by the neck 326 of the offset lip 325, so that the setting parts are returned to their normal position ready for another operation.

In order that the head 322 of the shipper frame may return to normal position, the neck 326 must be set forwardly of such position so that the head may pass under the end of the keeper and spring the keeper out of its path. This necessitates the location of the boss 329 a distance forwardly of the initial position of the shipper head, but as it is desirable, for a purpose presently disclosed, that the shipper frame be rocked prior to the release of the selecting bars, mechanism is provided for affording idle travel of the main shaft prior to the initial forward movement of the shaft that carries the selector controlling arms 126. This idle movement is made possible by the construction and arrangement of the elbow lever 100 (Figs. XII and XXXIX) which connects the main shaft with the secondary shaft 43. By running the elbow lever beneath the main shaft so that when the parts are in normal condition the connection of the elbow lever with the crank arm will be in substantially the horizontal plane of the main shaft, there is an interval upon initial movement of the shaft when there will be no rearward movement of the lever, and it is during this interval that the shipper plate 323 moves along the shipper head 322 until the head is actuated by the boss 329.

*Total taking mechanism.*

When a column of figures has been entered on the record web, and it is desired to take the totals on the several registers, or should it be desired to at any time take the total of any particular register, the result is secured by what may be termed a reverse operation of the parts, following the setting of a selected register. The selecting of the register is effected through the key posts at the front of the machine, which are exposed in front of the panel 4 after the cover 11 has been opened. This selection is effected by depressing the key corresponding to the register of which it is desired to take the total. For instance, should it be desired to take the total of the cash sales the second register from the top would be moved down by pressure on the post button 359 (Figs. XXX-XXXIII) so that the stop 345 on the link 340 would be moved into position for stopping the trip 333 when the main shaft is revolved. Upon the lowering of the key, the ear 360 on the post arm 357 engages the arm 342 which is fixed on the shaft 239 and rotates the shaft to lower the selected register so that the register pinions mesh with the rack heads 265.

Formed integrally with the key post arms 357 are the arms 350, having heads 351 which lie back of ears 352 on the wing shifting plate 353 so that when a selected register is positioned, the shifting plate is moved rearwardly on its pivot. One of the ears— 352ª—overlies an extension 367 on a bracket 368 which is pivotally mounted on a rod 369 that is carried by the sector frame 236ª and the next frame 236 to the right, and which has a rearwardly extending body 370 provided with a lip 371 that overlies the left-hand flange 315 on the shipper head Fig. XXXV and is urged yieldingly toward the flange by a spring 373 which connects the bracket with the sector frame 236ª.

With this arrangement, when the total taking key post is lowered and the wing shifting frame rocked, the pivotally mounted frame is released by the ear 352ª, so that when the main crank shaft is revolved the boss 329 on the keeper 327 of the shifter plate that is fixed to the shaft will engage the shifter head 322 and rock the frame 318 to give the cone-head 314 a slight movement to the right which is sufficient to move the cone flange from under the frame lip 371 and allow the said lip to be projected along the end of the head. With this arrangement when the main shaft has reached the forward limit of its movement, the shipper head cannot move to the right under tension of its spring for the reason that the shipper on the shaft 310 is held by the arm of the frame 368 and the trip member 333 does not move down to effect the setting of a total taking register link. The trip member is, however, stopped by the ear 345 on the functioned link so that the shaft 310 is stopped and prevents further movement of the rack lever 305 beyond that point, so that the transaction designating selecting bar will be stopped in its forward movement when it abuts against the stud 304 on the said rack lever in the latter's set position.

As before stated, the operation of the parts for taking a total is the reverse of that for ordinary record printing and registering in that the selecting bars mesh with their relative register wheels prior to their initial forward movement, and movement of the bars is controlled by the register wheels as distinguished from the free initial movement of the actuating bars and control of the register wheels by the bars.

For the total taking the selecting bars must be entirely free from the latch wings, and for this reason it is essential that the wings should be in their release positions before the total-taking operation is begun. In order to insure such release positioning of the wings we provide for shifting all of the latch wings to release positions as the first essential of the total taking operation. This shifting of the wings is accomplished by a cross bar 375 (Figs. IV, VI, XX and XXI), which is slidably mounted in squared apertures in the frame plates 36 and 37, and is provided with upstanding pins 376 that are adapted for engaging the latch wings of respective banks of key posts, there being a pin for each latch wing. The bar 375 is yieldingly urged to the right so that it will effect a release movement of the wings, by a spring 377 which is connected with a depending pin 378 on the bar and with the frame plate 37, so that unless the bar is restrained it automatically effects release of the wings. The bar is, however, normally held against the tension of its spring by a lip 380 (Figs. XXX, XXXI and XXXII) on the wing release plate 353 which, when the parts are in normal position, lies to the right of and in the path of a pin 381 on said bar (Figs. XX, XXX and XXXI). The release bar 375 is further held against its wing releasing travel by the head 382 of an arm 383 which is pivotally mounted on an eccentric 384 that is fixed on the main shaft 21 and so arranged that when the main shaft is moved forwardly the head 382 is moved out of the path of a pin 385 on the bar 375 to free the bar so that it may have its releasing travel under influence of its spring. The head 382 of the arm 383 has an inclined rear edge 386 which engages the pin 385 upon return movement of the crank shaft to force the bar backwardly to its initial or idle position.

In operation, the crank shaft is not operated until after the total taking key is depressed, when the register selecting key is depressed, but the shift bar can not move to effect release of the wings until the crank shaft has been operated to move the arm 383 and move the head 382 out of the path of the pin 385.

It is apparent that the arm 383 moves with each movement of the shaft, whether a total is to be taken or not, but that such movement of the arm does not in itself permit movement of the shift bar because of the double lock of said bar, and neither is the movement of the bar permitted alone by the depression of a total taking key.

The wing shaft, just described, is in addition to the primary wing shift (Figs. XII, XX and XXI) whereby all of the wings are released following each actuation of the shaft. This primary shift comprises a separate shift bar 388 which is also slidably mounted in squared apertures in the frame plates 36 and 37, and has an upstanding pin 389 for each of the latching wings; the bar, however, being normally yieldingly held to its left-hand limit by a spring 390 (Fig. VII) which is connected with the frame plate 36 and with the bar.

Slidably mounted on the bar 388 is a slide 391 having a slot 392 in its under face through which a pin 393 on the bar projects; the left-hand end of the slide being connected with the pin 393 by a spring 394 so that the slide is yieldingly urged toward the right. Fixed to the slide 391 is a depending pin 395 which is adapted for engagement with the cam plate 396 on the main shaft which flares rearwardly and to the left so that when the main shaft is moved forwardly the cam plate travels in engagement with the pin 395 and moves the slide to the left without movement of the shift bar, because of the pin and slot connection. When the plate leaves its contact with the pin 393 as the main shaft reaches the forward limit of its travel, the spring 394 returns the slide to its initial position, so that when the main shaft is turned back the cam plate engages the pin 391 from the other side and moves the slide and shift bar to the right because of the engagement of the slide with the pin 395. This movement of the shift bar to the right causes the upstanding pins 389 to engage the several post-retaining wings and rock the same out of their engagement with the posts, so that the posts may all return to initial position.

When the selected register axle assumes its lower position, the pinions on the register wheels are brought into mesh with the several selecting bar rack heads for that particular register prior to the forward movement of the selecting bars. With the parts in this relation, when the crank shaft is moved forwardly all of the selecting bars are moved forwardly under tension of their springs and move the sectors with which they are connected forwardly; the rack arms moving with the sector so that the rack heads that are in mesh with the pinions on the register wheels of the selected register rotate said wheels during the entire forward movement of the bars; this movement of the wheels continuing until the pins 299 on the left-hand faces of the register disks 246 (Fig. XXV) engage the rear stop faces 398 on the heads 285 of the bracket arms 283' to stop the rotation of the register wheels and hold the selecting bars against further movement. The pins 299 are so arranged on the register disks that they will engage the heads 285 when the disks are rotated either forwardly or back at such point in the rotation that the cipher on the disk is at the register position, and being so arranged it is apparent that the duration of movement of the register wheel for totaling is proportionate to the size or number showing through the register window prior to the movement of the actuating bars.

With this arrangement shown in the drawings, the pin on each register wheel will be located adjacent the numeral 4 so that if the cipher is showing through the register window the wheel would be held by the pin without any movement, whereas, with the numeral 9 showing through the window the pin would be located back of the trip head so that the wheel would make nearly a complete revolution before the pin would engage said head, thereby affording a relatively long movement of the selecting bar.

As each of the register wheels operates independently of all of the others, it is apparent that each of the selecting bars may be moved a different distance according to the numeral which is shown on the register, thereby setting the printing mechanism proportionately. As a complete operation of the total printing has been completed when the crank reaches the forward limit of its movement, if the register wheels are to be left at cipher positions so that a new accumulation may be started, it is essential that the register wheels be thrown out of mesh with their racks before the selecting bars start on their return movement. This return of the register wheels is effected by releasing the total taking key so that a spring 399 (Fig. XXVII) which is connected with the wing shifting sector 353 may return the sector to normal position, and by such return movement rock the register link 340 back to normal because of the engagement of the ear 352 with the arm 350 on the shaft 239 which controls the register wheel shaft. As soon as the register has returned to normal position the pinions on the wheels mesh with the teeth 250 on the sectors to hold the register wheels in primary position, so that when the machine is again operated the accumulation of a new total will start. Should it be desired to merely print the total without returning the register to primary condition, or, in other words, to take a sub-total, the operator holds the total-taking key depressed until the main crank shaft has returned to initial position, thereby holding the register wheels in mesh with the actuating racks so that the wheels, after being turned back and the printing effected, are returned forwardly to the positions they occupied prior to the total-taking, so that they will show the same total as before the printing.

As all of the selecting bars are not drawn forwardly to their limit when the total is printed, and are released before the crank shaft is moved back, unless some means be provided for holding the bars they would jump forwardly to their limit under tension of their springs and effect jar and strain on the parts.

In order to obviate this sudden or jumping movement we provide a latch which becomes effective upon the crank shaft movement for effecting the totaling operation. These latches 401 (Figs. XII, XLI, XLII, and XLIII) are pivotally mounted on a shaft 402 which is rotatably mounted in the selecting bar housings 46 and extends transversely across the selecting bars adjacent the heads 124 thereof, and have teeth 403 that are adapted for engaging forwardly facing teeth 404 on said bar heads; the latch heads being normally supported out of position for engagement with the bar heads by ears 405 which project into a longitudinal groove 406 in the shaft 402, and which is of greater width than the ears 405, so that the ears may have movement in the groove and the teeth flexibility on the shaft. Each of the latches is yieldingly urged toward engagement with its respective bar head by a spring 407 which is mounted on fingers 408 and 409 on the latch and the bar housing respectively and urges the latch toward the locking engagement with the bar head.

The shaft 402 is controlled by an arm 410 which is fixed to the shaft by an ear 411 that seats in the shaft groove 406 and has a laterally directed stud 412 at its free end.

Pivotally mounted on the frame 36 is a sub-latch 414 having a hook 415 adapted for engaging the stud 412 to hold the arm 410 and the latch 401 elevated, and having a finger 416 spaced from the hook. The sub-latch 414 is yieldingly urged toward the stud 412 by a spring 417 which connects with the end of the latch opposite the hook 415 and with the adjacent bar housing, and the hook 415 is provided with an inclined edge 418 that is adapted for engagement by the stud 412 to rock the sub-latch against the tension of its spring.

Fixed on the sub-shaft 43 that carries the selecting bar controlling arms is a trip 420 having facing heads 421—422 adapted for engagement with a stud 423 on the sub-latch finger 416 and with the stud 412 on the arm 410 respectively when the sub-shaft is moved to opposite limits of its travel. With this construction the latches 401 are normally held out of engagement with the selecting bar teeth, but when the sub-shaft approaches the forward limit of its movement the head 421 engages the stud 423 on the sub-latch and rocks said sub-latch to free the arm 410, the shaft 402 and the latch 401, so that the latter may be revolved under the tension of its spring. When the sub-shaft returns to its initial position the trip head 422 engages the stud 412 and rocks the arm 410, the shaft 402, and the latches 401 back to initial position; the selecting bars meanwhile having been returned to their initial positions, so that the presence of the latches is no longer required. During the backward movement of the arm 410 the stud 412 engages the inclined edge 418 of the sub-latch head 415 and rocks the same against the tension of its spring, so that the head may resume its locking engagement back of the stud and the parts be ready for succeeding operation. By making the longitudinal groove 406 of greater width than the teeth 405 of the several latches 401 the said latches may have movement independent of their shaft sufficient to permit the latches to lift when rocked by the teeth on the selecting bar heads as the selecting bars move back to initial position; the parts in this respect acting as an ordinary pawl and ratchet.

The machine may also be used purely as an adding machine and any one of the registers used for this purpose. It is possible that during the day or at the end of the day's business, the proprietor may wish to add a column of figures and that some of the registers may have no accumulation thereon, so that the adding may be done on one of these idle registers without affecting the others. In order to select an idle register for the adding operation we have provided the manual register selecting mechanism comprising a lever 424 (Fig. XXXIII) which is pivotally mounted on the short shaft 310 and extends through a quadrant 425 that is fixed on the left-hand sector frame 236ᵃ and has sockets 426 corresponding to the number and arrangement of the several registers and adapted for receiving a boss 427 on said lever; the setting of the boss in one of the sockets being effected by a spring 428 which bears against the sector frame and the lever having a handle 429, whereby it may be manipulated. Fixed to the side of the lever 424 is a stud 430 which is adapted for normally engaging the lower or rack end of the rack lever 305 which controls the shaft 310. With this arrangement, when a register is to be selected the lever 424 is moved to seat the boss 427 in the socket 426 corresponding to the selected register and this movement of the lever rocks the shaft 310 through the lever 305 to bring the trip head 333 into position for operating the selected register.

With the selector so arranged, the key posts in the figure banks 33 may be operated to set their respective selecting bars and the main crank shaft operated to permit operation of the register sectors and register setting mechanism, so that the figures may be set up, printed and registered in the manner heretofore described, the register selecting lever holding the trip head over the foot on the proper register operating link until the lever is returned to normal, so that on each operation of the crank shaft the same register is thrown into and out of mesh with the selected rack heads.

As the transaction designating key posts are not operated during the adding operation there is no movement of the selecting bar in this bank, and consequently, no movement of the lever 305 that would tend to move the register trip 333 from its set position. After the adding has been completed the setting lever may be returned to initial position and the mechanism freed for the other operations.

*Tills.*

Some of the transactions had with the machine relate to the handling of money such as that received for cash sales, money paid out, and money paid in on account by customers so that it is necessary to provide a cash drawer. This drawer (Figs. VI, VII, XLI and XLII) comprises a partitioned receptacle 432 of ordinary construction having a front 433 forming a part of the front of the machine, and which is slidably mounted in ways 434 in the interior of the machine at the left-hand side of the register mechanism.

Mounted on the transverse shafts or rods 38, beneath the cash drawer, is a guide strip 437 and slidably mounted on said strip is a bracket 438 having a lip 439 located back of the cash drawer and adapted for engaging the same lip 439 is connected with the spring 440, the forward end of which is connected with a bracket 441 on the transverse tie rod 442, so that when the cash drawer is housed the spring is under tension. The drawer is locked against the tension of said spring by a hook 444 on an arm 445 that is pivotally mounted on the frame plate 36 at its rear end and has a stud 447 adjacent the hook part which extends through the frame plate 36. Pivotally mounted on the end of the stud 447 opposite the hook 444 is a shift member standard 448 which extends through a slot 449 in a bracket 450 that is attached to the frame plate 36. The said standard is yieldingly urged forwardly and upwardly by a spring 451 which is connected with the standard and with said frame plate, and the standard has a foot 452 at its upper end which is adapted for engagement by a push arm 453 which is fixed on the sub-shaft 43 that carries the release arms, so that upon each movement of the main crank shaft the push arm moves downwardly to engage the foot on the cash drawer releasing standard and does so engage the standard when the latter is moved back against the tension of its spring. To move the standard back so that it may be engaged by the push arm and may release the cash drawer, we provide mechanism which is operable by any of the cash transaction designating keys and comprises a T-lever 455, the rear arm 456 of which is pivotally mounted on the shaft 402 that carries the selecting bar latches 401 and the forward arm 457 of which underlies the fingers 458 on the three cash transaction key posts which project through slots 459 in the housing plate 46, so that when any of the three key posts is lowered it will engage the lever arm 457. The body 460 of said T-lever is suspended along the standard 448 and has a laterally projecting stud 461 which lies in front of the standard 448 to engage and move the standard rearwardly; when the T-lever is rocked upon the lowering of any of said cash transaction keys and so that the foot of the standard may be engaged by the push arm and the hook 444 lowered out of engagement with the cash drawer to release the drawer, and allow the drawer to automatically shoot forwardly under tension of its spring. We prefer to extend the hook 444 up through a slot 463 in the bottom of the cash drawer and reinforce said bottom by a plate 464 in order to obviate wear on the cash drawer and the resultant lost motion of the drawer.

The machine also comprises a memorandum or ticket drawer 15, which is mounted on ways 467 in the machine above the cash drawer, and is provided with a suitable lock whereby it may be secured in closed position. As this drawer is not used frequently we provide no automatic mechanism for opening it, but preferably provide its front with a slot 468 through which tickets or slips may be inserted without opening the drawer.

*Customers' tray mechanism.*

The accounting feature of the machine necessitates the provision of drawers or trays for containing customers tickets or slips. These trays are arranged in sections so that sections may be added to the machine as required although all of the sections are controlled from the same mechanism in the operating portion of the machine.

Referring to the drawings, and particularly to Figs. I, III, IV, V, VI, XLVI and XLVII, 470 designates the separate drawer sections which make up the filing device 2 and the bottom one of which is supported on the top of the front case 1 over the rear portion thereof, each of the individual sections comprising a rectangular shell having a front opening 471 and having inwardly directed rails 472 on its opposite sides for slidably supporting the bins 473 that contain the customers slip trays, and have flanges 474 at their ends which are slidably supported on the rails 472 in the sections 470; each of the bins being provided with vertical front end flanges 475 forming finger holds that are accessible through recesses 476 in the front ends of the frames 470 so that when the bins are unlocked they may be taken from the case to be stored in a vault or safe. Each of the bins 473 is provided at its ends with inwardly directed rails 477 for supporting the trays 478, there being any suitable number of trays housed in each section and the said trays being divided transversely by partitions 479 to provide a plurality of individual compartments 480 for containing individual customers charge or ticket slips.

Hinged to the rear end of each compartment 480 is a lid 481 which is spring-pressed to open upwardly when released from a catch 482 at the forward end of the tray, so that when the operator draws the tray to open position and actuates the latch, the lid will automatically spring open, the lids of the other compartments remaining closed so that the tickets or slips in such other compartments are not exposed when the one is opened. As the bins 473 and their contents in reality constitute the merchants books of account they should be protected and should only be removable by the proprietor. For this reason we lock the bins in place by mechanism that can only be operated by the proprietor or person having the proper key. This locking mechanism comprises the studs 484 on the opposite ends of the bins which are adapted for locking engagement with the latches 485 which are pivotally mounted on horizontal studs 486 on the inner faces of the frames 470, at both sides of the machine. Each of these latches comprises an arm 488 which is pivotally mounted on the stud 486, upper and lower post portions 489—490, and the forwardly directed hook 491 which takes over its stud 484 on the tray bin 473; the head 491 having an inclined edge 492 which is adapted for engagement by the stud 484 to rock the latch automatically when the bin is moved back to place so that the hook may take over the stud. The standard member 490 of each lower latch 485 has a foot 493 supported by the head 494 of an arm 495 which is pivotally mounted on a stud 496 on the sides of the case 1, the said arm being supported on a flat face 497 of a collar 498 that is pivotally mounted on a shaft 499 also carried by said frame plates and which is provided with a handle 500 which is accessible through the opening 17 in the base case 1. The upper standard member 489 of said latch comprises a head 501 which supports the foot 493 of the latch face thereabove, so that when the lower latch is rocked to open position it rocks all of the upper latches to release the bins; the unlocking of all of the bins being effected by a single manipulation of the handle 500.

*Tray locking mechanism.*

The tray locking mechanism is independent of the bin locking mechanism and comprises the following parts:

Pivotally connected with the rear of each tray 480, near the ends thereof, are links 503, (Figs. III, XLVI and XLVII) and pivotally connected with said links are arms 504, which are pivotally anchored at the transverse center of the machine and directly behind the trays on a vertical post 505 that is mounted on the back of the bin in which the trays are contained, each of the arms 504 having a free end 508 projected beyond the pivotal anchor and the pair of arms on each tray being crossed to form a scissors-like structure.

Rotatably mounted in supports 510 (Fig. XLVII) formed integrally with the frame plate 36, are the paired shafts 511—512, and fixed on said shafts at the upper and lower ends thereof, are arms 513—514.

Fixed to said arms and extending vertically along the arms and scissors-arm extensions 508 are rods 515—516 which are adapted for movement by the scissors-arms when the trays are opened and for moving said scissors-arms when the vertical shafts 511—512 are rotated in the opposite direction.

Pivotally connected with each of the arms 514 is a link 517 (Figs. III and XLVII) which extends forwardly beneath the drawer sections and is fixed at its forward end on a shaft 518 that is rotatably mounted in the upper end of a lever arm 519 which is pivotally mounted on a stud 520 on the frame plate 36, the forward ends of the arms 517 lying on opposite sides of the lever arm 519 and being secured rigidly to said shaft so that when the lever arm moves forwardly or back the arms 517 may have pivotal movement to compensate for the difference in elevation of their forward ends during the movement of the pivotal arm. The arm 519 is under control of the key posts in the clerk designating bank so that it is necessary for one of said clerks posts to be depressed before the customers ticket or slip trays may be opened. This control from the clerks keys comprises a bar 521 (Figs. XLIV and XLV) which is slidably mounted in guides 522 on the housing 46 for the clerk designating selecting bar and has inclined heads 523 adapted for engagement by teeth 524 on the several clerk designating key posts, so that when any of said posts are depressed the tooth 524 will engage its head 523 and move the bar 521 forwardly.

Pivotally connected with the rear end of the bar 521 is an arm 525 which is fixed on the shaft 42 that is rotatably mounted in the housings 45 so that the shaft is revolved when the bar 521 is moved either forwardly or back.

Located adjacent the frame plate 37 is a floating bar 527 which rides on a stud 528 that is carried by the plate 37 and projects through a slot 529 in said bar; the bar extending along the main shaft 21 and along the shaft 42 and being yieldingly urged upwardly and toward the shaft 42 by a spring 530 that connects with the bar and with a stud 531 on the plate 37. The bar 527 has a notch 532 therein, within which is seated a stud 533 on a lever 534 that is pivotally mounted on a stud 535 that is carried by the plate 37, and in turn carries a spring clapper arm 536 having a clapper 537 at its outer end which is adapted for striking a gong 538 that is also carried on the frame 37.

Fixed to the shaft 42 is an arm 540 having a head 541 serving as an abutment for the upper end of the bar 527 and which is adapted for moving said bar rearwardly to unseat the stud 533 when the shaft 42 is revolved, so that the clapper may fall and strike the gong when one of the clerk designating posts is depressed. The bar 527 has a laterally directed foot 542 which is adapted for engagement by a pawl 543 that is fixed on the main crank shaft 21 so that when the crank shaft is revolved the pawl will engage the foot 542 and lower the bar 527 to rock the lever 534 so that the clapper is raised to striking position. The shaft 42 also has a latch hook 544 (Fig. XLVII) fixed thereon which is adapted for engaging a stud 545 on a finger 546 of the arm 519 when the bars are in normal position to hold said arm 519 forwardly and prevent the opening of a customer's slip tray; the latch 544 being of bell-crank shape and the arm 548 opposite the latch head pivotally connected by a link 549 with a latch arm 550 which is pivotally mounted on a stud 551 and depends in front of the main shaft 21; the lower end of said arm being provided with an upwardly facing hook 552 which normally engages a projecting portion 99 of the stud 98 on the crank arms 97—97'. The upwardly facing hook 552 has a beveled rear edge 553 which is adapted for engagement by the stud extension 98 to rock the hook when the crank shaft is returned to normal position, so that the hook may return to its holding position beneath the extension, under tension of its spring 554.

Fixed on the shaft 43 which carries the selecting bar control fingers is a crank arm 555, and pivotally connected with said crank arm is a bar 556 which extends along the arm 519 and has a slot 557 therein through which a stud 558 on the arm 519 is slidably projected, so that on initial movement of the main crank shaft the slotted bar 556 is drawn forwardly, and should any of the trays be open and the arm 519 at the rearward limit of its movement, the rear end of the slot in the bar 556 will engage the stud 558 and rock the arm 519 forwardly to close the tray. We prefer to locate an adjusting screw 559 in the rear end of the bar 556 so that the stud 558 will engage the end of the screw to form an adjustment whereby the closing of the trays may be secured without lost motion in the mechanism.

Should the proprietor or other person having access to the interior of the machine wish to open one of the trays without operating the crank shaft, the opening may be effected by manipulation of a lever 560 which is pivotally mounted on the shaft 42 and has an ear 561 overlying the arm 540 (Fig. XLIV) so that when the lever is rocked downwardly the arm 540 is lowered to rock the shaft 42 and the latch 544, and also the suspended latch 550.

In order that the tray controlling mechanism may be disconnected from the main crank shaft we provide a spring latch 562 which is fixed to a stud 563 on frame plate 37 and has spaced pockets 564—565 therein adapted for seating a stud 566 on the lever 560, so that when the stud 566 is in the pocket 564 the lever is held in inoperative position while when the stud is in the pocket 565 the lever is held in operative position and the arm 519 and latches 544 and 550 out of position for engagement with the arm 519 and stud extension 98 respectively.

With this mechanism, when a clerk wishes to register a transaction for a credit customer, he first depresses his designating key to make the connection with the mechanism for printing the clerk designation on the record web and this depression of the key rocks the latch 544 to release the arm 519. When the arm 519 is released the clerk grasps the knobs 478' on the tray containing the compartment for the particular customer with whom the transaction is made and opens the tray. He then lifts the tray lid and files the slip or ticket bearing the record of the transaction in the customers compartment. He then sets up the transaction on the denomination, the customers number and the transaction designating keys, and operates the crank shaft, thereby printing the record and effecting the addition on the register.

Upon return movement of the crank shaft the slotted bar 556 is drawn forwardly, engaging the stud 558 on the arm 519, which is drawn forwardly rocking the vertical posts 515—516 which operate the scissors-levers to straighten the levers and draw back the customers ticket tray into the case.

*Record web mechanism.*

The record web mechanism (Figs. I, IV, V, VII and XXXVII to XL inclusive) is mounted at the rear of the machine back of the type-setting and register mechanism and is carried by the table 18 having an arm 567 at its forward right-hand corner that is built up to form a boss 568 having point bearing on pins 569 that are carried by the bottom of the case and by a boss 570 on the frame plate 37 respectively, so that the table may pivot on its bearings, to extend longitudinally with the machine, or project transversely through the opening 17 when the door 19 is opened.

Mounted in the front end of the table are spaced frame plates 572—573 and rotatably mounted between said plates is a platen 134 over which the inked ribbon 132 is run, the said plate carrying a guide 574 for properly locating the ribbon over the platen. The platen is carried on a shaft 575 (Figs. V and XXXIX) that extends beyond the plate 572, and fixed on the shaft is a ratchet wheel 576.

Pivotally mounted on a bearing 577 on an ear 578 that extends downwardly from the frame plate 148, which carries the printing hammer mechanism is a bell crank lever 579 (Fig. XXXIX) the upper arm of which is adapted for engagement with a stud 580 on a crank arm 581 that is fixed to the shaft 43. The lower arm 583 of said bell crank lever is adapted for engaging a boss 584 on the forward end of a lever 585 which is pivotally mounted at about its center on the ribbon frame plate 572. The rear arm of the lever 585 carries a pawl 586 which is adapted for engagement with the ratchet 575 when the pawl is lifted, the said pawl having connection at its upper end with a spring 587 which, in turn, is connected with the plate 572 so that the pawl is yieldingly urged to its locking engagement with the ratchet. With this mechanism, with each movement of the main crank shaft the platen is advanced to present constantly changing positions to the type. Rotatably mounted in the front ends of the frame plates 572—573 is a shaft 589 carrying a roller 590 and fixed to the roller is a grooved wheel 591 for carrying the belt 592 which runs over the wheel 591 and over a wheel 593 which is fixed to the platen so that when the platen is advanced the roller 590 is also advanced. The belt 592 is of spring construction in order to afford variance in the speed at which the roller 590 is revolved, for the reason that the roller takes up the printed web during the operation of the machine, and as the diameter of the web roll varies, while the platen remains fixed, there must be slippage between the parts in order to compensate for the variance in speed at which the take-up roller is advanced as the diameter of the roll increases.

Interposed between the roller 590 and the platen is a tension roller 595 beneath which the web 133 is passed during its travel to its take-up roller after running over the platen, the said tension roller being mounted on stub shafts 572—573, the said shafts having springs 599 connected therewith and with the frame plates in order to constantly urge the roller downwardly and maintain a tension on the traveling web.

Located at opposite ends of the platen are yoke brackets 600 and rotatably mounted in said brackets are ribbon drums 601—602, having suitable tensioning devices 603 and provided with gear wheels 604—604'.

Extending transversely across the frame beneath the web strip, and rotatably mounted in the frame plates 572—573 is a shaft 606. The shaft 606 carries a gear wheel 608 which meshes with the gear wheel 605 that is fixed to the platen so that the shaft is rotated with the platen. The said shaft 606 is provided with pinions 609—610 which are adapted for meshing with the toothed wheels 604—604' on the respective ribbon drums. The gear wheel 608 is slidably keyed on the shaft 606 and held in mesh with the gear wheel on the platen by a tooth 613 on the frame plate 573, and the said shaft 606 is rotatably mounted in the wheel 608 and its hub 612. The hub 612 is provided with a longitudinal slot 612' for receiving a pin 614 on the shaft 606, so that the pin and slot connection will induce rotation of the shaft through permitting longitudinal movement of the shaft in the gear wheel. The shaft 606 is of such length that when one of the pinions on the shaft is in mesh with its respective toothed wheel on a ribbon drum, the other pinion will be out of mesh with its toothed wheel so that the ribbon drums are driven independently. The shaft, may however, slide in its bearings to reverse the engagement of the pinions and the direction of travel of the ribbon drum, and as the shaft is driven for either engagement from the same point in the same direction, and as both of the pinions engage the toothed wheel on the ribbon drums at the inside of the drum axis, the drums are driven in opposite directions. The shaft 606 has spaced peripheral grooves 615—616 adapted for receiving a latch yoke 617 on a spring arm 618 that is attached to the frame plate 573 so that when the shaft is in set position the yoke will lie in the shaft groove and hold the shaft in position.

The shift of the ribbon driving mechanism is effected manually although we do not wish to be limited to the particular shift or ribbon actuating mechanism herein disclosed.

The table 18 is preferably provided with a transverse trough 619 for seating a roll of web strip and the roll is preferably arranged so that it will feed from the bottom and thereby provide friction that is proportionate to the weight of the roll and is sufficient to prevent slack in the record web during its feed to the printing mechanism.

*Safety devices.*

In order to prevent a retrograde movement of the main shaft in either direction and to insure a complete operation of the shaft before its possibility of return, we provide the collar 384 (Fig. XXX) with a rack surface 624 comprising teeth 625 which are adapted for engagement by a pawl 626 that is pivotally mounted on a stud 627 in the side frame 37 and has an end 628 yieldingly urged against the rack face by a spring 629 that is attached to the free end of the pawl and to a stud 630, in the side frame; the pawl being of such length that when it is rocked by engagement with the teeth, retrograde movement will cause a flush engagement of the end of the pawl with a tooth face and prevent the backward movement of the rack until the rack is moved completely out of engagement with the pawl so that the pawl may pivot in the opposite direction.

To prevent jar or injury to the mechanism by a sudden return of the parts under tension of the return spring 92, we provide a retarding mechanism comprising an oil cylinder or dash pot 632 (Figs. IV, VII and XX) which is pivotally supported on the tie rod 38 carried by the frames 36—37 and contains a piston 634 which is connected by a rod 635 to an arm 636 keyed on the main shaft 21, so that, on a forward movement of the crank the piston is drawn outwardly from the cylinder and when the crank is released the parts are brought back to initial position by the tension of the spring 92 but will be retarded in their return by the pressure created within the cylinder by the downward movement of the piston therein.

We also provide means for limiting the crank movement at its forward and rearward positions which comprises a collar 638 (Fig. IV) that is keyed onto the shaft 21 between the frame 37 and case 1, and has arms 639—640 thereon having facing heads 641—642 which are adapted for respectively engaging a stud 643 projecting from the frame 37 when the crank has reached its forward or rearward movement.

The means for locking the register cover 11, comprises the lug 10 thereon which projects, when the cover is closed, through the slot 9 in the panel 4 and pivotally mounted on a stud 650 (Fig. IV) on the frame 37 is a bell crank lever 651 comprising an arm 652 having an end pin 653 which projects laterally therefrom and is adapted for seating within a socket 654 at the end of the lug 10 to lock the cover over the register sectors.

The lever 651 also comprises a downwardly extending arm 655 having a spring 656 attached thereto and to the forward end of the frame 37 which yieldingly holds the parts in locked position.

Pivotally connected with the end of the arm 655 by pin and slot connection 657—658 is a rearwardly extended link 659 having at its rear end a slot 660 for receiving a pin 661 projecting from the frame 37 to slidably support the link which terminates adjacent the opening 17 and is provided with a knob 662, by which the link may be drawn rearwardly to rock the lever 651 to unseat the arm pin from the lug 10 and unlock the cover, so that the registers may be observed.

To lock the cover, it is pushed inwardly so that the lug 10 rocks the lever 651 and the latch arm 652 is snapped in place by the spring 656, it is apparent that only one having access to the machine through the opening 17 may operate the unlocking parts.

In order to give a clearer understanding of the construction, the mode of operation and the result secured with the register, we will describe the operation that is required for entering transactions in the registers.

Assuming first that a credit customer purchases a bill of goods amounting to $4.75. When making the sale the clerk makes out the charge slip or ticket and gives the original to the customer with the goods, the duplicate of the slip being filed in the customers individual tray compartment in the machine and the transaction being entered in the machine so that it can be added to the charge sales on the register and printed on the record web. Before the clerk can gain access to the customer's tray in the filing device he must first actuate the tray locking mechanism in order that he may open the tray and place the duplicate of the slip or ticket in the proper compartment and carry forward the customer's balance onto the new sales slip or ticket. This unlocking is effected by depressing the clerks key bearing the designation of the clerk making the sale. When this key is depressed the trays are unlocked and the key post positioned to stop the selecting bar for the clerk designating bank in such position that when the printing mechanism is actuated the clerk designating character will be printed on the record web, so that the proprietor when checking the sales may know what clerk made that particular sale. When the clerks designating key is depressed the unlocking of the trays is effected in the following manner:

The key post 51 is lowered and pushes the latch wing for the clerks designating key post bank out of its way against the tension of the latch wing spring, so that the head of the post passes beneath the wing and is locked by the engagement of the shelf on the post head with the free edge of the wing. This downward movement of the post causes the ear 524 on said post to engage the face of the relative inclined head 523 on the bar 521 and moves said bar forwardly, rocking the shaft 42 so that the bell crank lever on said shaft is rocked and bringing the head 541 on the rear arm of said lever into engagement with the floating bar 527. This movement of the floating bar releases the clapper lever so that the clapper drops into contact with the gong and rings the gong to indicate that a transaction is being entered in the machine. Rotation of the shaft 42 also rocks the lever 548 which is fixed on said shaft so that the latch head on the forward arm of the lever moves from its engagement with the stud 545 on the pivoted arm 519 to free said arm, and movement of the forward arm of said lever rocks the depending latch 550 to release the main crank shaft 21 so that the machine may be operated to permit the transaction to be registered and recorded.

When the parts have been released as described, the clerk, before operating the crank, draws out the tray containing that particular customer's compartment, lifts the lid of the compartment to expose the last sales ticket in the compartment, brings forward the balance on the last ticket, and adds the same to the sale for the new balance. When the tray is drawn forwardly as described it draws the scissor-arms 504 forwardly so that the latter pivot on their rod 505 and the free ends of said arms, engaging the rod 515—516, push said last named arms back and rotate the vertical rods 511—512 so that the bars 517 are drawn rearwardly and draw the arm 519 back until the stud 558 on said arm engages the rear end of the slot in the bar 556. The transaction is then recorded as follows:—

First, the clerk depresses the credit sales transaction designating key in the bank 30, then depresses the proper customer's number keys in the banks 31, and finally depresses the keys numbered 4, 7 and 5 in the last three banks 33 to enter the amount of the sale. As all of the keys have been depressed as described, their posts are lowered and rock the latch wings for the respective banks so that the posts may be locked in their lowered positions by said wings.

The clerk then draws the crank handle forwardly, the forward movement of the crank handle rocking the shaft 21 and its forward movement rocking the shaft 43, so that the selecting bar arms 106 are moved forwardly to permit the selecting bars of all active banks to move forwardly under tension of their springs, and until the independent bars are stopped by the set posts in the respective banks. As the credit sales post is the top post in its bank the selecting bar for that column will move forwardly a distance equal to nine spaces. Assuming that the customer's number is 123 the customers number post will be in position to stop the respective selecting bars for 1, 2 and 3 space movements, the clerk designating post will stop that selecting bar in the proper position, the first two amount designating posts will have no movement whatever because these posts have not been depressed, and the three last amount designating selecting bars will have movement for 4, 7 and 5 spaces respectively. The forward movement of the selecting bars will induce corresponding forward movement of the relative type carrying sectors 111, so that when the selecting bars are stopped by their posts the proper type members 112 will be beneath the hammers of the printing mechanism. As the shaft 43 revolves to permit the setting of the selecting bars and type sectors the pin 216 moves along the arm 217 of the lever 215, but as the arm is curved with the shaft 43 as a center there is no release of the lever until the pin reaches the step-off 218. At this point all of the type sectors have been set and as the arm passes over the step-off the lever 215 is released and the locking bar 224 is shot downwardly by its spring so that its lower edge passes into the sockets 208 of the type carrying sectors and locks said sectors in place.

As the sectors start their initial movement the rear end of the latches 169 ride up the inclines 178 of the type carrying sectors and their forward ends are rocked down to seat their teeth 180 back of the heads 181 of the type hammers, so that the hammers may be latched and elevated as presently described, the latches being held in the hammer locking positions by the trips 87, the forward ends of which seat back of the shoulders 185 on the latches when the latter are rocked as described.

During the forward rotation of the main shaft the cam 150, after passing through its short idle initial travel, engages the roller on the lever 154 which is keyed to the shaft 146 and rocks said lever and rotates the shaft. The arm 175 being fixed to the shaft 155 is lifted when the shaft is rotated and as the hammers 142 and their latch mechanisms are carried by the arm 175 the hammer and latch mechanisms are raised with the arm. During the rotation of the shaft 146 and the lifting of the hammers the lower hammer teeth 198 engages the lower teeth 196 of the actuater heads 188 and draw said heads forwardly, tensioning their springs. As the shaft 146 reaches the forward limit of its rotation the trip arms 187 engage the comb 140 on the hammer frame and are rocked to release the latches 169 which are then drawn up by their springs to release the hammers, so that the hammers are free and are thrown to striking position by the tension of the actuator heads as the latter return to their normal positions under tension of their springs. The hammers strike downwardly engaging their respective type members to strike the type members against the inked ribbon in the printing mechanism and impress the type characters on the recard web, the hammers striking past their center and against the tension of the actuator head springs so that after the printing has been effected the hammers are slightly raised as they seek their equilibrium and are ready for a succeeding operation. Should the trips 187 fail to release the latches 169 the trips are positively actuated as the main shaft reaches the forward limit of its travel by engagement of the rod 205 with said trip arms, the rod being mounted on the arms 202, having the rod 203 which is engaged by the cams 150 on the main shaft. It is apparent, therefore, that all of the printing is accomplished when the selecting bars reach the forward limits of their travel, the printed line on the record web including the transaction designating character, the number of the customer with whom the transaction is had, the clerk designating character, and the amount of the transaction. As the selecting bar under the control of the transaction designating key moves forwardly it engages the stud 304 (Figs. XXIX and XXXIII) on the rack lever 305 and rotates the rack lever through an arc proportionate to the movement of the selecting bar. This rotation of the lever rotates the short shaft 310 that is carried in the sector frames at the front of the machine and rotates the register selecting lever 333; the selecting lever stopping over the foot of the selecting link for the credit sales register. As the main shaft 21 reaches the forward limit of its travel the shipper head 322 is moved laterally over the end of the plate 323 and rocks the conical shipper head 314 laterally. This movement of the shipper head moves the conical head 314 laterally, and lowers the setting lever 333 so that the credit sales register is moved downwardly and all of the pinions on the individual wheels of this register brought into mesh with the racks on the rack arms 259 for that particular register. The other registers remain in their elevated positions and are not influenced in any way by the setting mechanism nor by their selecting bars. The crank handle on the main shaft is then released and automatically moves rearwardly under tension of its spring, the rearward movement of the fingers 106 on the shaft 43 pushing the selecting bars back to their normal positions. As the selecting bars move back they draw the register sectors along with them and arms on the racks which are in mesh with the register wheel pinions rotate the pinions and the register wheels a distance proportionate to the movement of the selecting bars, so that the registers are advanced to add the amount of the transaction onto the register wheels, and so that the register accumulates and shows a new total amounting to the sum of all previous sales of that character, with the sale just made added thereto; the carry-over from one column to the next in the register mechanism being effected by the rocking of the bracket 281 by the pin on a register wheel to permit the additional movement of the rack arm equal to one space of the register under tension of the spring 276. The keyboard mechanism and its latch mechanism is so constructed that any of the posts will rock its latch to permit automatic return movement of a previously set post, so that but one post can be depressed at a time, and all of said keys are released automatically upon return movement of the main shaft through the shift bar 388 which is operable by the cam wing 396 to move the bar laterally and shift the latch wings upon return movement of the shaft, so that after each complete operation of the shaft the posts are released and the key board ready for a succeeding operation.

The customers trays are also automatically closed and locked upon the initial forward movement of the shaft as heretofore described, so that after each manipulation of the machine the printing is effected, the register advanced to show a new total for the particular transaction, and the customers trays returned into the case and locked.

Should the transaction be a cash one, such as a cash sale, money paid on account, or money paid out, it is necessary for the operator to have access to the cash drawer and the drawer is automatically unlocked upon the setting up of the transaction, through the medium of either of the three cash transaction designating keys. As any one of these three keys is lowered the finger 585 thereof rocks the T-lever 455 (Fig. XXXIX) and moves the bar 448 back so that when the shaft 43 is revolved to permit the forward movement of the selecting bars, the arm 453 engages the end of the bar and rocks it downwardly to rock the cash drawer latch and release the cash drawer so that it may be moved forwardly automatically under tension of the spring 440.

The rocking of the shaft 43 also actuates the shaft 42 and throws in the selecting bar latches 403 so that after the selecting bars have been stopped by their respective key posts, should the posts be released and returned to initial position, the selecting bars cannot jump forwardly and confuse the register and printing mechanisms. This latch is particularly effective during the taking of a total wherein the limit of movement of the selecting bars is fixed by the register wheels as distinguished from the fixing by the key posts.

At the end of a day's business the proprietor of the machine may take the several totals from the register or any one total independently of the others in the following manner:

He first exposes the register panel 4 by unlocking and swinging back the cover 11 so that the several registers are visible. He then depresses the key 6 for the register of the class of transaction for which he desires the total to be printed on the record web. Assuming that he first wishes to take the total of the cash sales, he depresses the key 6 for that particular register. When this key is depressed it moves the relative link 340 downwardly so that the ear 345 is in the path of the selector lever 333 and will stop the lever at that position. When the post is depressed it rocks the plate 353 forwardly and releases the bracket 368 so that the bracket arm 371 presses on the flange of the shipper member. When the plate 353 is moved forwardly all of the wing latches in the keyboard mechanism are moved to released position so that the selecting bars are free to move independently of the key posts, and when the main crank shaft is moved forwardly the shipper member is first rocked laterally by engagement of the head 322 with the boss 329 on the plate 323 on said main shaft a sufficient distance to permit the ear 371 of the bracket 368 to drop along the end of the shipper member and prevent the lateral movement of said member which occurs when the registers are set for accumulation; the idle movement of the crank shaft which brings the shipper member into action before the selecting bar is released being effected by the particular mounting of the elbow lever on the main shaft which actuates the selecting bar controlling shaft 43. During this movement of the shaft, the shift bar 375 is released and the spring 377 draws the bar to the right, shifting all of the latch wings and releasing any key posts that may have been held depressed, so that such parts cannot interfere with the totaling movement of the selecting bars. As the main shaft continues to revolve forwardly the transaction designating bar pushes the rack lever 305 back, so that the short shaft 310 is rotated until the head of the lever 333 engages the stop 345 on a depressed key link and stops the selecting bar in set position for that particular transaction. As the register shaft is lowered with the lowering of the key the wheels on the shaft mesh with the several selecting bar racks and are rotated upon initial forward movement of the main crank shaft instead of upon rearward movement of the shaft and selecting bars, as when the accumulation is being made, this initial meshing of the parts inducing a rearward movement of the wheels. The wheels move backwardly in this manner until the pins 299 thereon are caught by the hooks 398 on the bracket arms 285 when the wheels are held and hold the selecting bars. The selecting bars are thus set by the register wheels and by the rack lever 305, so that as the main crank shaft assumes its forward limit the printing is effected on the record web; it being apparent that as the characters and figures so printed correspond to the characters and figures on the register wheels or indicated by the active keys in the other banks, a record is made on the record web corresponding to the total shown by the register and the class of transactions for which the total is made. As the total is made up from transactions in which a number of different clerks and different customers have participated, there would be no reason for providing register wheels for the selecting bars in the customers number and clerk designating banks. These selecting bars, therefore, remain idle during the total taking operation, there being no pins 376 on the shift bar 375 for the customer's indicating banks, so that the selecting bars for these banks are held by their cipher stops, and the column in the printed web, corresponding to the customers number and clerks designation are blank, except that one of said selecting bars may operate to print an arrow or the like in front of a total on the web to indicate that it is a total as distinguished from a transaction figure.

Should the proprietor wish to use the register as an adding machine he may do so by selecting any particular register for that purpose. This selection is made by means of the lever 424 (Fig. XXXIII) on the shaft 310 which moves the shaft around until the stop lever 333 is over the proper register link foot, so that when the machine is operated following the setup by the keyboard, the same register will be thrown in at each operation while the lever is set, it being unnecessary for the operator to effect an individual register selection for each number or figure.

Should the transaction be a cash one so that it is necessary for the clerk to have access to the cash drawer, the operation is the same, except that when one of the cash transaction designating keys is lowered it automatically unlocks the cash drawer as heretofore described; the printing and registering of the sale, if it is a sale, being effected in the same manner as for a credit transaction.

It is apparent, therefore, that the present machine comprises a combination of elements for accomplishing the objects stated in the preamble hereto, and that such objects are accomplished with mechanism as simple in detail and combination as can be provided in view of the requirements of the machine.

Having thus described our invention what we claim as new therein, and desire to secure by Letters-Patent, is:—

1. In combination with register mechanism and a slip receptacle, having individual locking mechanisms, latch mechanism normally coöperative with both said locking mechanisms to lock the register mechanism and slip receptacles, a set of independently operable manipulative devices, means operable by any manipulative device in said set to render the latch mechanism effective, register operating mechanism, and means operable by said register operating mechanism to render both locking mechanisms effective.

2. In combination with an accounting machine and a slip receptacle, locking members for the machine and the receptacle, latch mechanism for said locking members, normally effective to prevent operation of the machine and hold the slip receptacle closed, a set of manipulative devices in the machine, means operable by any of said manipulative devices to shift the latch mechanism from effective position and retain the same ineffective, actuating mechanism for the machine, and means operable by said actuating mechanism to release the latch mechanism.

3. In combination with an accounting machine, a slip receptacle, lever mechanism operable in one direction by the receptacle when the receptacle is opened and in the opposite direction to close the receptacle, a locking member for the machine, a locking member for the receptacle connected with said lever mechanism, latch mechanism for said locking members, normally effective to hold the machine and retain the receptacle closed, a set of manipulative devices, means operable by any device in the set to shift the latch mechanism, actuating mechanism for the machine, means operable by the actuating mechanism to release the latch mechanism, means operable by the actuating mechanism to reciprocate the machine locking member, and means operable by the actuating mechanism to reciprocate the receptacle locking member and operate the lever mechanism to close the receptacle.

4. In combination with an accounting machine and a slip receptacle, mechanism operable by the slip receptacle when the receptacle is opened and operative to close the receptacle, mechanism for actuating the accounting machine, a receptacle closing member operable by said actuating mechanism and means connected with said slip receptacle mechanism movable thereby to position for engagement by said closing member when the slip receptacle is opened and operable by said member to close the receptacle when the actuating mechanism is operated.

5. In combination with an accounting machine and a slip receptacle, mechanism operable by the slip receptacle when the receptacle is opened and operative to close the receptacle, mechanism for actuating an accounting machine, a receptacle closing member operable by said actuating mechanism and means connected with said slip receptacle mechanism movable thereby, independently of the machine actuating mechanism, to position for engagement by said closing member when the slip receptacle is opened and operable by said member to close the receptacle when the actuating mechanism is operated.

6. In combination with an accounting machine and a slip receptacle, mechanism operable by the slip receptacle when the receptacle is opened and operative to close the receptacle, mechanism for actuating the accounting machine, a receptacle closing member operable by said actuating mechanism and means having positive connection with the slip receptacle mechanism and slip connection with the receptacle closing member, movable by said receptacle mechanism to position for operative engagement by said closing member when the slip receptacle is opened and operable by said member to close the receptacle when the machine actuating mechanism is operated.

7. In combination with an accounting machine, a slip receptacle, mechanism operable by the slip receptacle when the receptacle is opened and operative to close the receptacle, actuating mechanism for the accounting machine, and a member operative with the machine actuating mechanism having pin and slot connection with the receptacle mechanism, whereby the receptacle mechanism may operate independently when the receptacle is opened and is operated to close the receptacle when the machine is actuated.

8. In combination with an accounting machine, a slip receptacle, mechanism operable by the slip receptacle when the receptacle is opened and operable to close the receptacle, actuating mechanism for the accounting machine, oscillatory members connected with said actuating and receptacle mechanisms respectively and having pin and slot connection, whereby the receptacle may be opened independently of the actuating mechanism and is closed upon operation of said mechanism.

9. In combination with an accounting machine, a slip receptacle, mechanism operable by the slip receptacle when the receptacle is opened and operable to close the receptacle, actuating mechanism for the accounting machine, oscillatory members connected with said actuating and receptacle mechanisms respectively and having pin and slot connection, whereby the receptacle may be opened independently of the actuating mechanism and is closed upon operation of said mechanism, and a latch, under control of the accounting machine, for normally preventing operation of the receptacle mechanism and retaining the receptacle closed.

10. In combination with an accounting machine, a slip receptacle, mechanism operable by the slip receptacle when the receptacle is opened and operable to close the receptacle, actuating mechanism for the accounting machine, oscillatory members connected with said actuating and receptacle mechanisms respectively and having pin and slot connection, whereby the receptacle may be opened independently of the actuating mechanism and is closed upon operation of said mechanism, and a latch under control of the accounting machine normally engaging the oscillatory member of the receptacle mechanism to retain the receptacle closed.

11. In combination with an accounting machine, a slip receptacle, mechanism operable by the slip receptacle when the receptacle is opened and operable to close the receptacle, actuating mechanism for the accounting machine, oscillatory members connected with said actuating and receptacle mechanisms respectively and having pin and slot connection, whereby the receptacle may be opened independently of the actuating mechanism and is closed upon operation of said mechanism, and a latch under control of the accounting machine normally engaging the oscillatory member of the receptacle mechanism to retain the receptacle closed, and displaceable by said oscillatory member to relock the receptacle.

12. In combination with an accounting machine, a filing cabinet comprising a plurality of independently operable receptacles, mechanism operable by any of said receptacles when the receptacle is moved to open position and operable to replace the receptacle, a locking member for said mechanism, a latch for said member, under control of the accounting machine and normally preventing operation of the receptacle mechanism to retain all of the receptacles closed, actuating mechanism for the accounting machine, and means operable by the actuating mechanism ineffective to prevent opening of a receptacle but effective to close one or more open receptacles upon actuation of the machine.

13. In combination with an accounting machine, comprising a plurality of sets of manipulative devices and an actuating mechanism, a slip receptacle, mechanism operable by the receptacle when the receptacle is opened and operable to close the receptacle, independent locking members for the accounting machine and receptacle, a single latch mechanism for both locking members, normally effective to retain the receptacle closed and the machine inoperative, and means operable by any manipulative device in one of the sets to shift the latch mechanism and free both locking members.

14. In combination with an accounting machine, comprising a plurality of sets of manipulative devices and an actuating mechanism, a slip receptacle, mechanism operable by the receptacle, independent locking members for the accounting machine and receptacle, a single latch mechanism for both locking members, normally effective to retain the receptacle closed and the machine inoperative, means operable by any manipulative device in one of the sets to shift the latch mechanism and free both locking members, and means under control of the machine actuating mechanism for resetting the latch mechanism.

15. In combination with an accounting machine, comprising a plurality of sets of manipulative devices and an actuating mechanism, a slip receptacle, mechanism operable by the receptacle when the receptacle is opened and operable to close the receptacle, independent locking members for the accounting machine and receptacle, a single latch mechanism for both locking members, normally effective to retain the receptacle closed and the machine inoperative, means operable by any manipulative device in one of the sets to shift the latch mechanism and free both locking members, means under control of the machine actuating mechanism for resetting the latch mechanism, and means operable by said actuating mechanism for closing the receptacle upon primary movement of the machine.

16. In combination with an accounting machine, comprising a plurality of sets of manipulative devices and an actuating mechanism, a slip receptacle, mechanism operable by the receptacle when the receptacle is opened and operable to close the receptacle, independent locking members for the accounting machine and receptacle, a single latch mechanism for both locking members, normally effective to retain the receptacle closed and the machine inoperative, means operable by any manipulative device in one of the sets to shift the latch mechanism and free both locking members, and means operable by primary movement of the actuating mechanism for closing the receptacle and upon final movement thereof for releasing the latch mechanism.

17. In combination with an accounting machine, comprising a plurality of sets of manipulative devices and an actuating mechanism, a slip receptacle, mechanism operable by the receptacle when the receptacle is opened and operable to close the receptacle, independent locking members for the accounting machine and receptacle, a single latch mechanism for both locking members, yielding means normally retaining the latch mechanism in functional position, means operative by any device in one of said sets to shift the latch mechanism and free both locking members, a latch for restraining an operated manipulative device to hold the said latch mechanism inoperative, and means under control of the machine actuating mechanism for tripping said latch to free the operated manipulative device and the latch mechanism.

18. In combination with an accounting machine, comprising a plurality of sets of manipulative devices and an actuating mechanism, a slip receptacle, mechanism operable by the receptacle when the receptacle is opened and operable to close the receptacle, independent locking members for the accounting machine and receptacle, a single latch mechanism for both locking members, yieldable means normally retaining the latch mechanism in functional position, means operative by any device in one of said sets to shift the latch mechanism and free both locking members, a latch for restraining an operated manipulative device to hold the said latch mechanism inoperative, and means under control of the machine actuating mechanism for tripping said latch to free the operated manipulative device and the latch mechanism as the actuating mechanism completes an operation.

19. In combination with an accounting machine, comprising a plurality of sets of manipulative devices and an actuating machine, a slip receptacle, mechanism operable by the receptacle when the receptacle is opened and operable to close the receptacle, independent locking members for the accounting machine and receptacle, a single latch mechanism for both locking members, yieldable means normally retaining the latch mechanism in functional position, means operative by any device in one of said sets to shift the latch mechanism and free both locking members, a latch for restraining an operated manipulative device to hold the said latch mechanism inoperative, means under control of the machine actuating mechanism for tripping said latch to free the operated manipulative device and the latch mechanism as the actuating mechanism completes an operation, and means operable upon primary movement of the actuating mechanism to close the receptacle.

20. In combination with an accounting machine, comprising a plurality of sets of manipulative devices and an actuating mechanism, a slip receptacle, independent locking members for the accounting machine and slip receptacle, an oscillatory latch for each locking member, link connection between the latches, a spring yieldingly urging the latches to functional position, a plurality of sets of keys for effecting entries of different character in the machine, a cam bar operative by any key in one of the sets, connection between the cam bar and latches to shift the latches upon operation of a key, means for holding an operated key to retain the latches in shifted position, and means under control of said actuating mechanism for releasing the key holding means, whereby the latches may automatically return to functional position.

21. In combination with an accounting machine, a plurality of receptacles, rotatably mounted supports, rods on said supports extended along the receptacles, levers on the receptacles adapted to move and be moved by the rods, links connected with the supports, a rotatable lever arm, a shaft rotatably mounted in the lever arm and connected with said links, a latch for the lever, means in the machine for shifting said latch, mechanism for actuating the machine, and means connected with the actuating mechanism for shifting the lever arm.

22. In combination with an accounting machine, a plurality of receptacles, rotatably mounted supports, rods on said supports extended along the receptacles, levers on the receptacles adapted to move and be moved by the rods, links connected with the supports, a rotatable lever arm, a shaft rotatably mounted on the lever arm and connected with said links, a latch for the lever arm, means in the machine for shifting said latch, mechanism for actuating the machine, a slotted bar connected with the machine actuating mechanism and a pin on said lever arm projected into the slot in said bar, for the purpose set forth.

23. In combination with a register, register operating mechanism, a filing device, a cash drawer, means normally locking the register operating mechanism, means normally locking the filing device, means normally locking the cash drawer, common means for unlocking the register operating mechanism and filing device, and means operable by the register operating mechanism for unlocking the cash drawer.

24. In combination with recording mechanism, means for setting the recording mechanism, including a plurality of transaction designating keys, a single cash drawer, a lock for the cash drawer, means yieldingly urging the lock to functional position, a shift member pivotally connected with the lock and comprising a foot, means including a rotatable shaft for effecting operation of the recording mechanism, an arm on said shaft engageable with said foot to rock the drawer lock when the shaft member is in functional position, a T lever having arms located along some of said keys, means on said keys for engaging said arm to rock the lever, a second arm of said lever comprising means for engaging the shift member to move the latter to functional position.

25. In combination with recording mechanism, means for setting the recording mechanism, including a plurality of transaction designating keys, a single cash drawer, a latch for said cash drawer, a shift bar pivotally connected with said latch, yielding means for urging the latch to functional position, and the shift bar to non-functional position, means including a rotatable shaft for effecting operation of the recording mechanism, an arm on said shaft adapted for engaging said shift member when the latter is in functional position, a lever having an arm in slidable push relation with said shift member, and means on a determined number of said keys for engaging the lever to position the shift member.

26. In combination, a recording mechanism, a filing device, a cash drawer, means for effecting actuation of the recording mechanism, latches for the said means and for the filing device, a latch for the cash drawer, a set of clerk designating keys, means controllable by said keys for setting the recording mechanism, means operable by said keys for rocking the latches for the filing device and the means for effecting actuation of the recording mechanism, transaction designating keys, means controllable by the transaction designating keys for setting the recording mechanism, means operable by some of said transaction designating keys to position the cash drawer latch, and means operable with the means for effecting actuation of the recording mechanism to shift the drawer latch.

27. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, keyboard mechanism for selectively limiting movement of the selecting bars, main operating mechanism, means operable by the main operating mechanism coöperative with the type carriers to effect printing, a movable register shaft, register members on the shaft adapted for engagement with respective racks, a shipper member, a movable frame connected with the shipper member, means yieldingly urging the frame to retain the shipper member in and return the same to non-functional position, means operable by the main actuating mechanism for shifting said frame, and means operable by the shipper member for actuating said register shaft to move the register members to operative engagement with their racks.

28. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, keyboard mechanism for selectively limiting movement of the selecting bars, main operating mechanism, means operable by the main operating mechanism for restraining and returning the selecting bars, means operable by the main operating mechanism coöperative with the type carriers to effect printing, a movable register shaft, register members on the shaft adapted for engagement with respective racks, a shipper member, a shiftable plate on the main actuating mechanism, comprising a body part and an offset member connected at one end with the shipper member, yielding means urging the frame to throw the opposite end thereof over the end of said body and against which said end is returned by the returning means, and means operable by the shipper member for actuating the register shaft to move the register members to operative engagement with their racks.

29. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, keyboard mechanism for selectively limiting movement of the selecting bars, main operating mechanism, means operable by the main operating mechanism for restraining and returning the selecting bars, means operable by the main operating mechanism coöperating with the type carriers to effect printing, a movable register member on the shaft adapted for engagement with respective racks, a shipper member, a shifter plate in the main actuating mechanism, comprising a body part and an offset member having return connection with the body part, the body part comprising a yielding track, fixed at one end and overlying the return connection, a pivotal frame connected at one end with the shipper member and having a head at the other end for engaging the shifter plate, yielding means urging the head end of the frame toward the shipper plate and against the tension of which the frame is shifted by the return connection, and means operable by the shipper member for actuating the register shaft to move the register members to operative engagement with their racks.

30. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, keyboard mechanism for selectively limiting movement of the selecting bars, main operating mechanism, means operable by the main operating mechanism for restraining and returning the selecting bars, means operable by the main operating mechanism coöperative with the type carriers to effect printing, a movable register shaft, register members on the shaft adapted for engagement with respective racks, a shipper member, a shifter plate in the main actuating mechanism comprising a body part slit to form a lip, with the lip bent laterally to form a track and a connecting neck leading back to the body part, a track lying along the lipped part of the body, attached at one end to the body and extending beyond the connecting neck at the other end, a pivotal frame connected at one end with the shipper member, and having a head at the other end for engaging the shifter plate, yielding means urging the head end of the frame toward the shipper plate and against the tension of which the frame is shifted by the return connection and means operable by the shipper member for actuating the register shaft to move the register members to operative engagement with their racks.

31. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, keyboard mechanism for selectively limiting movement of the selecting bars, main operating mechanism, means operable by the main operating mechanism for restraining and returning the selecting bars, means operable by the main operating mechanism coöperative with the type carriers to effect printing, a movable register shaft, register members on the shaft adapted for engagement with respective racks, a shipper member, means operable by the main operating mechanism for actuating the shipper member, a link connected with the register shaft, and a lever operable by the shipper member and engageable with the link to rock the register shaft to functional position.

32. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, keyboard mechanism for selectively limiting movement of the selecting bars, main operating mechanism, means operable by the main operating mechanism for restraining and returning the selecting bars, means operable by the main operating mechanism coöperative with the type carriers to effect printing, a movable register shaft, register members on the shaft adapted for engagement with respective racks, a shipper member, means operable by the main operating mechanism for actuating the shipper member, a manually operable link connected with the register shaft and a lever operable by the shipper member and engageable with the link, whereby the register shaft may be rocked to functional position manually or by the main operating mechanism.

33. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, keyboard mechanism for selectively limiting movement of the selecting bars, main operating mechanism, means operable by the main operating mechanism for restraining and returning the selecting bars, means operable by the main operating mechanism coöperative with the type carriers to effect printing, a movable register shaft, register members on the shaft adapted for engagement with respective racks, a shipper member, means operable by the main operating mechanism for actuating the shipper member, a link connected with the register shaft and having a foot thereon, and a lever operable by the shipper member and engageable with said foot to rock the register shaft to functional position.

34. In combination with a reciprocatory selecting bar, for each of a plurality of register members, a movable rack carrying member connected with each selecting bar, a rack on each carrying member adapted for operative engagement with a corresponding register member, a movable type carrier connected with each selecting bar yielding means normally urging each selecting bar toward one limit of its travel, keyboard mechanism for selectively limiting movement of the selecting bars, main operating mechanism, means operable by the main operating mechanism for restraining and returning the selecting bars, means operable by the main operating mechanism coöperative with the type carriers to effect printing, a rotatable shaft, arms fixed on said shaft, a register shaft carried by said arms, independently rotatable register members carried by said register shaft and adapted for engagement with respective racks, a rocking arm fixed on the rotatable shaft, a link connected with the rocking arm, a shipper member, means operable by the main operating mechanism for actuating the shipper member, means operable by the shipper member for actuating said link, and register members on the register shaft adapted for engagement with respective racks.

35. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, key board mechanism for selectively limiting movement of the selecting bars, means operable by the main operating mechanism coöperative with the type carriers to effect printing, spaced frame members having registering slots, a shaft rotatable in said frame members, arms fixed on said shaft and having slots therein extending across the slots in the frame members, a register shaft movable in the frame and arm slots, a rocking arm fixed to the rotatable shaft, a link connected with the rocking arm, a shipper member, means operable by the main operating mechanism for actuating the shipper member, means operable by the shipper member for actuating said link, and register members on the register shaft adapted for engagement with respective racks.

36. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, key board mechanism for selectively limiting movement of the selecting bars, main operating mechanism for restraining and returning the selecting bars, means operable by the main operating mechanism coöperative with the type carriers to effect printing, spaced frame members having registering slots, a shaft rotatable in said frame members, arms fixed on said shaft and having slots therein extending across the slots in the frame members, a register shaft movable in the frame and arm slots, a spring yieldingly urging each of said rotatable shafts to retain the register in non-functional position, a rocking arm fixed to the rotatable shaft, a link connected with the rocking arm, a shipper member, means operable by the main operating mechanism for actuating the shipper member, means operable by the shipper member for actuating said link, and register members on the register shaft adapted for engagement with respective racks.

37. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, key board mechanism for selectively limiting movement of the selecting bars, means operable by the main operating mechanism coöperative with the type carriers to effect printing, spaced frame members having registering slots, a shaft rotatable in said frame members, arms fixed on said shaft and having slots therein extending across the slots in the frame members, a register shaft movable in the frame and arm slots, a rocking arm fixed to the rotatable shaft, a link connected with the rocking arm, a shipper member, means operable by the main operating mechanism for actuating the shipper member, means operable by the shipper member for actuating said link, register members on the register shaft adapted for engagement with respective racks, a third arm on each of said rotatable shafts and a spring connected with each of said third arms for the purpose set forth.

38. In combination with a reciprocatory selecting bar for each of a plurality of register members, a movable rack carrying member connected with each selecting bar, a rack on each carrying member adapted for operative engagement with a corresponding register member, a movable type carrier connected with each selecting bar, yielding means normally urging each selecting bar toward one limit of its travel, key board mechanism for selectively limiting movement of the selecting bars, means operable by the main operating mechanism coöperative with the type carriers to effect printing, spaced frame members having registering slots, a shaft rotatable in said frame members, arms fixed on said shaft and having slots therein extending across the slots in the frame members, a register shaft movable in the frame and arm slots, a rocking arm fixed to the rotatable shaft, a link connected with the rocking arm, a cone head movable transversely of the link, means operable by the main operating mechanism for shifting the cone head, a lever operable by the cone head and adapted for moving the link to rock the register shaft, and register members on the register shaft adapted for engagement with respective racks.

39. The combination with a plurality of independently rotatable shafts, of a pair of arms fixed on each shaft, an axle carried by each pair of arms, a plurality of independently rotatable register wheels on each axle, a crank arm on each shaft, having a foot member, a shifting device for engaging the foot members, means for selectively positioning the shifting device, means for inducing engagement of the shifting device with a selected foot member to move the foot member and position its register axle, a key crank pivotally mounted on each shaft and having a lip overlying the respective foot member, whereby the foot member and its shaft may be rocked independently of the shifting device to position the selected axle, and means for actuating the register wheels on the positioned axle.

40. The combination with a shipper shaft, of a plurality of registers, a positioning member for each register, a lever rotatable with the shaft and adapted for engagement with a selected positioning member, a cone head slidable on the shaft and adapted for wiping engagement with the lever to rock the same, an actuating bar operatively connected with the shaft to position the lever, and means connected with the cone head for moving the same longitudinally on the shaft to actuate the lever.

41. The combination with a shipper shaft, of a plurality of registers, a positioning member for each register, a lever fixedly mounted on the shaft and adapted for engagement with a selected positioning member, a cone head slidable on the shaft and adapted for wiping engagement with the lever to rock the same, an actuating bar operatively connected with the shaft to position the lever, means connected with the cone head for moving the same longitudinally on the shaft to actuate the lever, and other actuating bars for actuating the selected register.

42. The combination with a rotatable shaft, of a plurality of independently operable registers adapted for movement to and from initial position, a positioning member for each register, a lever rotatable with the shaft and having an arm for engaging a selected positioning member, a cone head slidably mounted on the shaft and adapted for engaging another arm of said lever to rock the lever, an actuating bar operatively connected with the shaft to rotate the same, means for selectively limiting movement of the actuating bar, means for actuating the bar, means for shifting the cone head following the positioning of the lever to rock the lever, and other actuating bars for operating a selected register.

43. The combination with a rotatable shaft, of a plurality of independently operable registers movable to and from functional position, a positioning device for each register, a lever fixed on the shaft and having an arm for engagement with a selected positioning device, a cone head slidable on the shaft and adapted for wiping another arm of the lever to rock the lever, a pinion on said shaft, a lever having a gear portion meshing with the pinion, an actuating bar for moving the rack lever to position the shipper lever, means for actuating the actuating bar, means for selectively limiting travel of the bar, means for shifting the cone head to rock the shipper lever, and other actuating bars for actuating a selected register.

44. The combination with a rotatable shaft, of a cone head slidable on the shaft, a plurality of registers independently movable to and from functional position, a positioning member for each register, a positioning lever fixed on said shaft and having an arm for engaging a selected positioning member and an arm for engagement by the cone head, a shipper lever connected with the cone head, a rotatable shaft having a stop plate thereon, means for urging the shipper lever to contact with the stop plate whereby the lever is rocked when leaving the plate to slide the cone head and rock the positioning lever, and actuating bars for operating a selected register.

45. The combination with a rotatable shaft, of a cone head slidable on the shaft, a plurality of registers independently movable to and from functional position, a positioning member for each register, a positioning lever fixed on said shaft and having an arm for engaging a selected positioning member and an arm for engagement by the cone head, a shipper lever connected with the cone head, a rotatable shaft having a stop plate thereon, means for urging the shipper lever to contact with the stop plate whereby the lever is rocked when leaving the plate to slide the cone head and rock the positioning lever, actuating bars for operating a selected register, means yieldingly urging said actuating bars toward one limit of their travel, and means operable by said main shaft for controlling the forward movement of and returning the actuating bars.

46. The combination with a rotatable shaft, of a plurality of independently operable registers arranged concentrically about the shaft, a positioning member for each register, a cone head slidable on the shaft, a lever rotatably mounted on the shaft and having an arm for engaging a selected positioning member, and a second arm for engagement by the cone head, rack mechanism including a lever for rotating the shaft, means for yieldingly urging the rack mechanism to retain the shaft in initial position, an actuating bar for moving the shaft forwardly, actuating bars for operating a selected register, means for normally urging said actuating bars in one direction, key mechanism for controlling travel of said bars, a main shaft, means on the main shaft for shifting the cone head, means operable by said shaft for shifting the one head to move a selected register to functional position, and means operable by the main shaft for returning the actuating bars.

47. The combination with a rotatable shaft, of a plurality of independently operable registers arranged concentrically about the shaft, a positioning member for each register, a cone head slidable on the shaft, a lever rotatably mounted on the shaft and having an arm for engaging a selected positioning member and a second arm for engagement by the cone head, rack mechanism including a lever for rotating the shaft, means for yieldingly urging the rack mechanism to retain the shaft in initial position, an actuating bar for moving the shaft forwardly, actuating bars for operating a selected register, means for normally urging said actuating bars in one direction, key mechanism for controlling travel of said bars, a main shaft, means operable by said shaft for shifting the cone head to move a selected register to functional position, means operable by the main shaft for returning the actuating bars, printing mechanism comprising individual type carriers, connection between said carriers and respective actuating bars, type members mounted in said carriers, and means operable by the main shaft for actuating selected type members.

48. The combination with a rotatable shaft, of a plurality of independently operable registers arranged concentrically relative to the shaft, a positioning member for each register, a cone head slidable on the shaft, a lever fixed on said shaft and having an arm for engaging a selected positioning member and a second arm for engagement by the cone head, a spring for yieldingly urging the lever to retain the second lever arm in engagement with the cone head, means for rotating the shaft to position said lever, a main shaft, a shift plate on said shaft, a shipper lever connected with the shaft, a shipper lever having a head for wiping the cone head and having a head for wiping the shift plate, means for yieldingly urging the shipper lever to retain engagement of its head with the shifting plate whereby the shipper lever is rocked and the cone head moved to rock the positioning lever when the lever head leaves the shift plate, means on said plate for returning the shipper head to initial position upon reverse travel of the plate carrying shaft, actuating bars for operating a selected register, means for actuating the bars, and means for selectively limiting movement of said bars.

49. The combination with a plurality of independently operable registers, of positioning mechanism for each register comprising a link having a foot thereon, a rotatable shaft, a lever on said shaft having an arm for engaging the foot on the positioning device of a selected register, a cone head slidable on the shaft adapted for engagement with the lever to rock the same, a pinion on the shaft, means for rotating the shaft to selectively position said lever, actuating bars for operating a selected register, a prime mover controlling movement of said bars, a shipper device for rocking said lever to actuate a register positioning member, a shift plate operable by the prime mover to actuate the shipper device and comprising a plate for engaging a portion of the shipper device, yielding means for urging the shipper device to contact the plate and whereby the device is rocked upon leaving the plate, the said plate having an offset portion inclined at one end for returning the shipper device to initial position, and a yielding rail covering the offset and forming the initial bearing portion for the shipper device.

50. The combination with a plurality of independently operable registers, of positioning mechanism for each register comprising a link having a foot thereon, a rotatable shaft, a lever on said shaft having an arm for engaging the foot on the positioning device of a selected register, a cone head slidable on the shaft adapted for engagement with the lever to rock the same, a pinion on the shaft, means for rotating the shaft to selectively position said lever, actuating bars for operating a selected register, a prime mover controlling movement of said bars, a shipper device for rocking said lever to actuate a register positioning member, a shift plate operable by the prime mover to actuate the shipper device and comprising a plate for engaging a portion of the shipper device, yielding means for urging the shipper device to contact the plate and whereby the device is rocked upon leaving the plate, the said plate having an offset portion inclined at one end for returning the shipper device to initial position, a yielding rail covering the offset and forming the initial bearing portion for the shipper device, a stop member having an ear yieldingly urged to contact with the cone head, manually operable means for selectively positioning the registers, a holding device controllable by said manually operable means and normally restraining movement of said stop, and a protuberance on said rail for rocking the shipper device to permit the stop to position back of the cone head when a register has been positioned by said manualy operable means.

51. In combination with a plurality of independent registers each comprising individually operable denominational members, a common setting member for like denominational members of the several registers, type carriers corresponding to the several denominations represented in the registers, a selecting bar connected with each setting member and with a corresponding type carrier, keyboard mechanism for determining extent of travel of the selecting bars, main operating mechanism controlling travel of the bars, means for selecting a register, and means operable by the main operating mechanism for effecting operative relation of the selected register and operative setting members.

52. In combination with a plurality of independent registers each comprising individually operable denominational members, a common setting member for like denominational members of the several registers, type carriers corresponding to the several denominations represented in the registers, a selecting bar connected with each setting member and with a corresponding type carrier, keyboard mechanism for determining extent of travel of the selecting bars, main operating mechanism controlling travel of the bars, means for selecting a register, means operable by the main operating mechanism for effecting operative relation of the selected register and operative setting members, and means operable by the main operating mechanism coöperative with the type carrier to effect printing.

53. In combination with a plurality of independent registers, each comprising individually operable denominational members, a movable rack sector for each series of denominational members, an individual rack on each sector for each denominational member of a corresponding register series, a selecting bar connected with each sector, key board mechanism for selectively determining travel of the said bar, main operating mechanism controlling travel of said bar, a type carrier connected with each bar, means operable by the main operating mechanism coöperative with the type carriers to effect printing, means for selecting a register and means operable by the main operating mechanism to effect operative engagement of the register members with their respective racks.

54. In combination with a plurality of independent registers, each comprising individually operable denominational members, a movable rack sector for each series of denominational register members, an individual rack for each register member, movably mounted on a corresponding sector, carry-over mechanism operable by a register member of one denomination to release the rack for a register member of next higher denomination in the same register, means for actuating a released rack, a selecting bar connected with each rack sector, yielding means for urging the selecting bars to actuate the sectors, keyboard mechanism for determining extent of travel of the selecting bars, main operating mechanism, means operable by the main operating mechanism for controlling travel of the selecting bars, a type carrier connected with each selecting bar and movable thereby and means operable by the main operating mechanism coöperative with the type carriers to effect printing.

55. In combination with a plurality of independent registers, each comprising a shaft and independently rotatable denominational members on the shaft, a pivotally mounted rack sector for all like denominational members of the several registers, an individual rack for each register member having pivotal mounting on a relative sector, springs yieldingly urging the racks in a direction to advance their register members, a carry over device normally restraining the rack of a higher denomination and operable by a register member of lower denomination, a selecting bar connected with each rack sector, key mechanism for determining extent of travel of the selecting bars, a type carrier connected with each selecting bar, main operating mechanism, means operable by the main operating mechanism for controlling travel of the selecting bars, means for selecting a register, and means operable by the main operating mechanism for shifting a selected register to operative position.

56. In combination with a plurality of independent registers, each comprising a plurality of independently operable denominational members, an actuator mechanism common to all members of like denomination of the several registers, a selecting bar for each actuator mechanism, a transaction designating selecting bar, denominational and transaction sets of key members for determining extent of travel of respective selecting bars, means operable by the transaction designating selecting bar for selecting a register, main operating mechanism, means operable by the main operating mechanism for controlling travel of the selecting bars, and means operable by the main operating mechanism coöperative with the type carriers to effect printing.

57. In combination with a plurality of independent registers each comprising a plurality of independently operable denominational members, an actuator mechanism common to all members of like denomination of the several registers, a selecting bar for each actuator mechanism, a transaction designating selecting bar, a type carrier connected with each selecting bar, denominational and transaction sets of key members for determining extent of travel of respective selecting bars, a lever connected with the transaction designating selecting bar, means operable by said lever for selecting a register, main operating mechanism, means for actuating the selecting bars, means operable by the main operating mechanism for controlling travel of the selecting bars, means coöperative with the type carriers to effect printing, and means operable by the main operating mechanism to actuate the register selecting means to position a register in functional relation to the actuator.

58. In combination with a plurality of independent registers, each comprising a plurality of independently operable denominational members, an actuator mechanism common to all members of like denomination of the several registers, a selecting bar for each actuator mechanism, a transaction designating selecting bar, a spring yieldingly urging each selecting bar in one direction, a printing member connected with each selecting bar, denominational and transaction designating sets of key members coöperative with the selecting bars to determine extent of travel of respective selecting bars, means operable by the transaction designating selecting bar for selecting a register, main operating mechanism, means operable by the main operating mechanism for restraining and returning the selecting bars, and means operable by the main operating mechanism coöperative with the type carriers to effect printing.

59. In combination with a plurality of independent registers, each comprising a plurality of independently operable denominational members, an actuator mechanism common to all members of like denomination of the several registers, a selecting bar for each actuator mechanism, a transaction designating selecting bar, a spring yieldingly urging each selecting bar in one direction, a printing member connected with each selecting bar, denominational and transaction designating sets of key members coöperative with the selecting bars to determine extent of travel of respective selecting bars, means operable by the transaction designating selecting bars for selecting a register, main operating mechanism, means operable by the main operating mechanism for restraining and returning the selecting bars, type members in the printing members, and type hammers under control of the main operating mechanism for striking said type members.

60. In combination with a plurality of independent registers, each comprising a plurality of independently operable denominational members, an actuator mechanism common to all members of like denomination of the several registers, a selecting bar for each actuator mechanism, a transaction designating selecting bar, a spring yieldingly urging each selecting bar in one direction, a printing member connected with each selecting bar, denominational and transaction designating sets of key members coöperative with the selecting bars to determine extent of travel of respective selecting bars, means operable by the transaction designating selecting bars for selecting a register, main operating mechanism, means operable by the main operating mechanism for restraining and returning the selecting bars, type members on the printing members, type hammers for striking the type members, yielding means urging the hammers to strike, and means operable by the main operating mechanism for restraining and returning the hammers.

61. In combination with a plurality of independent registers each comprising individual denominational members, a corresponding type carrier for each denominational member, common means for actuating the denominational members and type carriers, keyboard mechanism for determining extent of travel of said actuating means, means local to the keyboard mechanism for selecting a register for accumulation, other means local to the registers for selecting a register for accumulation and means for effecting actuation of the actuating members.

62. In combination with a plurality of independent registers each comprising individual denominational members, a corresponding type carrier for each denominational member, common means for actuating the denominational members and type carriers, keyboard mechanism for determining extent of travel of said actuating means, means local to the keyboard mechanism for selecting a register, other means local to the registers for selecting a register, means for effecting actuation of the actuating members and other means local to the registers for rendering a register coöperative with the actuating members in a different relation to take a total.

63. In combination with a plurality of individually operative registers, each comprising individually operative denominational members, a common selecting bar for corresponding denominational members of all of the registers, means yieldingly urging the selecting bars, main operating mechanism, means operable by the main operating mechanism for restraining and returning the bars, a bank of individually operable key posts for selectively limiting travel of the selecting bars, latches for retaining the key posts in functional position, means for selecting a register for accumulation, means operable by the main operating mechanism for shifting a selected register to operative relation with active bars following an initial movement of the bars, and other means for selectively shifting a register to operative relation with the bars prior to initial movement of the bars.

64. In combination with a plurality of individually operative registers, each comprising individually operative denominational members, a common selecting bar for corresponding denominational members of all of the registers, means yieldingly urging the selecting bars, main operating mechanism, means operable by the main operating mechanism for restraining and returning the bars, a bank of individually operable key posts for selectively limiting travel of the selecting bars, latches for retaining the key posts in functional position, means for selecting a register for operation, means operable by the main operating mechanism for shifting a selected register to operative relation with the active bars following an initial movement of the bars, other means for selectively shifting a register to operative relation with the bars prior to initial movement of the bars, a trip member yieldingly urged to shift the latches, key mechanism for shifting the registers to operative relation with the selecting bars, means normally restraining the trip member and operable by the key mechanism to free the trip member.

65. In combination with a plurality of individually operative registers, each comprising individually operative denominational members, a common selecting bar for corresponding denominational members of all of the registers, means yieldingly urging the selecting bars, main operating mechanism, means operable by the main operating mechanism for restraining and returning the bars, a bank of individually operable key posts for selectively limiting travel of the selecting bars, latches for retaining the key posts in functional position, means for selecting a register for operation, means operable by the main operating mechanism for shifting a selected register to operative relation with the active bars following an initial movement of the bars, other means for selectively shifting a register to operative relation with the bars prior to initial movement of the bars, a trip member yieldingly urged to shift the latches, key mechanism for shifting the registers to operative relation with the selecting bars, means normally restraining the trip member, a stop normally restraining the trip member and operable by the key mechanism to free the trip member, a second stop for restraining the trip member independently of the first named stop and means operable by the main operating mechanism for shifting the second stop.

66. In combination with a plurality of individually operable registers, each comprising individually operative denominational members, a common selecting bar for corresponding denominational members of all the registers, means yieldingly urging the selecting bars, main operating mechanism, means operable by the main operating mechanism for restraining and returning the bars, a bank of individually operable key posts for selectively limiting travel of the selecting bars, means yieldingly urging the key posts to nonfunctional position, a latch for each bank of key posts, a trip member for all of the latches, key mechanism for selectively positioning the registers, and means operable by said key mechanism for controlling the trip member.

67. In combination with a plurality of individually operable registers, each comprising individually operative denominational members, a common selecting bar for corresponding denominational members of all the registers, means yieldingly urging the selecting bars, main operating mechanism, means operable by the main operating mechanism for restraining and returning the bars, a bank of individually operable key posts for selectively limiting travel of the selecting bars, means yieldingly urging the key posts to nonfunctional position, means for limiting travel of each selecting bar at a cipher position, means yieldingly urging said limiting means to functional position, a trip member for all of the limiting means, key mechanism for selectively positioning the registers in operable relation to the selecting bars, and means operable by the key mechanism controlling the trip member.

68. In combination with a plurality of individually operable registers, each comprising individually operative denominational members, a common selecting bar for corresponding denominational members of all the registers, means yieldingly urging the selecting bars, main operating mechanism, for restraining and returning the bars, a bank of individually operable key posts for selectively limiting travel of the selecting bars, means yieldingly urging the key posts to non-functional position, means for limiting travel of each selecting bar at a cipher position, means yieldingly urging said limiting means to functional position, a trip member for all of the limiting means, key mechanism for selectively positioning the registers in operable relation to the selecting bars, means operable by the key mechanism, primarily controlling the trip member, and means operable by the main operating mechanism also controlling the trip member.

69. In combination with a plurality of individually operable registers, each comprising individually operative denominational members, a common selecting bar for corresponding denominational members of all the registers, means yieldingly urging the selecting bars, main operating mechanism, means operable by the main operating mechanism for restraining and returning the bars, a bank of individually operable key posts for selectively limiting travel of the selecting bars, means yieldingly urging the key posts to non-functional position, means for limiting travel of each selecting bar at a cipher position, means yieldingly urging said limiting means to functional position, a trip member yieldingly urged to shift all of the latches to free the selecting bars, key mechanism for selectively positioning the registers in operative relation to the selecting bars, means operable by the key mechanism comprising a stop for normally restraining the trip member, and a second stop, operable by the main operating mechanism, normally restraining the trip member and adapted for returning the trip member to normal position.

70. In combination with a plurality of individually operable registers, each comprising individually operable denominational members, a common selecting bar for corresponding denominational members of all the registers, means yieldingly urging the selecting bars, main operating mechanism, means operable by the main operating mechanism for restraining and returning the bars, a bank of individually operable key posts for selectively limiting travel of the selecting bars, means yieldingly urging the key posts to non-functional position, means for limiting travel of each selecting bar at a cipher position, means yieldingly urging said limiting means to functional position, a trip member comprising a bar having projecting members for engaging the several limiting means, means yieldingly urging the trip member to shift the limiting means, key mechanism for selectively positioning the register, and a stop operable by the key mechanism, normally restraining said trip member.

71. In combination with a plurality of individually operable registers, each comprising individually operative denominational members, a common selecting bar for corresponding denominational members of all the registers, means yieldingly urging the selecting bars, main operating mechanism for restraining and returning the bars, a bank of individually operable key posts for selectively limiting travel of the selecting bars, means yieldingly urging the key posts to non-functional position, means for limiting travel of each selecting bar at a cipher position means yieldingly urging said limiting means to functional position, a trip member comprising a bar having projecting members for engaging the several limiting means, means yieldingly urging the trip member to shift the limiting means, individual key members for selectively positioning the registers, and a stop, operable by any key member, normally restraining the trip member.

72. In combination with a plurality of individually operable registers, each comprising individually operative denominational members, a common selecting bar for corresponding denominational members of all the registers, means yieldingly urging the selecting bars, main operating mechanism for restraining and returning the bars, a bank of individually operable key posts for selectively limiting travel of the selecting bars, means yieldingly urging the key posts to non-functional position, means for limiting travel of each selecting bar at a cipher position, means yieldingly urging said limiting means to functional positioning, a trip member comprising a bar having projecting members for engaging the several limiting means, means yieldingly urging the trip member to shift the limiting means, individual key members for selectively positioning the registers, a shifting plate having a stop for the trip member, a spring yieldingly urging the plate to functional position and means engageable by any key member for shifting the plate to free the trip member.

73. In combination with a plurality of individually operable registers, each comprising individually operative denominational members, a common selecting bar for corresponding denominational members of all the registers, means yieldingly urging the selecting bars, main operating mechanism for restraining and returning the bars, a bank of individually operable key posts for selectively limiting travel of the selecting bars, means yieldingly urging the key posts to non-functional position, means for limiting travel of each selecting bar at a cipher position, means yieldingly urging said limiting means to functional position, a trip member comprising a bar having projecting members for engaging the several limiting means, means yieldingly urging the trip member to shift the limiting means, individual key members for selectively positioning the registers, a stop, operable by any key member, normally restraining the trip member, an arm connected with the main operating mechanism comprising a head for normally stopping the trip member and having an inclined part for returning the trip member to normal position.

74. In combination with a register comprising a plurality of individually operable members, an actuator for each member, means yieldingly urging the actuators in one direction, main operating mechanism, means operable by the main operating mechanism for restraining and returning the actuators, zero stop devices on the register members and actuators for limiting movement thereof to cipher position of the register members, trigger mechanism coöperative with said actuators to hold the actuators against their urging means, means for shifting the registers to coöperative relation with the actuators, and means for shifting said trigger mechanism at opposite limits of movement of the main operating mechanism.

75. In combination with a register comprising a plurality of individually operable members, an actuator for each member, means yieldingly urging the actuators in one direction, main operating mechanism, means operable by the main operating mechanism for restraining and returning the actuators, zero stop devices on the register members and actuators for limiting movement thereof to cipher position of the register members, trigger mechanism coöperative with said actuators to hold the actuators against their urging means, means for shifting the register to coöperative relation with the actuators, means for shifting said trigger mechanism at opposite limits of movement of the main operating mechanism, type carriers operatively connected with said actuators, and means, operable from the main operating mechanism, coöperative with the type carriers to effect printing.

76. In combination with a register comprising a plurality of independently operable members, an actuator for each register member, yielding means normally urging the actuators, means for shifting the register into and from functional relation with the actuators, a rotatable shaft, means for rotating the shaft, arms on said shaft normally restraining and adapted for returning the actuators, trigger mechanism comprising means for engaging the actuators, yielding means normally urging the trigger mechanism to functional position, a latch normally restraining the trigger mechanism, and means on the shaft for shifting said latch.

77. In combination with a register comprising a plurality of independently operable members, an actuator for each register member, yielding means normally urging the actuators, means for shifting the register into and from functional relation with the actuators, a rotatable shaft, means for rotating the shaft, arms on said shaft normally restraining and adapted for returning the actuators, trigger mechanism comprising means for engaging the actuators, yielding means normally urging the trigger mechanism to functional position, a latch normally restraining the trigger mechanism and means on the shaft for shifting said latch, to release the trigger mechanism as the shaft reaches one limit of its movement.

78. In combination with a register comprising a plurality of independently operable members, an actuator for each register member, yielding means normally urging the actuators, means for shifting the register into and from functional relation with the actuators, a rotatable shaft, means for rotating the shaft, arms on said shaft normally restraining and adapted for returning the actuators, trigger mechanism comprising means for engaging the actuators, yielding means normally urging the trigger mechanism to functional position, a latch normally restraining the trigger mechanism and means on the shaft for shifting said latch and for engaging the trigger mechanism to reëstablish its normal relation to the actuators and latch as the shaft reaches the opposite limits of its movement.

79. In combination with a register comprising a plurality of independently operable members, an actuator for each register member, yielding means normally urging the actuators, means for shifting the register into and from functional relation with the actuators, a rotatable shaft normally restraining and adapted for returning the actuators, trigger mechanism comprising means for engaging the actuators, yielding means normally urging the trigger mechanism to functional position, a latch yieldingly urged to restrain the trigger mechanism from engagement with the actuators, means on said shaft comprising spaced heads adapted for engagement at opposite limits of movement of the shaft respectively with the latch and trigger mechanism for the purpose set forth.

80. In a machine of the character described, a plurality of selectively operable registers, register actuating means, key mechanism for limiting travel of said means, key controlled mechanism for selecting a register, manually operable means for selecting a register, main operating mechanism, means operable by the main operating mechanism controlling the register actuating means, means operable by the main operating mechanism for shifting a selected register to operative position upon movement of said main operating mechanism and connection between the main operating mechanism and said controlling means having delayed operation on the controlling means, for the purpose set forth.

81. In a machine of the character described, a plurality of selectively operable registers, register actuating means, key mechanism for limiting travel of said means, key controlled mechanism for selecting a register, manually operable means for selecting a register, main operating mechanism, means operable by the main operating mechanism controlling the register actuating means, means operable by the main operating mechanism for shifting a selected register to operative position upon movement of said main operating mechanism, and an elbow lever eccentrically connecting the main operating mechanism with said controlling means to effect delayed operation of said controlling means, for the purpose set forth.

82. In a machine of the character described, record making mechanism having fixed mounting and including type members, means for actuating the type members and a crank member; a support movable relative to the record making mechanism, means on the support for carrying a record web and web advancing mechanism including a ratchet, a pawl for actuating the ratchet, a lever for actuating the pawl, an intermediate lever adapted for actuation by said crank and for actuating the pawl lever, and a spring yieldingly urging the intermediate lever in one direction.

In testimony whereof we affix our signatures.

BENJAMIN P. HAYES.
FRANK D. LAUGHLIN.